United States Patent
Isshiki et al.

(10) Patent No.: US 12,411,922 B2
(45) Date of Patent: Sep. 9, 2025

(54) SYSTEM FOR CANCELABLE BIOMETRIC FEATURE DATA GENERATION

(71) Applicant: NEC Corporation, Tokyo (JP)

(72) Inventors: Toshiyuki Isshiki, Tokyo (JP); Hiroto Tamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 120 days.

(21) Appl. No.: 18/290,475

(22) PCT Filed: May 26, 2021

(86) PCT No.: PCT/JP2021/020073
§ 371 (c)(1),
(2) Date: Nov. 14, 2023

(87) PCT Pub. No.: WO2022/249359
PCT Pub. Date: Dec. 1, 2022

(65) Prior Publication Data
US 2024/0273173 A1   Aug. 15, 2024

(51) Int. Cl.
*G06F 21/32* (2013.01)
*H04L 9/08* (2006.01)

(52) U.S. Cl.
CPC .............. *G06F 21/32* (2013.01); *H04L 9/088* (2013.01)

(58) Field of Classification Search
CPC .................................. G06F 21/32; H04L 9/088
See application file for complete search history.

(56) References Cited

U.S. PATENT DOCUMENTS

| | | | |
|---|---|---|---|
| 6,836,554 B1* | 12/2004 | Bolle | G07C 9/37 902/4 |
| 8,412,940 B2* | 4/2013 | Takahashi | H04L 63/0861 713/168 |
| 9,009,486 B2* | 4/2015 | Yokoi | H04L 9/0866 726/16 |
| 2007/0253608 A1* | 11/2007 | Tulyakov | G06V 40/1353 382/125 |
| 2010/0205658 A1* | 8/2010 | Griffin | G06F 21/32 726/5 |

(Continued)

OTHER PUBLICATIONS

International Search Report for PCT Application No. PCT/JP2021/020073, mailed on Aug. 17, 2021.

(Continued)

*Primary Examiner* — Hee Soo Kim
(74) *Attorney, Agent, or Firm* — Sughrue Mion, PLLC

(57) ABSTRACT

Provided is a registration information generation apparatus for generating registration information based on registration-side input information including one or both of elements corresponding to a first set and elements corresponding to a second set, the registration information generation apparatus being configured to generate intermediate information by performing distribution processing for performing secret-sharing for the elements corresponding to the first set in input information, and a duplication processing for duplicating the elements corresponding to the second set in input information, and generate the registration information by replacing a sort order of elements in the intermediate information using a replacement key.

22 Claims, 43 Drawing Sheets

(56) References Cited

U.S. PATENT DOCUMENTS

| | | | |
|---|---|---|---|
| 2023/0231846 A1* | 7/2023 | Zhu | H04L 63/0861 726/6 |
| 2023/0283476 A1* | 9/2023 | Streit | H04W 12/06 713/186 |

OTHER PUBLICATIONS

N.K.Ratha,et al., "Enhancing security and privacy in biometrics-based authentication systems", IBM Systems Journal 40(3),614-634,2001.

Farooq, F. et al., "Anonymous and Revocable Fingerprint Recognition", 2007 IEEE Conference on Computer Vision and Pattern Recognition, 2007, pp. 1-7.

* cited by examiner

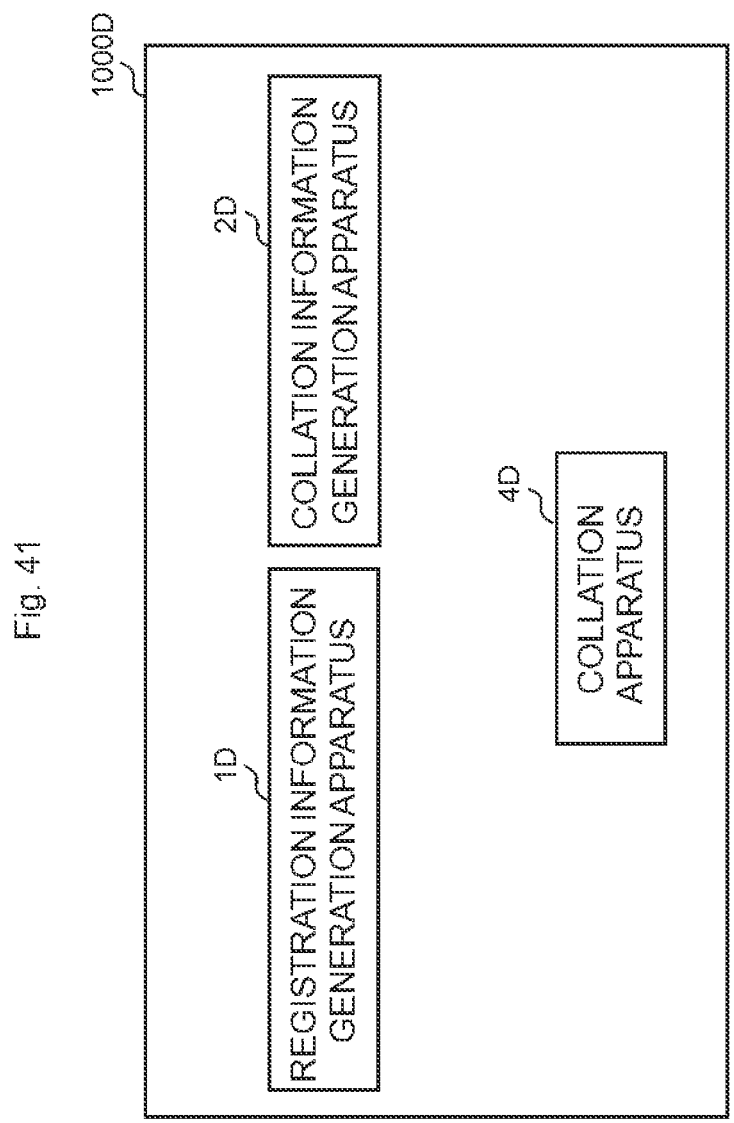

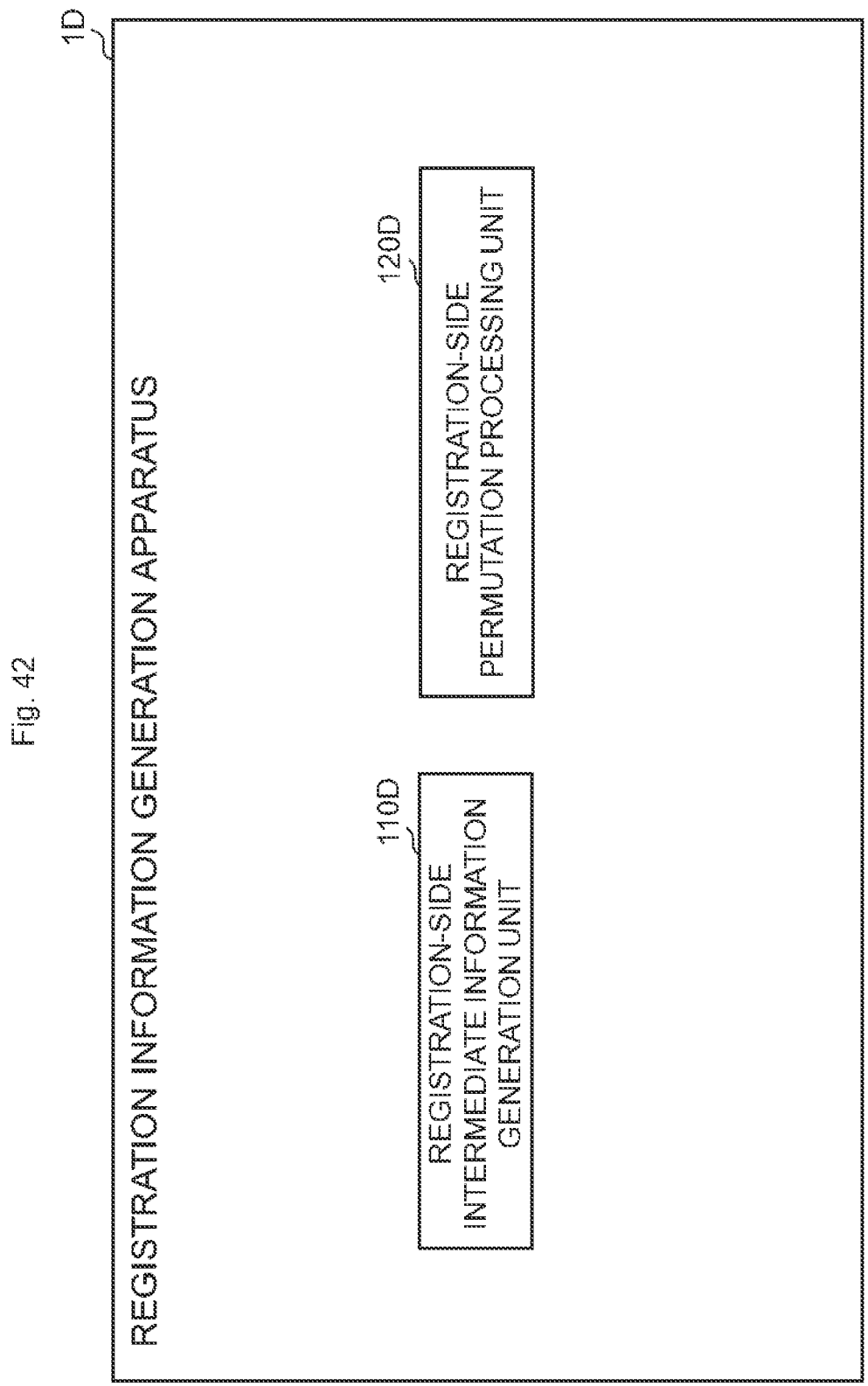

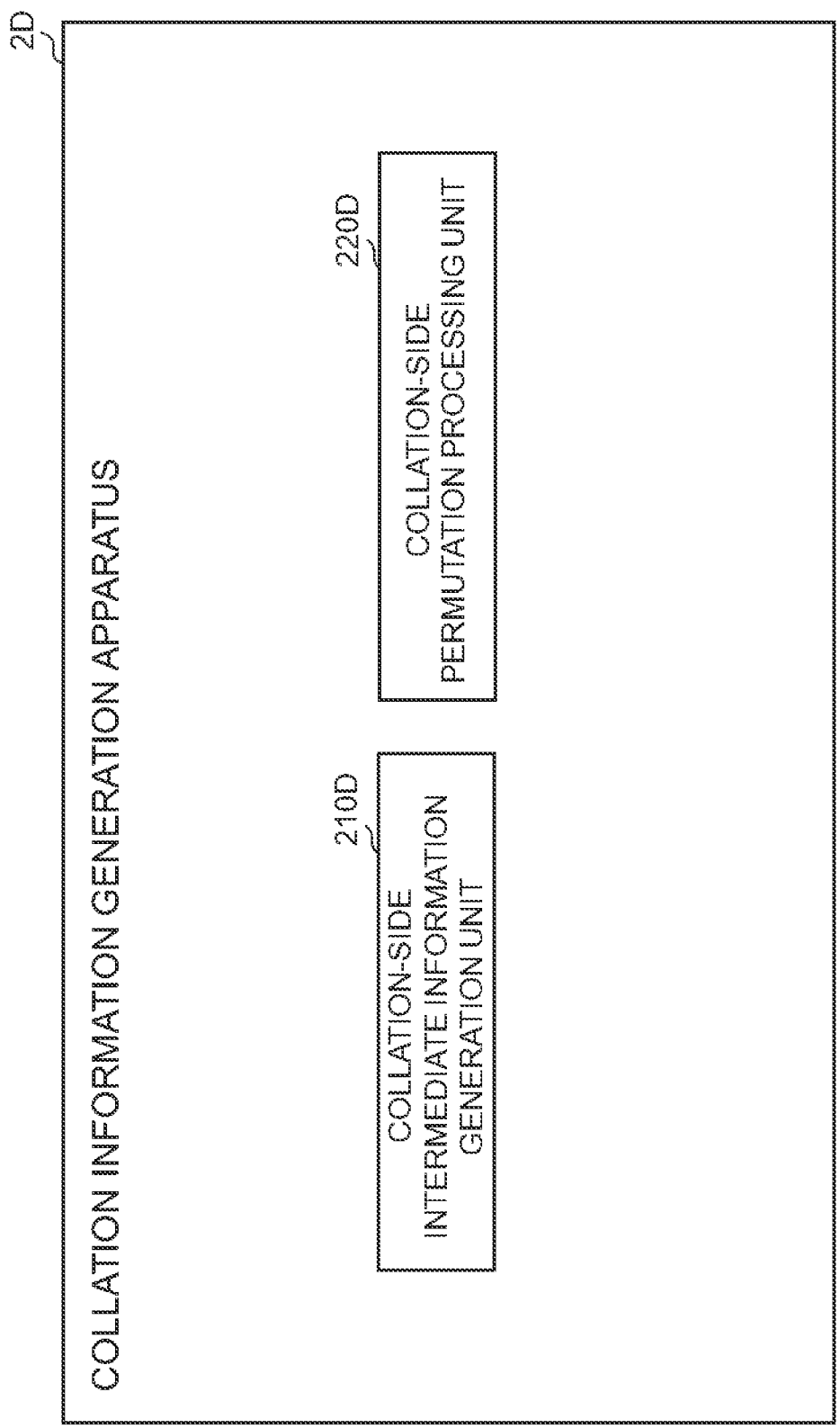

SYSTEM FOR CANCELABLE BIOMETRIC FEATURE DATA GENERATION

This application is a National Stage Entry of PCT/JP2021/020073 filed on May 26, 2021, the contents of all of which are incorporated herein by reference, in their entirety.

TECHNICAL FIELD

The present invention relates to a registration information generation apparatus, a collation information generation apparatus, a collation system, a registration information generation method, a collation information generation method, a similarity calculation method, a registration information generation program, and a collation information generation program.

BACKGROUND ART

In recent years, a biometric authentication technology, which performs authentication by collating biometric information such as fingerprints, veins, irises, and facial images, is widely used as one of user authentication schemes. In such a biometric authentication technology, features are extracted from biometric information on users and stored as registration information. The authentication is determined by performing collation between features of biometric information input from a user for authentication and the registration information.

The biometric authentication technology has the advantage of being less vulnerable to loss and theft than authentication technologies using IC cards, etc. On the other hand, biometric information cannot be discarded or updated even in the case in which the biometric information is compromised. In other words, the leakage of biometric information leads to not only a problem related to personal information on a living body of which the biometric information is compromised, but also a problem impairing the security of an authentication system that uses the compromised biometric information on the living body.

For solving the above problems, a technology called "cancelable biometrics", which enables invalidation of registration information, has been proposed to protect biometric information on users.

In the cancelable biometrics, elements in features extracted from biometric information are reordered using a secret key to encrypt them, thereby generating registration information. In addition, elements in features extracted from biometric information input at the time of authentication are encrypted using the same secret key used at the time of registration to generate collation information. In other words, when regenerating the registration information, the use of a different secret key allows to invalidate the registration information that has been already generated. Encryption in the cancelable biometrics is referred to as "cancelable transformation" because of such characteristics of the registration information. For example, NPL 1 proposes, as the cancelable transformation, a method for generating registration information and collation information by dividing an image including feature points obtained from fingerprints, etc. into blocks, and then rearranging the order of the divided blocks using a secret key.

CITATION LIST

Non Patent Literature

[NPL 1] N. K. Ratha, et al., "Enhancing security and privacy in biometrics-based authentication systems", IBM Systems Journal 40(3), 614-634, 2001.

SUMMARY

Technical Problem

In the above-mentioned related cancelable transformation, the same secret key is used at both the time of registration and the time of collation to transform the elements in the features extracted from the biometric information. Therefore, in order to reduce the risk of leakage of biometric information, it is desirable to collate the collation information with the registration information in a state in which the cancelable transformation has been performed. It is also desirable to perform the cancelable transformation such that the accuracy for collation is as good as that of the above-mentioned related biometric authentication technology when collating the collation information with the registration information.

In light of the problem described above, an example object of the present invention is to provide a registration information generation apparatus, a collation information generation apparatus, a collation system, a registration information generation method, a collation information generation method, a similarity calculation method, a registration information generation program, and a collation information generation program that can perform cancelable transformation capable of suppressing the degradation of collation accuracy and reducing the risk of information leakage.

Solution to Problem

A registration information generation apparatus according to the present invention is an apparatus for generating registration information based on registration-side input information input for registration, the registration-side input information including one or both of elements corresponding to a first set and elements corresponding to a second set that is different from the first set. The registration information generation apparatus includes a registration-side intermediate information generation unit configured to generate registration-side intermediate information from the registration-side input information by performing registration-side distribution processing for performing secret-sharing for the elements corresponding to the first set in input information, and a registration-side duplication processing for duplicating the elements corresponding to the second set in input information; and a registration-side permutation processing unit configured to perform registration-side permutation processing for permutating a sort order of elements in input information using a permutation key, in which the registration information is generated by permutating a sort order of elements in the registration-side intermediate information using the permutation key.

A registration information generation apparatus according to the present invention is an apparatus for generating registration information based on registration-side input information input for registration. The registration information generation apparatus includes a distribution processing unit configured to generate secret-sharing information from the registration-side input information by performing distribution processing for performing secret-sharing for elements in input information; and a registration-side permutation processing unit configured to perform registration-side permutation processing for permutating a sort order of elements in input information using a permutation key, in which the registration information is generated by permutating a sort order of elements in the secret-sharing information using the permutation key.

A collation information generation apparatus according to the present invention is an apparatus for generating collation information based on collation-side input information input for collation, the collation-side input information including one or both of elements corresponding to a first set, and elements corresponding to a second set that is different from the first set. The collation information generation apparatus includes a collation-side intermediate information generation unit configured to generate collation-side intermediate information from the collation-side input information by performing collation-side duplication processing for duplicating the elements corresponding to the first set in input information, and collation-side distribution processing for performing secret-sharing for the elements corresponding to the second set in input information; and a collation-side permutation processing unit configured to perform collation-side permutation processing for permutating a sort order of elements in input information using a permutation key, in which the collation information is generated by permutating a sort order of elements in the collation-side intermediate information using the permutation key.

A collation information generation apparatus according to the present invention is an apparatus for generating collation information based on collation-side input information input for collation. The collation information generation apparatus includes a duplication processing unit configured to generate duplicated information from the collation-side input information by performing duplication processing for duplicating elements in input information, and a collation-side permutation processing unit configured to perform collation-side permutation processing for permutating a sort order of elements in input information using a permutation key, in which the collation information is generated by permutating a sort order of elements in the duplicated information using the permutation key.

A collation system according to the present invention includes a registration information generation apparatus for generating registration information based on registration-side input information input for registration, a collation information generation apparatus for generating collation information based on collation-side input information input for collation, and a collation apparatus for performing collation between the registration-side input information and the collation-side input information. The registration-side input information includes one or both of elements corresponding to a first set and elements corresponding to a second set that is different from the first set. The registration information generation apparatus includes a registration-side intermediate information generation unit configured to generate registration-side intermediate information from the registration-side input information by performing registration-side distribution processing for performing secret-sharing for the elements corresponding to the first set in input information, and a registration-side duplication processing for duplicating the elements corresponding to the second set in input information, and a registration-side permutation processing unit configured to perform registration-side permutation processing for permutating a sort order of elements in input information using a permutation key. The collation information generation apparatus includes a collation-side intermediate information generation unit configured to generate collation-side intermediate information from the collation-side input information by performing collation-side duplication processing for duplicating the elements corresponding to the first set in input information, and collation-side distribution processing for performing secret-sharing for the elements corresponding to the second set in input information, and a collation-side permutation processing unit configured to perform collation-side permutation processing for permutating a sort order of elements in input information using the permutation key. The collation apparatus includes a similarity calculation unit configured to calculate a similarity between the registration-side input information and the collation-side input information based on the registration information and the collation information. The registration information is generated by permutating a sort order of elements in the registration-side intermediate information using the permutation key. The collation information is generated by permutating a sort order of elements in the collation-side intermediate information using the permutation key.

A collation system according to the present invention includes a registration information generation apparatus for generating registration information based on registration-side input information input for registration, a collation information generation apparatus for generating collation information based on collation-side input information input for collation, and a collation apparatus for performing collation between the registration-side input information and the collation-side input information. The registration information generation apparatus includes a distribution processing unit configured to generate distributed information from the registration-side input information by performing distribution processing for performing secret-sharing for elements in input information, and a registration-side permutation processing unit configured to perform registration-side permutation processing for permutating a sort order of elements in input information using a permutation key. The collation information generation apparatus includes a duplication processing unit configured to generate duplicated information from the collation-side input information by performing duplication processing for duplicating elements in input information, and a collation-side permutation processing unit configured to perform collation-side permutation processing for permutating a sort order of elements in input information using the permutation key. The collation apparatus includes a similarity calculation unit configured to calculate a similarity between the registration-side input information and the collation-side input information based on the registration information and the collation information. The registration information is generated by permutating a sort order of elements in the distributed information using the permutation key. The collation information is generated by permutating a sort order of elements in the duplicated information using the permutation key.

A registration information generation method according to the present invention is a method for generating registration information based on registration-side input information input for registration, the registration-side input information including one or both of elements corresponding to a first set and elements corresponding to a second set that is different from the first set. The registration information generation method includes: generating registration-side intermediate information from the registration-side input information by performing registration-side distribution processing for performing secret-sharing for the elements corresponding to the first set in input information, and a registration-side duplication processing for duplicating the elements corresponding to the second set in input information; and performing registration-side permutation processing for permutating a sort order of elements in input information using a permutation key, in which the registration information is generated by permutating a sort order of elements in the registration-side intermediate information using the permutation key.

A registration information generation method according to the present invention is a method for generating registration information based on registration-side input information input for registration. The registration information generation method includes generating secret-sharing information from the registration-side input information by performing distribution processing for performing secret-sharing for elements in input information, and performing registration-side permutation processing for permutating a sort order of elements in input information using a permutation key, in which the registration information is generated by permutating a sort order of elements in the secret-sharing information using the permutation key.

A collation information generation method according to the present invention is a method for generating collation information based on collation-side input information input for collation, the collation-side input information including one or both of elements corresponding to a first set, and elements corresponding to a second set that is different from the first set. The collation information generation method includes: generating collation-side intermediate information from the collation-side input information by performing collation-side duplication processing for duplicating the elements corresponding to the first set in input information, and collation-side distribution processing for performing secret-sharing for the elements corresponding to the second set in input information; and performing collation-side permutation processing for permutating a sort order of elements in input information using a permutation key, in which the collation information is generated by permutating a sort order of elements in the collation-side intermediate information using the permutation key.

A collation information generation method according to the present invention is a method for generating collation information based on collation-side input information input for collation. The collation information generation method includes generating duplicated information from the collation-side input information by performing duplication processing for duplicating elements in input information, and performing collation-side permutation processing for permutating a sort order of elements in input information using a permutation key, in which the collation information is generated by permutating a sort order of elements in the duplicated information using the permutation key.

A similarity calculation method according to the present invention is a method in a collation system including a registration information generation apparatus configured to generate registration information based on registration-side input information input for registration, a collation information generation apparatus configured to generate collation information based on collation-side input information input for collation, and a collation apparatus configured to perform collation between the registration-side input information and the collation-side input information, the registration-side input information and the collation-side input information each including one or both of elements corresponding to a first set and elements corresponding to a second set that is different from the first set. The similarity calculation method includes, in the registration information generation apparatus, generating registration-side intermediate information from the registration-side input information by performing registration-side distribution processing for performing secret-sharing for the elements corresponding to the first set in input information, and a registration-side duplication processing for duplicating the elements corresponding to the second set in input information, performing registration-side permutation processing for permutating a sort order of elements in input information using a permutation key, and generating the registration information by permutating a sort order of elements in the registration-side intermediate information using the permutation key. The similarity calculation method further includes, in the collation information generation apparatus, generating collation-side intermediate information from the collation-side input information by performing collation-side duplication processing for duplicating the elements corresponding to the first set in input information, and collation-side distribution processing for performing secret-sharing for the elements corresponding to the second set in input information, performing collation-side permutation processing for permutating a sort order of elements input information using the permutation key, and generating the collation information by permutating a sort order of elements in the collation-side intermediate information using the permutation key. The similarity calculation method further comprises, in the collation apparatus, calculating a similarity between the registration-side input information and the collation-side input information based on the registration information and the collation information.

A similarity calculation method according to the present invention is a method in a collation system including a registration information generation apparatus configured to generate registration information based on registration-side input information input for registration, a collation information generation apparatus configured to generate collation information based on collation-side input information input for collation, and a collation apparatus configured to perform collation between the registration-side input information and the collation-side input information. The similarity calculation method includes, in the registration information generation apparatus, generating distributed information from the registration-side input information by performing distribution processing for performing secret-sharing for elements in input information, performing registration-side permutation processing for permutating a sort order of elements in input information using a permutation key, and generating the registration information by permutating a sort order of elements in the distributed information using the permutation key. The similarity calculation method includes, in the collation information generation apparatus, generating duplicated information from the collation-side input information by performing duplication processing for duplicating elements in input information, performing collation-side permutation processing for permutating a sort order of elements in input information using the permutation key, and generating the collation information by permutating a sort order of elements in the duplicated information using the permutation key. The similarity calculation method comprises, in the collation apparatus, calculating a similarity between the registration-side input information and the collation-side input information based on the registration information and the collation information.

A registration information generation program according to the present invention is a program for generating registration information based on registration-side input information input for registration, the registration-side input information including one or both of elements corresponding to a first set and elements corresponding to a second set that is different from the first set. The registration information generation program causes a computer to execute: generating registration-side intermediate information from the registration-side input information by performing registration-side distribution processing for performing secret-sharing for the elements corresponding to the first set in input information, and a registration-side duplication processing for duplicating the elements corresponding to the second set in input information; and performing registration-side permutation processing for permutating a sort order of elements in input information using a permutation key, in which the registration information is generated by permutating a sort order of elements in the registration-side intermediate information using the permutation key.

A registration information generation program according to the present invention is a program for generating registration information based on registration-side input information input for registration. The registration information generation program causes a computer to execute generating secret-sharing information from the registration-side input information by performing distribution processing for performing secret-sharing for elements in input information, and performing registration-side permutation processing for permutating a sort order of elements in input information using a permutation key, in which the registration information is generated by permutating a sort order of elements in the secret-sharing information using the permutation key.

A collation information generation program according to the present invention is a program for generating collation information based on collation-side input information input for collation, the collation-side input information including one or both of elements corresponding to a first set, and elements corresponding to a second set that is different from the first set. The registration information generation program causes a computer to execute: generating collation-side intermediate information from the collation-side input information by performing collation-side duplication processing for duplicating the elements corresponding to the first set in input information, and collation-side distribution processing for performing secret-sharing for the elements corresponding to the second set in input information; and performing collation-side permutation processing for permutating a sort order of elements in input information using a permutation key, in which the collation information is generated by permutating a sort order of elements in the collation-side intermediate information using the permutation key.

A collation information generation program according to the present invention is a program for generating collation information based on collation-side input information input for collation. The registration information generation program causes a computer to execute: generating duplicated information from the collation-side input information by performing duplication processing for duplicating elements in input information; and performing collation-side permutation processing for permutating a sort order of elements in input information using a permutation key, in which the collation information is generated by permutating a sort order of elements in the duplicated information using the permutation key.

Advantageous Effects of Invention

The present invention provides the registration information generation apparatus, the collation information generation apparatus, a collation system, the registration information generation method, the collation information generation method, the similarity calculation method, the registration information generation program, and the collation information generation program that can perform cancelable transformation capable of suppressing the degradation of collation accuracy and reducing the risk of information leakage. Note that, according to the present invention, instead of or together with the above effects, other effects may be exerted.

BRIEF DESCRIPTION OF THE DRAWINGS

FIG. 41 is a block diagram illustrating an example of a schematic configuration of a collation system according to a sixth example embodiment;

FIG. 42 is a block diagram illustrating an example of a schematic configuration of a registration information generation apparatus according to the sixth example embodiment; and FIG. 43 is a block diagram illustrating an example of a schematic configuration of a collation information generation apparatus according to the sixth example embodiment.

DESCRIPTION OF THE EXAMPLE EMBODIMENTS

Figure 1:
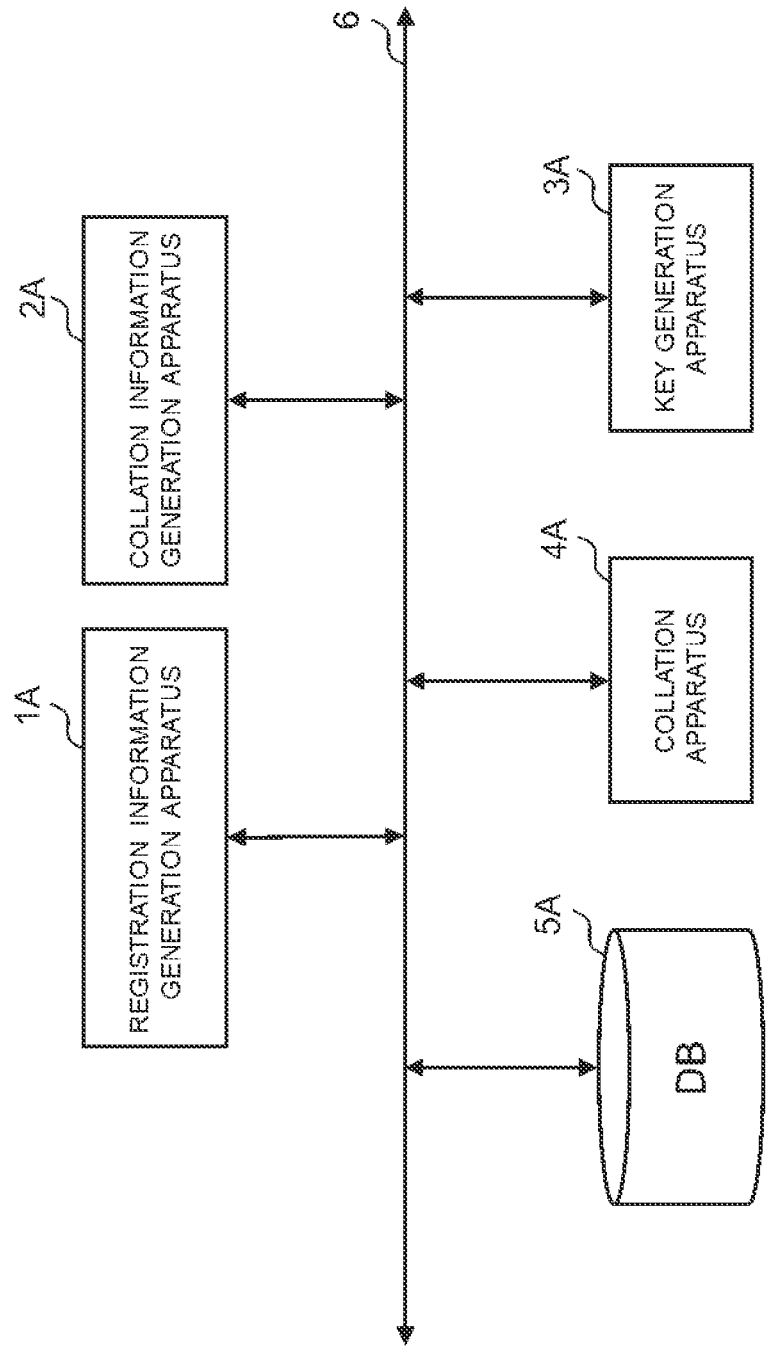
FIG. 1 is a diagram illustrating an example operation embodiment of a collation system according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Each example embodiment described below is merely an example for configurations for enabling implementation of the present invention. Each example embodiment described below can be modified or changed as appropriate according to configurations and various conditions of an apparatus to which the present invention is applied. Not necessarily all of the combinations of elements included in each example embodiment described below are essential for implementation of the present invention, and a part of the elements can be omitted as appropriate. Thus, the scope of the present invention is not limited to the configurations described in each example embodiment described below. Configurations obtained by combining a plurality of configurations described in the example embodiments can also be adopted as far as there is no inconsistency.

Descriptions will be given in the following order.
1. Overview of Example Embodiments of Present Invention
2. First Example Embodiment
   2.1. Overview of Example Operation Embodiment of Collation System
   2.2. Hardware Configuration of Information Processing Apparatus
   2.3. Overview of Cancelable Biometrics
   2.4. Functional Configuration of Registration Information Generation Apparatus
   2.5. Functional Configuration of Collation Information Generation Apparatus
   2.6. Functional Configuration of Key Generation Apparatus
   2.7. Functional Configuration of Collation Apparatus
   2.8. Flow of Processing of Generating Registration Information
   2.9. Flow of Processing of Generating Collation Information
   2.10. Flow of Processing of Calculating Similarity
   2.11. Example Alternations of Registration Information Generation Apparatus and Collation Information Generation Apparatus 3. Second Example Embodiment
   3.1. Flow of Processing of Generating Registration Information
   3.2. Flow of Processing of Generating Collation Information
   3.3. Calculation of Similarity in Second Example Embodiment
4. Third Example Embodiment
   4.1. Overview of Example Operation Embodiment of Collation System
   4.2. Functional Configuration of Registration Information Generation Apparatus
   4.3. Functional Configuration of Collation Information Generation Apparatus
   4.4. Functional Configuration of Key Generation Apparatus
   4.5. Functional Configuration of Collation Apparatus
   4.6. Flow of Processing of Generating Registration Information
   4.7. Flow of Processing of Generating Collation Information
   4.8. Flow of Processing of Calculating Similarity
   4.9. Example Alternations of Registration Information Generation Apparatus and Collation Information Generation Apparatus
5. Fourth Example Embodiment
   5.1. Flow of Processing of Generating Registration Information
   5.2. Flow of Processing of Generating Collation Information
   5.3. Flow of Processing of Calculating Similarity
6. Application to Euclidean Distance
7. Fifth Example Embodiment
8. Sixth Example Embodiment
9. Other Example Embodiments 1. Overview of Example Embodiments of Present Invention First, an overview of example embodiments of the present invention will be described.

(1) Technical Issues

In recent years, a biometric authentication technology, which performs authentication by collating biometric information such as fingerprints, veins, irises, and facial images, is widely used as one of user authentication schemes. In such a biometric authentication technology, features are extracted from biometric information on users and stored as registration information. The authentication is determined by performing collation between features of biometric information input from a user for authentication and the registration information.

The biometric authentication technology has the advantage of being less vulnerable to loss and theft than authentication technologies using IC cards, etc. On the other hand, biometric information cannot be discarded or updated even in the case in which the biometric information is compromised. In other words, the leakage of biometric information leads to not only a problem related to personal information on a living body of which the biometric information is compromised, but also a problem impairing the security of an authentication system that uses the compromised biometric information on the living body.

For solving the above problems, a technology called "cancelable biometrics", which enables invalidation of registration information, has been proposed to protect biometric information on users.

In the cancelable biometrics, elements in features extracted from biometric information are reordered using a secret key to encrypt them, thereby generating registration information. In addition, elements in features extracted from biometric information input at the time of authentication are encrypted using the same secret key used at the time of registration to generate collation information. In other words, when regenerating the registration information, the use of a different secret key allows to invalidate the registration information which has been already generated. Encryption in the cancelable biometrics is referred to as "cancelable transformation" because of such characteristics of the registration information. For example, there has been proposed, as the cancelable transformation, a method for generating registration information and collation information by dividing an image including feature points obtained from fingerprints, etc. into blocks, and then rearranging the order of the divided blocks using a secret key.

As mentioned above, in the cancelable transformation, the same secret key is used at both the time of registration and the time of collation to transform the elements in the features extracted from the biometric information. Therefore, in order to reduce the risk of leakage of biometric information, it is desirable to collate the collation information with the registration information in a state in which the cancelable transformation has been performed. It is also desirable to perform the cancelable transformation such that the accuracy for collation is as good as that of the above-mentioned related biometric authentication technology when collating the collation information with the registration information.

In light of the problem described above, the present example embodiment provides a registration information generation apparatus, a collation information generation apparatus, a collation system, a registration information generation method, a collation information generation method, a similarity calculation method, a registration information generation program, and a collation information generation program that can perform cancelable transformation capable of suppressing the degradation of collation accuracy and reducing the risk of information leakage.

(2) Technical Features

In an example embodiment of the present invention, there is provided a registration information generation apparatus for generating registration information based on registration-side input information input for registration, the registration-side input information including one or both of elements corresponding to a first set, and elements corresponding to a second set that is different from the first set. The registration information generation apparatus includes a registration-side intermediate information generation unit configured to generate registration-side intermediate information from the registration-side input information by performing registration-side distribution processing for performing secret-sharing for the elements corresponding to the first set in input information, and a registration-side duplication processing for duplicating the elements corresponding to the second set in input information; and a registration-side permutation processing unit configured to perform registration-side permutation processing for permutating a sort order of elements in input information using a permutation key, in which the registration information is generated by permutating a sort order of elements in the registration-side intermediate information using the permutation key.

In another example embodiment of the present invention, there is provided a registration information generation apparatus for generating registration information based on registration-side input information input for registration. The registration information generation apparatus includes a distribution processing unit configured to generate secret-sharing information from the registration-side input information by performing distribution processing for performing secret-sharing for elements in input information, and a registration-side permutation processing unit configured to perform registration-side permutation processing for permutating a sort order of elements in input information using a permutation key, in which the registration information is generated by permutating a sort order of elements in the secret-sharing information using the permutation key.

The above configurations can provide a registration information generation apparatus, a collation information generation apparatus, a collation system, a registration information generation method, a collation information generation method, a similarity calculation method, a registration information generation program, and a collation information generation program that can perform cancelable transformation capable of suppressing the degradation of collation accuracy and reducing the risk of information leakage. The technical features described above are specific example embodiments of the present invention, and naturally, example embodiments of the present invention are not limited to the technical features described above.

2. First Example Embodiment

Next, with reference to FIGS. 1 to 15, a first example embodiment of the present invention will be described. In the present example embodiment, a collation system using biometric information on users such as fingerprints, veins, irises, facial images, and the like will be described.

<2.1. Overview of Example Operation Embodiment of Collation System>

FIG. 1 is a diagram illustrating an example operation embodiment of a collation system 1000A according to the first example embodiment of the present invention. As illustrated in FIG. 1, the collation system 1000A includes a registration information generation apparatus 1A, a collation information generation apparatus 2A, a key generation apparatus 3A, a collation apparatus 4A, and a Data Base (hereinafter sometimes referred to as "DB") 5A, and these are connected via a network 6.

The registration information generation apparatus 1A is an information processing apparatus, such as a computer or server, on which a program for generating, from biometric information on a user, registration information for registration in the collation system 1000A is installed. The registration information generation apparatus TA may be implemented, for example, by a portable information processing terminal such as a smartphone, an Automatic Teller Machine (ATM), or a Personal Computer (PC) connected to a sensor for detecting the biometric information. Details of processing of generating the registration information in the registration information generation apparatus 1A will be described later.

The collation information generation apparatus 2A is an information processing apparatus, such as a computer or server, on which a program for generating, from biometric information on a user, collation information for collating with the registration information registered in the collation system 1000A is installed. The collation information generation apparatus 2A may be implemented, for example, by a portable information processing terminal such as a smartphone, an ATM, or a PC connected to a sensor for detecting the biometric information. Details of processing of generating the collation information in the collation information generation apparatus 2A will be described later.

The key generation apparatus 3A is an information processing apparatus for generating a secret key to be used in transforming biometric information on a user into the registration information or the collation information. The key generation apparatus 3A generates, for example, random numbers, mask arrays, and permutation keys as secret keys. The key generation apparatus 3A transmits the generated secret keys to the registration information generation apparatus 1A and the collation information generation apparatus 2A via the network 6.

The collation apparatus 4A is an information processing apparatus for performing collation between the collation information and the registration information. For example, in a biometric authentication technology, the collation apparatus 4A collates features in biometric information on a user, which is input for authentication, with features in biometric information on the user, which has been stored as the registration information. The collation system 1000A may authenticate the user identified by the collation information based on a result of the collation between the collation information and the registration information.

The DB 5A is a storage medium that stores the registration information generated by the registration information generation apparatus 1A. The collation apparatus 4A collates the collation information with the registration information stored in the DB 5A. Although FIG. 1 illustrates the collation apparatus 4A and the DB 5A as separated elements, the DB 5A may be implemented in a storage medium such as a hard disk drive (HDD) included in the collation apparatus 4A.

Although FIG. 1 illustrates an example in which the registration information generation apparatus 1A and the collation information generation apparatus 2A are connected to the network 6, they do not need to be connected to the network 6. For example, the registration information generation apparatus 1A or the collation information generation apparatus 2A may be connected to the key generation apparatus 3A, the collation apparatus 4A, and the DB 5A by using a Universal Serial Bus (USB) or the like. The registration information generation apparatus 1A may be connected to the DB 5A when transmitting the registration information to the DB 5A. Further, the collation information generation apparatus 2A may be connected to the collation apparatus 4A when transmitting the collation information. Furthermore, the key generation apparatus 3A may be connected to the registration information generation apparatus 1A or the collation information generation apparatus 2A when transmitting a secret key.

<2.2. Hardware Configuration of Information Processing Apparatus>

Figure 2:
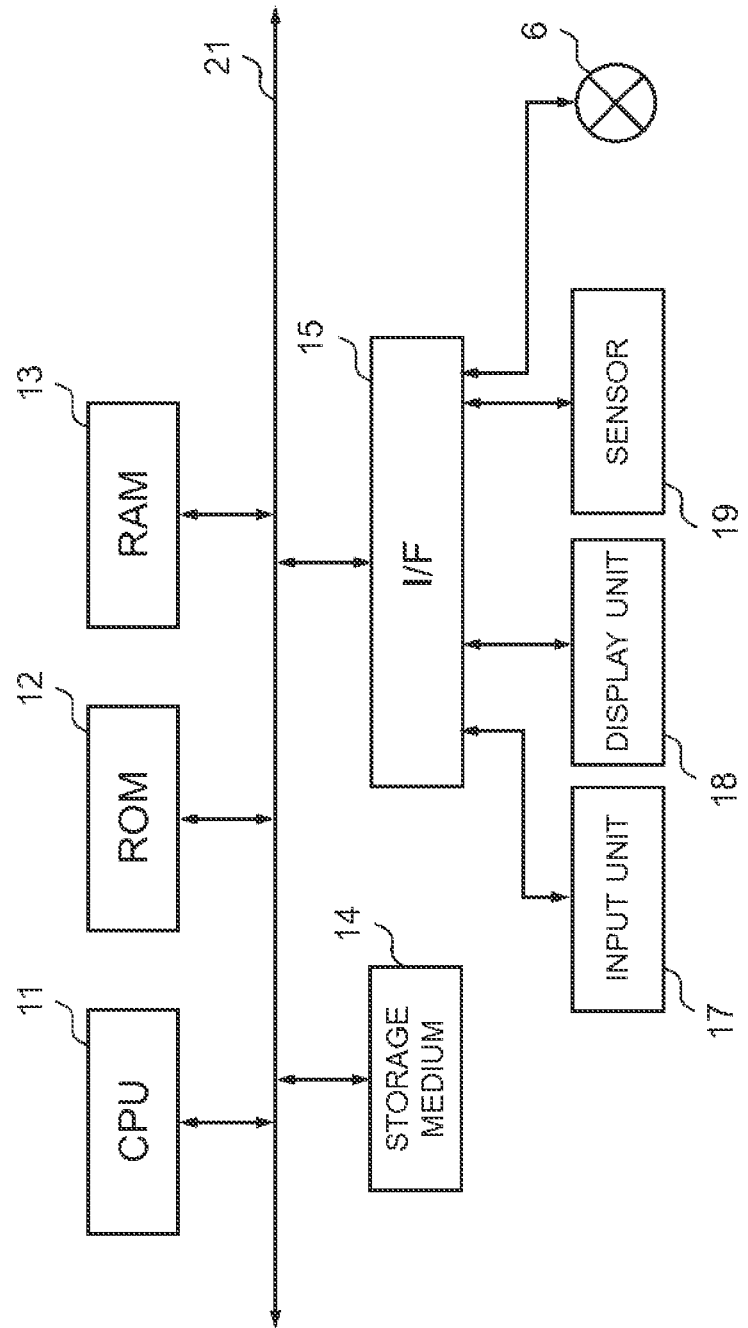
FIG. 2 is a block diagram illustrating an example of a hardware configuration of an information processing apparatus included in the collation system according to the first example embodiment.

Next, referring to FIG. 2, a hardware configuration of an information processing apparatus to be used for the registration information generation apparatus 1A, the collation information generation apparatus 2A, the key generation apparatus 3A, and the collation apparatus 4A according to the present example embodiment will be described. FIG. 2 is a block diagram illustrating a hardware configuration of the information processing apparatus.

The information processing apparatus includes a Central Processing Unit (CPU) 11, a Read Only Memory (ROM) 12, a Random Access Memory (RAM) 13, a storage medium 14, and an interface (I/F) 15, and they are connected with each other via a bus 21. In addition, an input unit 17, a display unit 18, a sensor 19, and the network 6 are connected to the I/F 15. The sensor 19 may be omitted in this configuration.

The CPU 11 is an arithmetic means, and controls the operation of the entire information processing apparatus. The RAM 13 is a volatile storage medium capable of reading and writing information at high speed, and is used as a work area when the CPU 11 processes information. The ROM 12 is a read-only nonvolatile storage medium and stores programs such as firmware therein. The storage medium 14 is a nonvolatile storage medium, such as an HDD, capable of reading and writing information, and stores therein information such as an operating system (OS), various control programs, and application programs.

The I/F 15 connects between the bus 21 and the constituent elements such as the various hardware devices and the network 6. The input unit 17 includes input devices such as a keyboard and a mouse for a user to input information into the information processing apparatus. The display unit 18 is a display device such as a liquid crystal display (LCD) for the user to check a status of the information processing apparatus. The input unit 17 and the display unit 18 may be omitted in this configuration.

The sensor 19 is a module for acquiring biometric information on a user, such as fingerprints, veins, and facial images. The sensor 19 may be omitted. In this configuration, the registration information generation apparatus 1A and the collation information generation apparatus 2A may acquire biometric information on a user via the network 6.

In such a hardware configuration, the CPU 11 of the registration information generation apparatus 1A performs calculations in accordance with a program stored in the ROM 12 of the registration information generation apparatus 1A, or a program loaded into the RAM 13 of the registration information generation apparatus 1A from the storage medium 14 of the registration information generation apparatus 1A, thereby to implement software control units of the registration information generation apparatus TA.

The combination of the software control units configured above and the hardware allows to implement functional blocks that can realize functions of a controller 100A (see FIG. 5) of the registration information generation apparatus 1A according to the present example embodiment.

In the hardware configuration described above, the CPU 11 of the collation information generation apparatus 2A performs calculations in accordance with a program stored in the ROM 12 of the collation information generation apparatus 2A, or a program loaded into the RAM 13 of the collation information generation apparatus 2A from the storage medium 14 of the collation information generation apparatus 2A, thereby to implement software control units of the collation information generation apparatus 2A.

The combination of the software control units configured above and the hardware allows to implement functional blocks that can realize functions of a controller 200A (see FIG. 6) of the collation information generation apparatus 2A according to the present example embodiment.

In the hardware configuration described above, the CPU 11 of the key generation apparatus 3A performs calculations in accordance with a program stored in the ROM 12 of the key generation apparatus 3A or a program loaded into the RAM 13 of the key generation apparatus 3A from the storage medium 14 of the key generation apparatus 3A, thereby to implement software control units of the key generation apparatus 3A.

The combination of the software control units configured above and the hardware allows to implement functional blocks that can realize functions of a controller 300A (see FIG. 7) of the key generation apparatus 3A according to the present example embodiment.

In the hardware configuration described above, the CPU 11 of the collation apparatus 4A performs calculations in accordance with a program stored in the ROM 12 of the collation apparatus 4A or a program loaded into the RAM 13 of the collation apparatus 4A from the storage medium 14 of the collation apparatus 4A, thereby to implement software control units of the collation apparatus 4A.

The combination of the software control units configured above and the hardware allows to implement functional blocks that can realize functions of a controller 400A (see FIG. 8) of the collation apparatus 4A according to the present example embodiment.

<2.3. Overview of Cancelable Biometrics>

Figure 3:
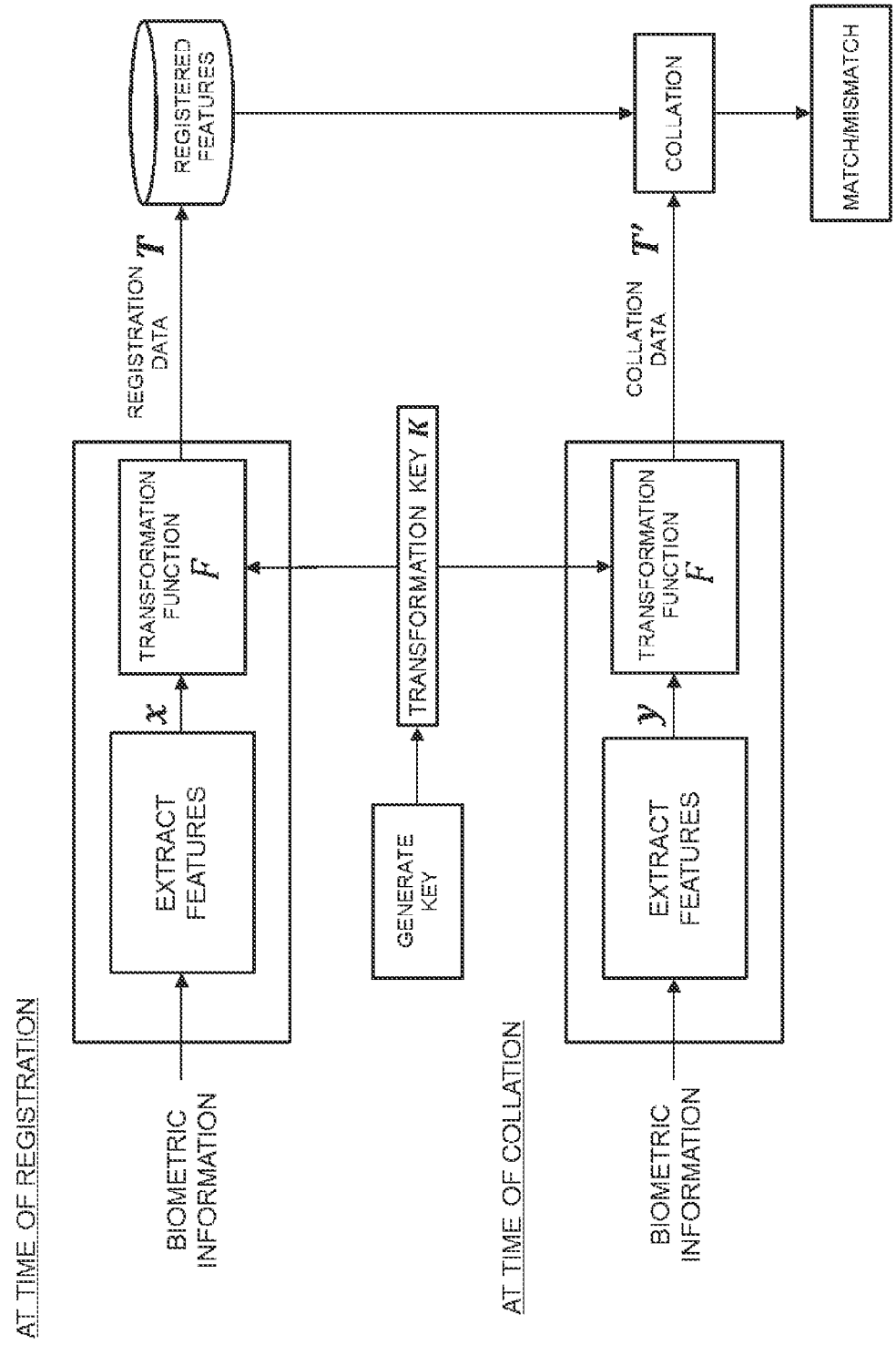
FIG. 3 is a diagram illustrating an overview of cancelable biometrics as a reference example.
Figure 4:
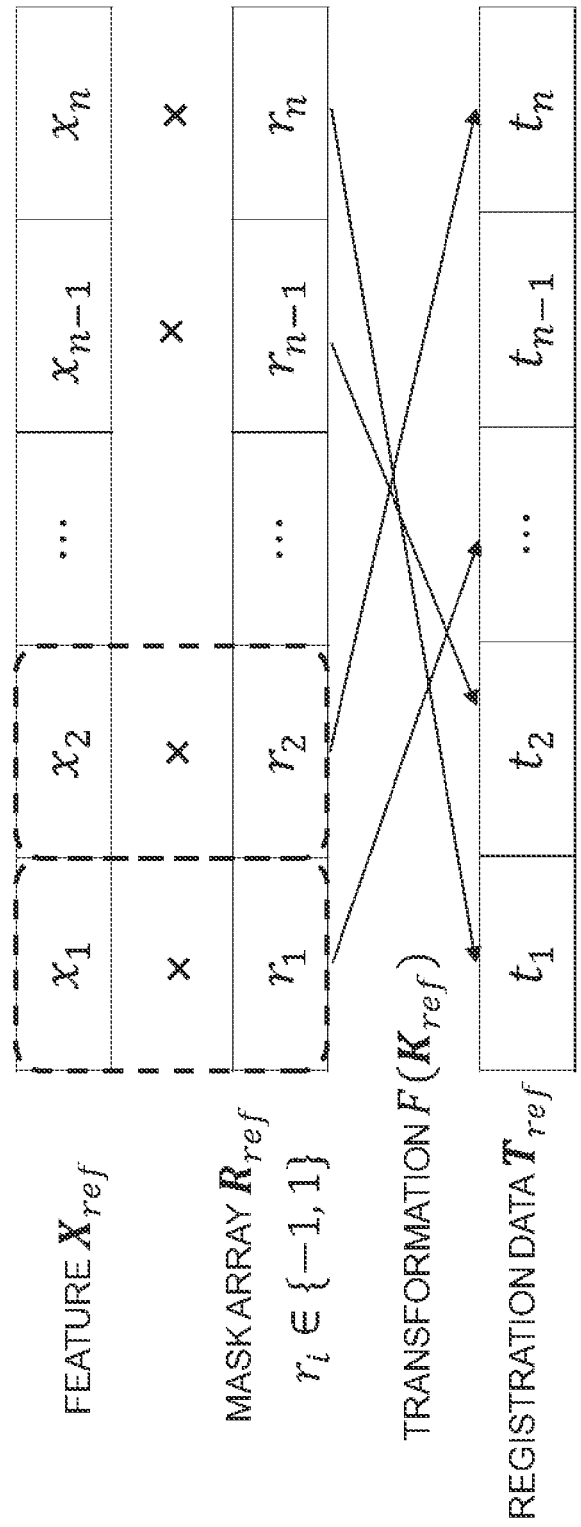
FIG. 4 is an explanation diagram for cancelable transformation as a reference example.

Next, referring to FIGS. 3 and 4, an overview of cancelable biometrics, which can invalidate the registration information, will be described. FIG. 3 is a diagram illustrating an overview of the cancelable biometrics. FIG. 4 is an explanation diagram for an information transformation algorithm in the cancelable biometrics.

In the biometric authentication technology, biometric information on users such as fingerprints, veins, irises, and facial images is registered in advance, and the authentication is determined based on a comparison result between the registered information and biometric information on a user which is input for personal authentication. However, the leakage of biometric information leads to not only a problem related to personal information on a living body of which the biometric information is compromised, but also a problem impairing the security of an authentication system that uses the compromised biometric information on the living body.

To solve the above problem, a technology called "cancelable biometrics" has been used to protect biometric information on users, in which authentication is performed using registration information in which the biometric information is kept secret, and even if the registration information is compromised, the compromised registration information can be invalidated.

Here, with reference to FIG. 3, an overview of the cancelable biometrics will be described. First, when biometric information is registered, features are extracted from the biometric information. Here, for the sake of explanation, it is assumed that feature data, which is represented as a vector below, is extracted from the biometric information.

$$x \qquad \text{[Math. 1]}$$

Hereinafter, the feature data x, which is a vector, may be simply referred to as "feature data x". Then, one-way transformation (see Expression 1-1) is performed on the feature data x, using a transformation key below.

$$K \qquad \text{[Math. 2]}$$

Hereinafter, the transformation key K, which is a vector, may be simply referred to as "transformation key K". In addition, registration data T, which is a vector, may be simply referred to as "registration data T". The transformation key K corresponds to a cryptographic key randomly generated by a key generation module. A transformation function F is a function for performing the one-way transformation (irreversible transformation) on input data (in this example, the feature data x).

[Math. 3]

$$T \leftarrow F_K(x) \qquad \text{(Expression 1-1)}$$

As shown in Expression 1-1, the registration data T corresponds to data obtained by transforming the feature data x through the transformation function F using the transformation key K. The registration data T is one of pieces of registration information to be used for collation, and is stored in a storage apparatus such as a database.

Next, processing for authentication will be described. When authentication is performed, features are extracted from biometric information. Here, for the sake of explanation, it is assumed that feature data, which is represented as a vector below, is extracted from biometric information input for authentication.

$$y \quad \text{[Math. 4]}$$

Hereinafter, the feature data y, which is a vector, may be simply referred to as "feature data y". Then, the one-way transformation is performed on the feature data y using the transformation key K (Expression 1-2). Hereinafter, collation data T', which is a vector, may be simply referred to as "collation data T'".

[Math. 5]

$$T' \leftarrow F_K(y) \quad \text{(Expression 1-2)}$$

As shown in (Expression 1-2), the collation data T' corresponds to data obtained by transforming the feature data y through the transformation function F using the same transformation key K as that used for the registration data T. The collation data T' corresponds to information to be collated against the registration data T. In the cancelable biometrics, information on the transformation key K is not required because the registration data T in which the feature data x is encrypted, and the collation data T' in which the feature data y is encrypted are collated in the respective encrypted states.

As shown in (Expression 1-1) and (Expression 1-2), in the cancelable biometrics, features are transformed through the transformation function F using the same transformation key K at the time of registration and at the time of authentication. In other words, in the case in which feature data x and feature data y close to the feature data x are extracted as biometric information from a fingerprint on a middle finger of a right hand of the same person, the feature data x and the feature data y which are close to each other are transformed, respectively, to generate registration data T and collation data T'. As a result, it is determined that the collation data T' matches with the registration data T.

Here, it is assumed that, for the same feature data x, a transformation key $$K_1 \quad \text{[Math. 6]}$$

and a transformation key $$K_2 \quad \text{[Math. 7]}$$

are used to perform transformation through the transformation function F. Hereinafter, the transformation key $K_1$, which is a vector, may be simply referred to as "transformation key $K_1$". In addition, the transformation key $K_2$, which is a vector, may be simply referred to as "transformation key $K_2$". Note that the transformation key $K_1 \neq$ the transformation key $K_2$. In this configuration, data $T_1$, which is a vector, is generated from the feature data x through the transformation function F using the transformation key $K_1$, and data $T_2$, which is a vector, is generated from the feature data x through the transformation function F using the transformation key $K_2$.

$$T_1 \leftarrow F_{K_1}(x) \quad \text{[Math. 8]}$$

$$T_2 \leftarrow F_{K_2}(x) \quad \text{[Math. 9]}$$

Hereinafter, the data $T_1$, which is a vector, may be simply referred to as "data $T_1$", and the data $T_2$, which is a vector, may be simply referred to as "data $T_2$".

As mentioned above, the transformation function F is a function for performing the one-way transformation on the input data. In other words, in the case of the transformation key $K_1 \neq$ the transformation key $K_2$, for the feature data x, the sort order of elements in the data $T_1$ output through the transformation function F using the transformation key $K_1$ is different from the sort order of elements in the data $T_2$ output through the transformation function F using the transformation key $K_2$. As mentioned above, the cancelable biometrics does not require information on the transformation keys $K_1$ and $K_2$ when collation is performed.

Then, when the data $T_2$ is collated with respect to the data $T_1$, it is determined that the data $T_1$ and the data $T_2$ do not match because those pieces of data cannot be identified as being generated from the feature data x, even though both the pieces of data are generated by transforming the feature data x.

In the above manner, the processing for the cancelable biometrics allows to generate the different pieces of data $T_1$ and $T_2$ by using the different transformation keys $K_1$ and $K_2$, respectively, for the same data. Using such characteristics, the cancelable biometrics allows to change the transformation key K thereby to invalidate the registration information stored in the database and the like. In the following description, the data transformation method in the cancelable biometrics may be referred to as "cancelable transformation".

Next, with reference to FIG. 4, application of the cancelable transformation to normalized correlation will be described. FIG. 4 is an explanation diagram illustrating a reference example of the cancelable transformation for normalized correlation.

In a face authentication technology using a face image of a user as biometric information, features extracted from the biometric information are represented by an n-dimensional vector below.

[Math. 10]

$$X_{ref} = (x_1, x_2, \ldots, x_{n-1}, x_n)$$

Hereinafter, the feature data $X_{ref}$, which is a vector, may be simply referred to as "feature data $X_{ref}$".

When generating registration information for face authentication from the feature data $X_{ref}$, first, for each dimensional element in the feature data $X_{ref}$, mask processing is performed by using a mask array below.

[Math. 11]

$$R_{ref} = (r_1, r_2, \ldots, r_{n-1}, r_n)$$

Hereinafter, the mask array $R_{ref}$, which is a vector, may be simply referred to as "mask array $R_{ref}$". In addition, each element in the mask array $R_{ref}$ is as follows.

$$r_i \in \{-1, 1\} \quad \text{[Math. 12]}$$

The positive or negative of each dimensional element in the feature data $X_{ref}$ can be converted by mask processing for multiplying each dimensional element in the feature data $X_{ref}$ by the mask array R. In the following explanation, the feature data $X_{ref}$ obtained through the mask processing for multiplying each dimensional element by the mask array R may be referred to as "positive/negative-converted feature data $X_{ref}$".

Then, the sort order of dimensional elements in the positive/negative-converted feature data $X_{ref}$ is reordered by a permutation function F using a permutation key below.

[Math. 13]

$K_{ref}$

Through the above reordering processing, registration data is generated as follows.

$$T_{ref} = (t_1, t_2, \ldots, t_{n-1}, t_n) \quad \text{[Math. 14]}$$

Hereinafter, the permutation key $K_{ref}$, which is a vector, may be simply referred to as "permutation key $K_{ref}$", and the registration data $T_{ref}$, which is an n-dimensional vector, may be simply referred to as "registration data $T_{ref}$". The registration data $T_{ref}$ corresponds to one example of pieces of registration information for face authentication collation. The permutation key $K_{ref}$ is a parameter that defines how to reorder elements in data, which is an n-dimensional vector.

Next, when generating collation information for collation in the face authentication, features extracted from biometric information to be used for collation are represented by feature data, which is an n-dimensional vector below.

[Math. 15]

$$Y_{ref} = (y_1, y_2, \ldots, y_{n-1}, y_n)$$

Hereinafter, the feature data $Y_{ref}$, which is a vector, may be simply referred to as "feature data $Y_{ref}$". For the feature data $Y_{ref}$, similarly to the feature data $X_{ref}$ at the time of registration, the positive/negative conversion R and the permutation function F using the permutation key $K_{ref}$ are applied to perform the processing. As a result, collation data below can be obtained from the feature data $Y_{ref}$.

[Math. 16]

$$T'_{ref} = (t'_1, t'_2, \ldots, t'_{n-1}, t'_n)$$

Hereinafter, the collation data $T'_{ref}$, which is an n-dimensional vector, may be simply referred to as "collation data $T'_{ref}$".

Then, a similarity between the feature data $X_{ref}$ and the feature data $Y_{ref}$ can be obtained by a normalized correlation between the feature data $X_{ref}$ and the feature data $Y_{ref}$ as follows.

$$d(X_{ref}, Y_{ref}) = \Sigma x_i y_i \quad \text{[Math. 17]}$$

A similarity between the registration data $T_{ref}$ and the collation data $T'_{ref}$ can also be obtained by a normalized correlation between the registration data $T_{ref}$ and the collation data $T'_{ref}$ as follows.

$$d(T_{ref}, T'_{ref}) = \Sigma t_i t'_i \quad \text{[Math. 18]}$$

In this configuration, for any positive integers i and j, the following expression is satisfied.

[Math. 19]

$$r_j \cdot r_j = 1 \text{ AND } t_i \cdot t'_i = r_j x_j \cdot r_j y_j = x_j \cdot y_j$$

Therefore, the following expression is obviously satisfied.

$$d(T_{ref}, T'_{ref}) = d(X_{ref}, Y_{ref}) \quad \text{[Math. 20]}$$

In other words, in collating in authentication using the registration data $T_{ref}$ and the collation data $T'_{ref}$, its collation accuracy can be obtained at the same level as the collation accuracy between the feature data $X_{ref}$ and the feature data $Y_{ref}$.

By the way, the so-called homomorphic encryption, in which calculations are performed with both programs and data being encrypted, is known as a method for performing secret calculations with secret information such as biometric information being encrypted. However, the homomorphic encryption, in which calculations are performed with both programs and data being encrypted, requires more calculation time than calculation processing in plain text, making it unsuitable for a system that requires high throughput. Compared to the homomorphic encryption, the cancelable biometrics is suitable for a system that requires high throughput because its processing load is low.

However, in an authentication system using the cancelable biometrics, one combination of the mask processing using the mask array $R_{ref}$ and the permutation key $K_{ref}$ is defined for one authentication system. Hence, if an attacker attempts to register "data that is close to the feature data X" below, there is a problem that the mask array $R_{ref}$ and the permutation key $K_{ref}$ may be compromised.

$$X^* = (1, \ldots, N) \quad \text{[Math. 21]}$$

It is assumed that, in the case in which the registration data $T_{ref}$ is leaked, using the same mask array $R_{ref}$ and permutation key $K_{ref}$ as when the registration data $T_{ref}$ was generated, registration data $T_{ref}2$ is generated from feature data $X_{ref}2$ for new biometric information of the same person pertaining to the registration data $T_{ref}$, and the registration data $T_{ref}2$ is registered in an authentication system.

In this case, since the feature data $X_{ref}$ pertaining to the registration data $T_{ref}$ and the feature data $X_{ref}2$ are close to each other, there is a problem that it is easy to perform the so-called spoofing act of collating with the registration data $T_{ref}2$ using the leaked registration data $T_{ref}$.

Furthermore, if the registration data $T_{ref}$ is compromised, the mask array $R_{ref}$ and the permutation key $K_{ref}$ have to be updated to ensure the security of the entire authentication system. In addition, the registration data $T_{ref}$ already registered in the authentication system has to be updated with registration information generated using a new mask array $R_{ref}$ and permutation key $K_{ref}$.

In light of the problem described above, the present example embodiment provides a registration information generation apparatus, a collation information generation apparatus, a collation system, a registration information generation method, a collation information generation method, a similarity calculation method, a registration information generation program, and a collation information generation program that can perform the cancelable transformation capable of suppressing the degradation of collation accuracy and reducing the risk of information leakage.

<2.4. Functional Configuration of Registration Information Generation Apparatus>

Figure 5:
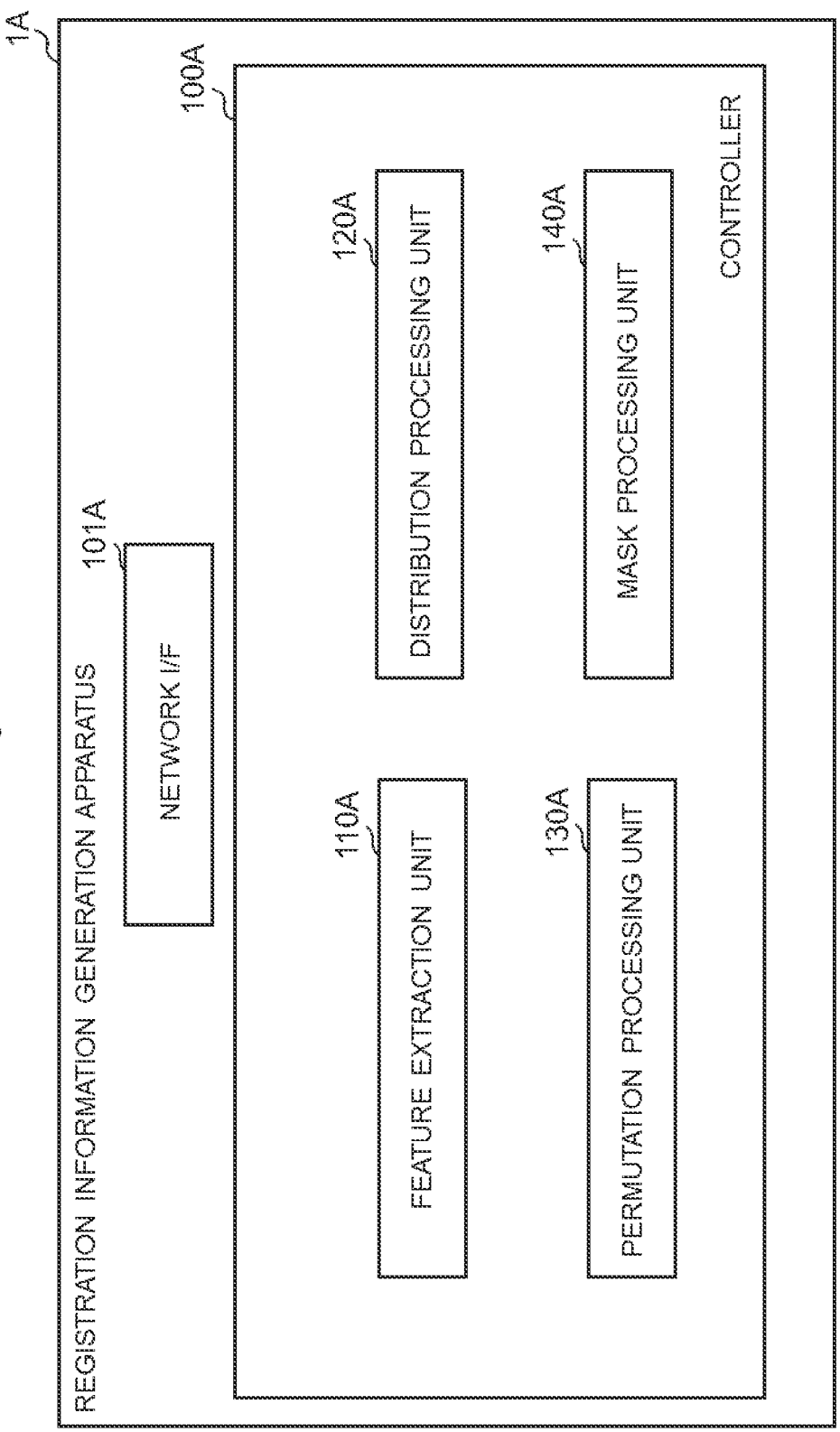
FIG. 5 is a functional block diagram illustrating a functional configuration of a registration information generation apparatus according to the first example embodiment.

Next, with reference to FIG. 5, a functional configuration of the registration information generation apparatus 1A will be described. FIG. 5 is a functional block diagram illustrating an example of a functional configuration of the registration information generation apparatus 1A. As illustrated in FIG. 5, the registration information generation apparatus 1A includes the controller 100A, and a network I/F 101A that is an interface for the controller 100A to exchange information with other devices via the network 6.

The controller 100A generates registration information to be used in the collation system 1000A from information acquired via the network I/F 101A. The registration information is one of pieces of information to be used for collating in the collation system 1000A. The registration information generated by the registration information generation apparatus 1A is stored in the DB 5A. The controller 100A is implemented by installing a dedicated software program in the information processing apparatus such as the registration information generation apparatus 1A. The controller 100A includes a feature extraction unit 110A, a distribution processing unit 120A, a permutation processing unit 130A, and a mask processing unit 140A.

For authentication, the feature extraction unit 110A extracts features from biometric information input to the controller 100A via the sensor 19 or the I/F 15 of the registration information generation apparatus 1A to generate feature data. In the present example embodiment, for example, feature data X, which is an n-dimensional vector, is generated from biometric information such as fingerprints, veins, irises, and face images.

The distribution processing unit 120A performs distribution processing for performing secret-sharing for elements in input information. Details of the distribution processing in the present example embodiment will be described later.

The permutation processing unit 130A performs permutation processing for permutating the arrangement of elements in input information based on a secret key such as the permutation key K. Details of the permutation processing in the present example embodiment will be described later.

The mask processing unit 140A performs mask processing for transforming elements in input information using a mask array. Details of the mask processing in the present example embodiment will be described later.

<2.5. Functional Configuration of Collation Information Generation Apparatus>

Figure 6:
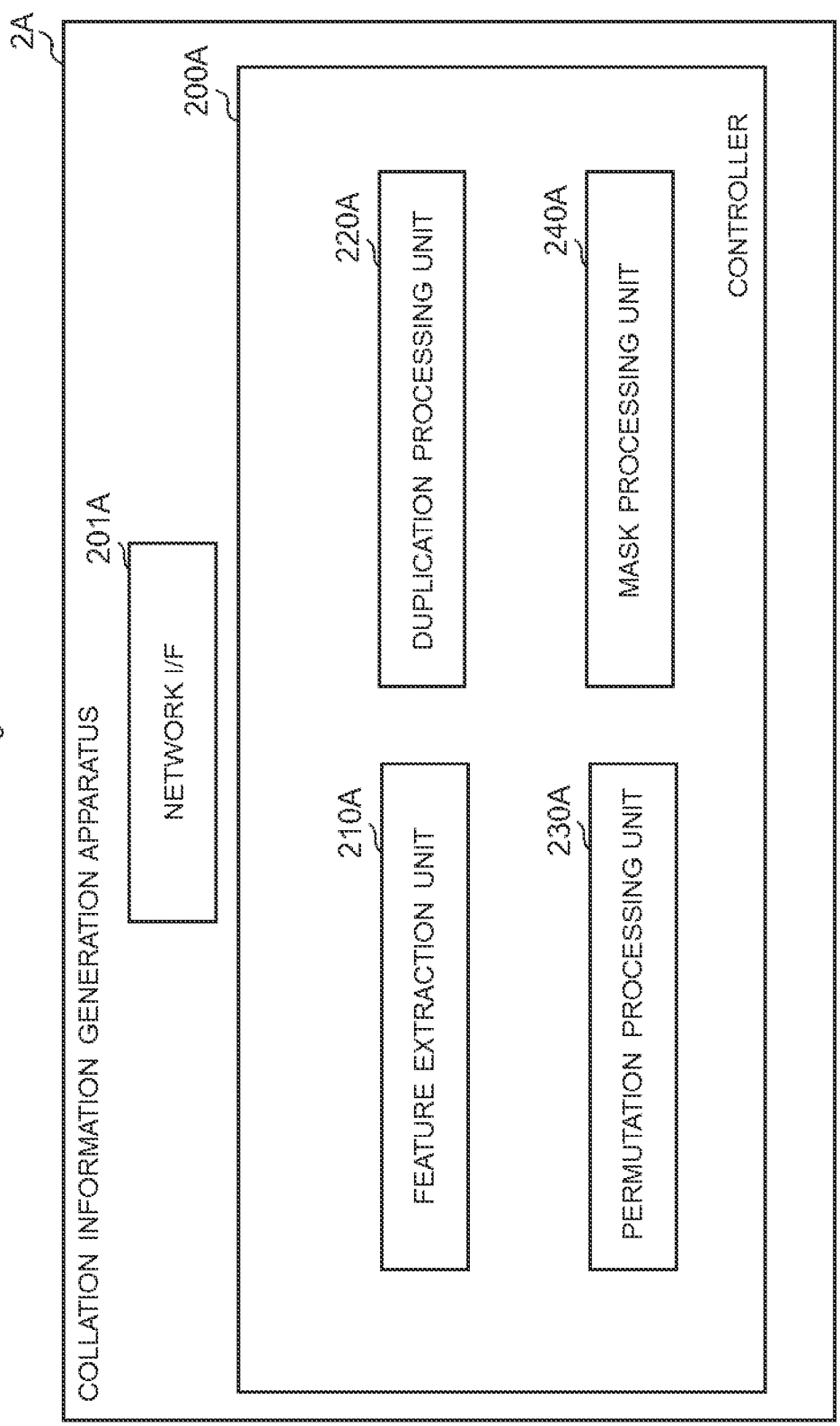
FIG. 6 is a functional block diagram illustrating an example of a functional configuration of a collation information generation apparatus according to the first example embodiment.

Next, with reference to FIG. 6, a functional configuration of the collation information generation apparatus 2A will be described. FIG. 6 is a functional block diagram illustrating an example of a functional configuration of the collation information generation apparatus 2A. As illustrated in FIG. 6, the collation information generation apparatus 2A includes the controller 200A, and a network I/F 201A that is an interface for the controller 200A to exchange information with other devices via the network 6.

The controller 200A generates collation information to be used in the collation system 1000A from information acquired via the network I/F 201A. The collation information is one of pieces of information to be used for collating in the collation system 1000A. The collation information generated by the collation information generation apparatus 2A is transmitted to the collation apparatus 4A. The controller 200A is implemented by installing a dedicated software program in the information processing apparatus such as the collation information generation apparatus 2A. The controller 200A includes a feature extraction unit 210A, a duplication processing unit 220A, a permutation processing unit 230A, and a mask processing unit 240A.

For authentication, the feature extraction unit 210A extracts features from biometric information input to the controller 200A via the sensor 19 or the I/F 15 of the collation information generation apparatus 2A. In the present example embodiment, for example, feature data Y, which is an n-dimensional vector, is extracted from biometric information such as fingerprints, veins, irises, and face images.

The duplication processing unit 220A performs duplication processing for duplicating elements in input information. Details of the duplication processing in the present example embodiment will be described later.

The permutation processing unit 230A performs permutation processing for permutating the arrangement of elements in input information based on a secret key such as the permutation key K. Details of the permutation processing in the present example embodiment will be described later.

The mask processing unit 240A performs mask processing for transforming elements in input information using a mask array. Details of the mask processing in the present example embodiment will be described later.

<2.6. Functional Configuration of Key Generation Apparatus>

Figure 7:
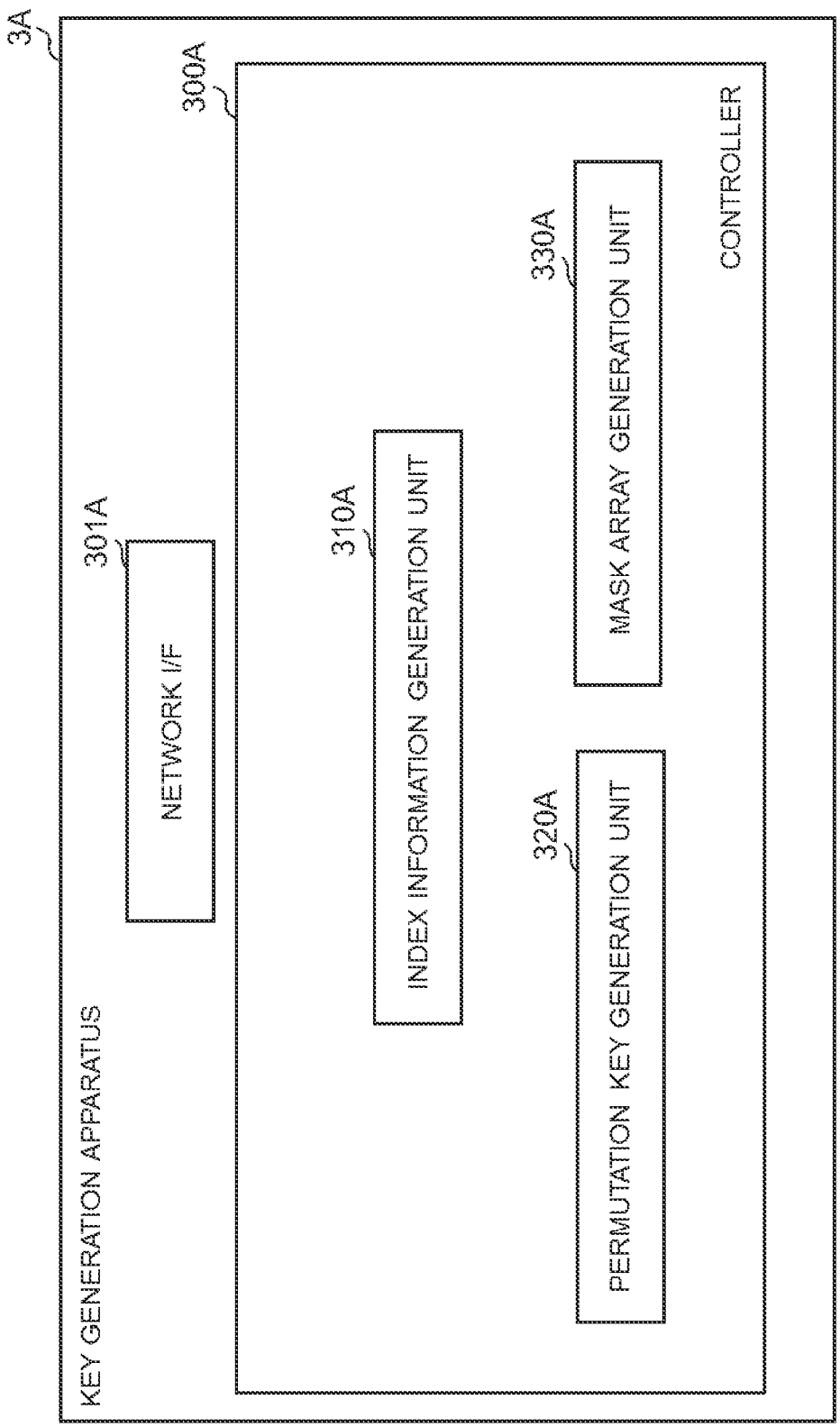
FIG. 7 is a functional block diagram illustrating an example of a functional configuration of a key generation apparatus according to the first example embodiment.

Further, with reference to FIG. 7, a functional configuration of the key generation apparatus 3A will be described. FIG. 7 is a functional block diagram illustrating an example of a functional configuration of the key generation apparatus 3A. As illustrated in FIG. 7, the key generation apparatus 3A includes the controller 300A, and a network I/F 301A that is an interface for the controller 300A to exchange information with other devices via the network 6.

The controller 300A generates a secret key to be used in the collation system 1000A from information acquired via the network I/F 301A. The controller 300A is implemented by installing a dedicated software program in the information processing apparatus such as the key generation apparatus 3A. The controller 300A includes an index information generation unit 310A, a permutation key generation unit 320A, and a mask array generation unit 330A.

The index information generation unit 310A generates index information that is information for identifying what processing is to be performed for each element with respect to elements included in information. As described above, the registration information generation apparatus 1A performs the distribution processing. The index information generation unit 310A generates, for example, information indicating an element subject to the distribution processing as the index information.

Furthermore, as described above, the collation information generation apparatus 2A performs the duplication processing. The index information generation unit 310A generates, for example, information indicating an element subject to the duplication processing as the index information. The network I/F 301A transmits the index information generated by the index information generation unit 310A to the registration information generation apparatus 1A and the collation information generation apparatus 2A.

The permutation key generation unit 320A generates a secret key such as the permutation key K to be used in the permutation processing performed in each of the registration information generation apparatus 1A and the collation information generation apparatus 2A. The network I/F 301A transmits the secret key such as the permutation key K generated by the permutation key generation unit 320A to the registration information generation apparatus 1A and the collation information generation apparatus 2A.

The mask array generation unit 330A generates a mask array to be used in the mask processing performed in each of the registration information generation apparatus TA and the collation information generation apparatus 2A. The network interface 301A transmits the mask array generated by the mask array generation unit 330A to the registration information generation apparatus 1A and the collation information generation apparatus 2A.

<2.7. Functional Configuration of Collation Apparatus>

Figure 8:
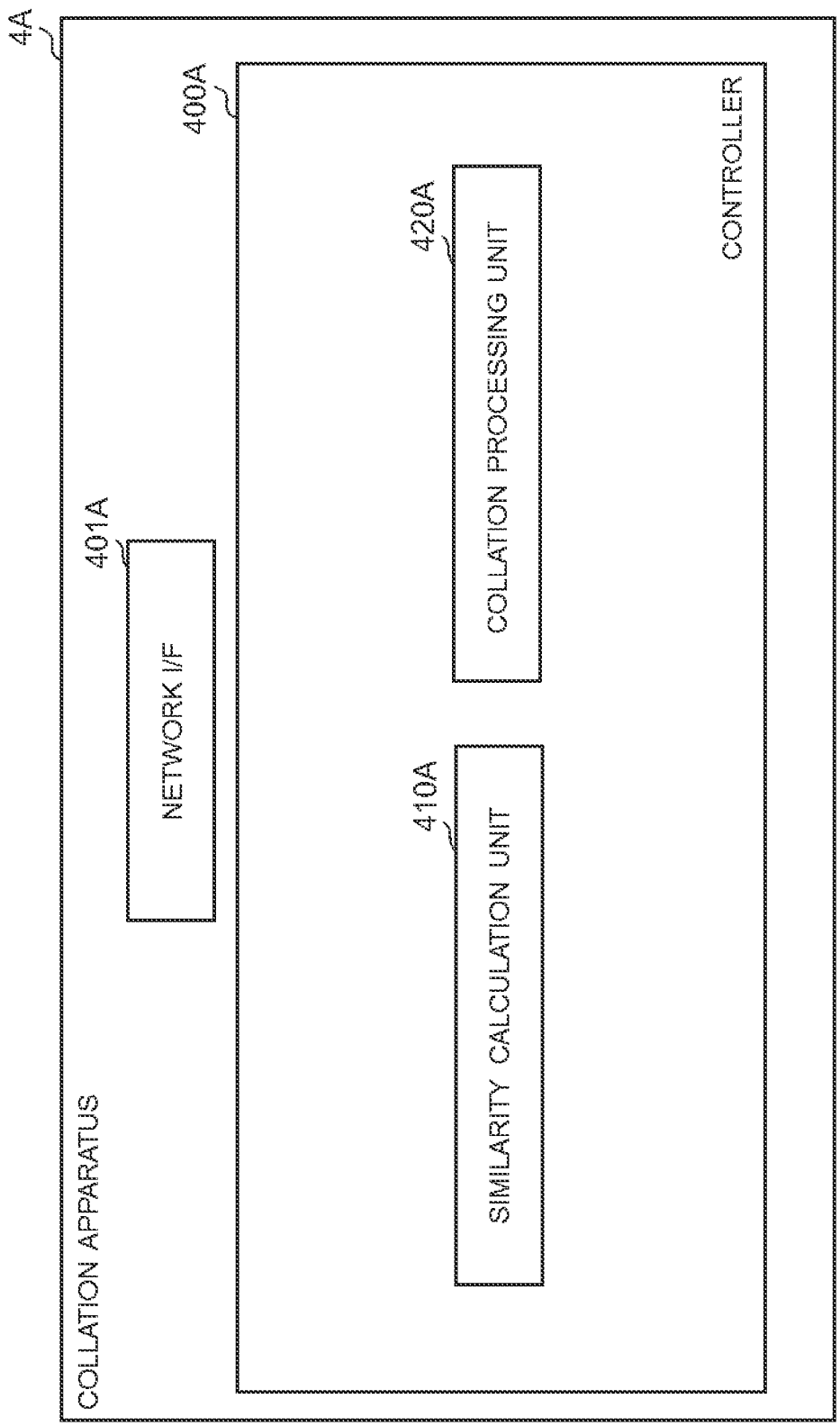
FIG. 8 is a functional block diagram illustrating an example of a functional configuration of a collation apparatus according to the first example embodiment.

Furthermore, with reference to FIG. 8, a functional configuration of the collation apparatus 4A will be described. FIG. 8 is a functional block diagram illustrating an example of a functional configuration of the collation apparatus 4A. As illustrated in FIG. 8, the collation apparatus 4A includes the controller 400A, and a network I/F 401A that is an interface for the controller 400A to exchange information with other devices via the network 6.

The controller 400A acquires pieces of information input to the collation system 1000A via the network I/F 401A, and performs collation based on the acquired pieces of information. The controller 400A is implemented by installing a dedicated software program in the information processing apparatus such as the collation apparatus 4A. The controller 400A includes a similarity calculation unit 410A and a collation processing unit 420A.

The similarity calculation unit 410A calculates, with respect to a plurality of pieces of information, a similarity indicating a degree of similarity between the pieces of information. In the present example embodiment, the similarity calculation unit 410A calculates the similarity based on a normalized correlation between the registration information and the collation information. Details of the processing performed by the similarity calculation unit 410A will be described later.

The collation processing unit 420A performs collation processing for determining whether the plurality of pieces of information match with each other, based on the similarity calculated by the similarity calculation unit 410A. For example, in the case in which the similarity calculation unit 410A calculates the similarity between the registration information and the collation information, the collation processing unit 420A determines, in the collation processing, whether the collation information matches the registration information based on the similarity calculated by the similarity calculation unit 410A.

With the configuration described above, the collation system 1000A calculates the similarity between the registration information generated by the registration information generation apparatus 1A and the collation information generated by the collation information generation apparatus 2A. Then, based on the calculated similarity, the collation system 1000A determines whether the registration information and the collation information match with each other. Information related to a determination result indicating whether the collation information in the collation processing matches the registration information may be used as information to determine whether the user is authenticated in the authentication system having the collation system 1000A.

<2.8. Flow of Processing of Generating Registration Information>

In the following, a flow of processing when the registration information generation apparatus 1A performs the cancelable transformation on input information according to the present example embodiment will be described. In performing the collation processing to determine whether to be authenticated in the biometric authentication, the collation system 1000A first generates the registration information, which is one of pieces of information to be used for collation, from biometric information on a user input to the collation system 1000A. The registration information generation apparatus 1A acquires the biometric information on the user input to the collation system 1000A via the sensor 19 or the I/F 15, and generates the registration information based on the acquired biometric information.

Figure 9:
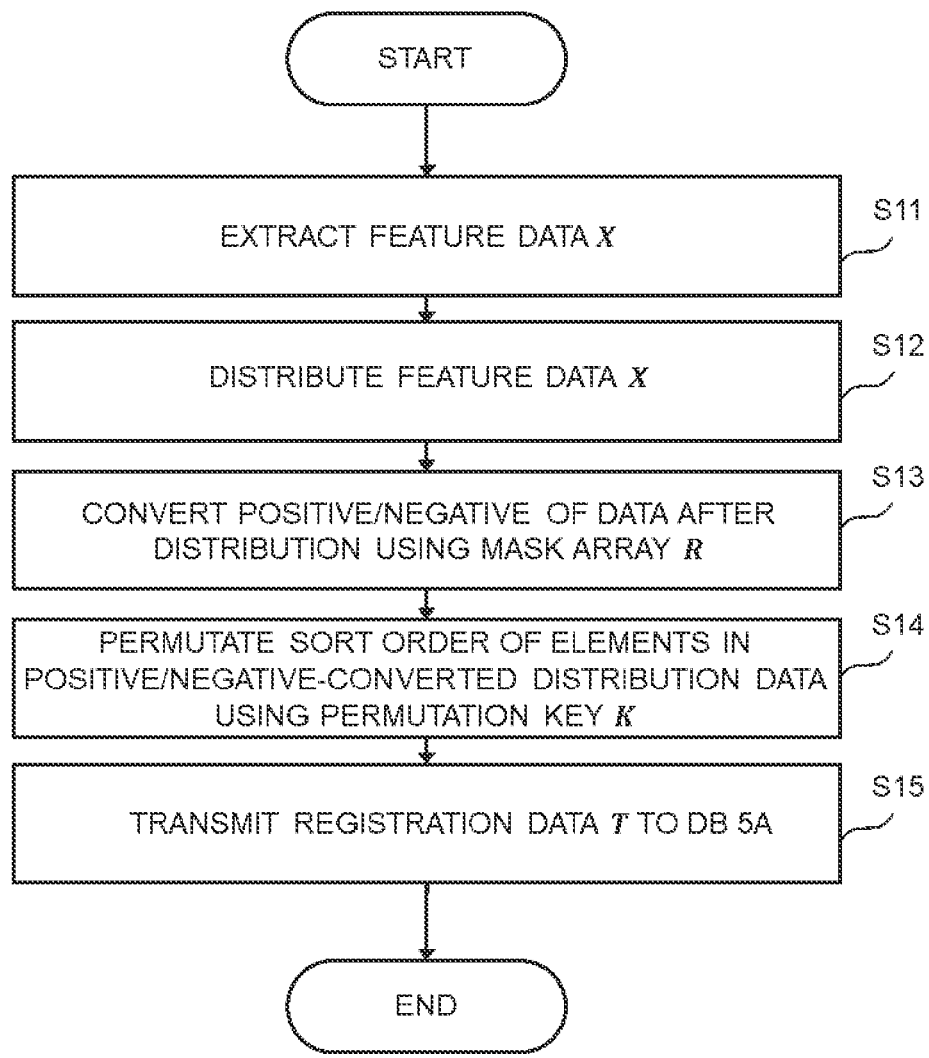
FIG. 9 is a flowchart illustrating a flow of processing for generating registration information according to the first example embodiment.
Figure 10:
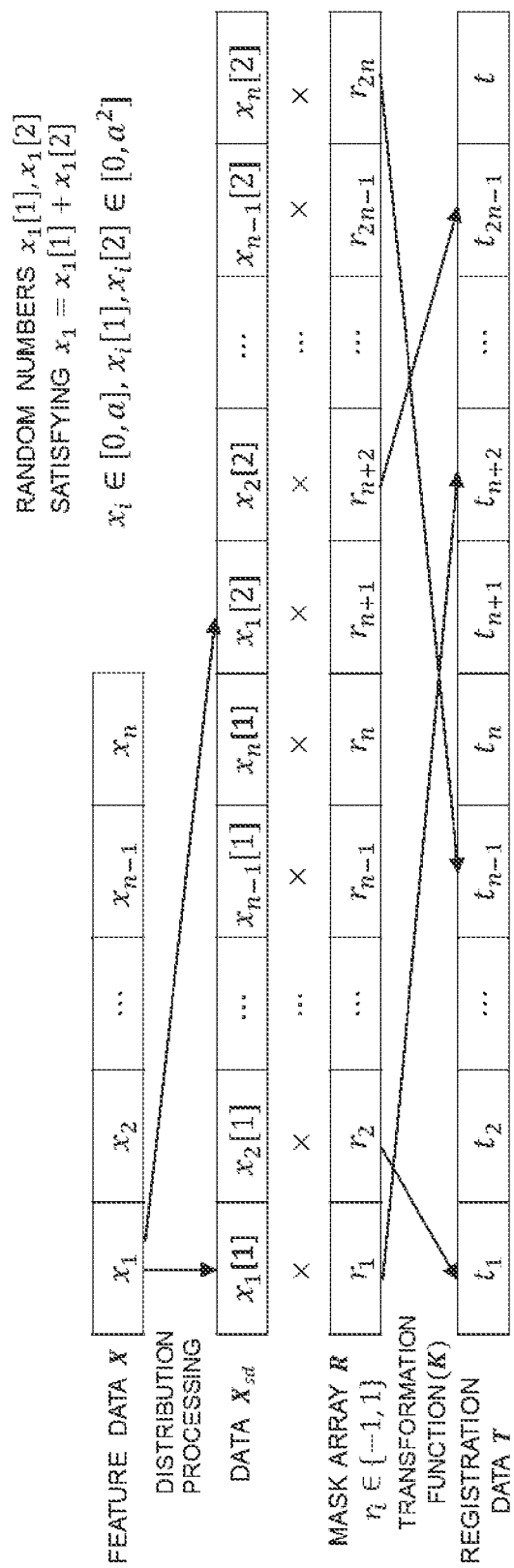
FIG. 10 is an explanation diagram of processing for generating the registration information according to the first example embodiment.

FIG. 9 is a flowchart illustrating a flow of processing for generating the registration information in the registration information generation apparatus 1A. FIG. 10 is an explanation diagram modeling processing for generating the registration information in the registration information generation apparatus 1A. Referring to FIGS. 9 and 10, a flow of the cancelable transformation in the registration information generation apparatus 1A will be described.

Biometric information on a user acquired by the registration information generation apparatus 1A is input to the controller 100A via the network I/F IOTA. In the explanation of FIGS. 9 and 10, it is assumed that facial image information on a user A is input to the registration information generation apparatus 1A.

In step S11, the feature extraction unit 110A generates feature data from the facial image information on the user A (see the top row of FIG. 10) as follows.

[Math. 22]
$$X = (x_1, x_2, \ldots, x_{n-1}, x_n) \qquad \text{(Expression 2-1)}$$

As shown in (Expression 2-1), in the present example embodiment, the explanation is based on the assumption that the feature extraction unit 110A generates feature data X, which is an n-dimensional vector, from the facial image information on the user A. The registration information generation apparatus 1A may acquire the feature data X via the sensor 19 or the I/F 15. The feature data X is an example of registration-side input information in the present example embodiment. In the following description, the feature data X, which is an n-dimensional vector, may be simply referred to as "n-dimensional feature data X".

Then, in step S12, the distribution processing unit 120A performs the distribution processing for performing distribution for each of elements corresponding from the first dimensional element to the n-th dimensional element in the n-dimensional feature data X. For example, the distribution processing unit 120A performs the distribution processing for distributing the first dimensional element $x_1$ in the n-dimensional feature data X to random numbers satisfying the following expression.

[Math. 23]
$$x_1 = x_1[1] + x_1[2] \qquad \text{(Expression 2-2)}$$

[Math. 24]
$$x_1[1], x_1[2]$$

In other words, the distribution processing unit 120A divides the i-th dimensional element $x_i$ in the n-dimensional feature data X into two random numbers (i.e., random numbers $x_i[1]$ and $x_i[2]$). This allows each dimensional element $x_i$ in the n-dimensional feature data X to be distributed to a plurality of random numbers, resulting in data that is a 2n-dimensional vector as follows (see the second row from the top in FIG. 10).

[Math. 25]

$$X_{sd} = (x_1[1], x_2[1], \ldots, x_n[1], x_1[2], \ldots, x_{n-1}[2], x_n[2])$$

The distribution processing in the present example embodiment corresponds to the processing for the distribution processing unit 120A to distribute each dimensional element in the feature data X to a plurality of random numbers. The distribution processing unit 120A distributes the i-th dimensional element $x_i$ in the n-dimensional feature data X to a plurality of random numbers (in [Expression 2-2], the random numbers $x_1[1]$ and $x_1[2]$) through the distribution processing. Under the following condition,

[Math. 26]

$$x_i \in [0,a] \qquad \text{(Expression 2-3)}$$

random numbers $x_i[1]$ and $x_i[2]$ are, respectively, represented by $$x_i[1], x_i[2] \in [0,a^2] \qquad \text{[Math. 27]}$$

As a result of the distribution processing by the distribution processing unit 120A, the n-dimensional feature data X is transformed into data $X_{sd}$ that is a 2n-dimensional vector, as described above. In the following description, the data $X_{sd}$ generated by performing the distribution processing on the n-dimensional feature data X may be referred to as "data after distribution". The data after distribution is an example of secret-sharing information in the present example embodiment. In FIG. 10, the data after distribution is shown as a data sequence in which random numbers $x_1[1]$ to $x_n[1]$ are arranged as the first to n-th dimensional elements, and random numbers $x_1[2]$ to $x_n[2]$ are arranged as the n+1-th to 2n-th dimensional elements.

As shown in (Expression 2-2), the random number $x_i[1]$ and the random number $x_i[2]$ are random numbers that, when added together, result in the original element $x_i$. Therefore, the random numbers $x_i[1]$ and $x_i[2]$ are pieces of information such that it is impossible to restore the i-th dimensional element $x_i$ in the original n-dimensional feature data X from only one of the random numbers $x_i[1]$ and $x_i[2]$. In the present example embodiment, dividing the i-th dimensional element $x_i$ in the feature data X into a plurality of elements (e.g., in [Expression 2-2], the random numbers $x_1[1]$ and $x_1[2]$) such that it is impossible to restore the original i-th dimensional element $x_i$ in the feature data X from only one of them may be referred to as "secret-sharing".

In (Expression 2-2), the distribution processing unit 120A generates two random numbers (random numbers $x_i[1]$ and $x_i[2]$) by performing the secret-sharing for the i-th dimensional element $x_i$ in the n-dimensional feature data X. However, the number of divisions for the i-th dimensional element $x_i$ in the n-dimensional feature data x is not limited to two. For example, the distribution processing unit 120A may set the number of divisions for the i-th dimensional element $x_i$ in the n-dimensional feature data x to j (i and j are any positive integers, respectively), and perform the secret-sharing for the i-th dimensional element $x_i$ in the n-dimensional feature data x (see [Expression 2-4]).

[Math. 28]

$$x_i = x_i[1] + \ldots + x_i[j] \qquad \text{(Expression 2-4)}$$

In this configuration, through the distribution processing, the distribution processing unit 120A generates j random numbers (random numbers $x_i[1]$ to $x_i[j]$, see [Expression 2-4]) from the i-th dimensional element $x_i$ in the n-dimensional feature data x. The j random numbers (random numbers $x_i[1]$ to $x_i[j]$) are, respectively, as follows (see [Expression 2-3]).

$$x_i[1], \ldots, x_i[j] \in [0,a^j] \qquad \text{[Math. 29]}$$

Then, in step S13, for each dimensional element in the data after distribution, the mask processing unit 140A performs the mask processing using a mask array below.

[Math. 30]

$$R = (r_1, r_2, \ldots, r_{n-1}, r_n, \ldots, r_{2n-1}, r_{2n}) \qquad \text{(Expression 2-5)}$$

Hereinafter, the mask array R, which is a vector, may be simply referred to as "mask array R". As mentioned above, the mask array R is information generated by the key generation apparatus 3A. The key generation apparatus 3A transmits the mask array R, which is a 2n-dimensional vector, to the registration information generation apparatus 1A. Each element in the mask array R is as follows.

$$r_i \in \{-1,1\} \qquad \text{[Math. 31]}$$

The positive or negative of each dimensional element in the data after distribution can be converted by the mask processing for multiplying each dimensional element in the data after distribution by the mask array R (see the third row from the top in FIG. 10). In the following explanation, the data after distribution, which has been obtained through the mask processing for multiplying each dimensional element by the mask array R, may be referred to as "positive/negative-converted distribution data".

Next, in step S14, the permutation processing unit 130A performs the permutation processing for reordering the dimensional elements in the positive/negative-converted distribution data by the permutation function F using a permutation key below.

$$K \qquad \text{[Math. 32]}$$

Hereinafter, the permutation key K, which is a vector, may be simply referred to as "permutation key K". The permutation key K is an example of information that defines how to reorder elements in information of interest, and corresponds to a cryptographic key randomly generated by the key generation apparatus 3A. As mentioned above, the permutation key K is information generated by the key generation apparatus 3A, and transmitted from the key generation apparatus 3A to the registration information generation apparatus 1A to generate the registration information. The permutation processing unit 130A performs the permutation processing to transform the positive/negative-converted distribution data into data below (see the bottom row of FIG. 10).

[Math. 33]

$$T = (t_1, t_2, \ldots, t_{2n-1}, t_{2n})$$

The data T, which is a vector, corresponds to data in which each dimensional element in the positive/negative-converted distribution data is transformed based on the permutation key K. The data T as a vector, which is generated as a result of the permutation processing by the permutation processing unit 130A on the positive/negative-converted distribution data, is an example of the registration information. In the following explanation, the data T, which is a vector, may be referred to as "registration data T".

The registration data T (i and j are any positive integers, respectively) corresponds to, for example, data in which the dimensional elements included in the positive/negative-converted distribution data are reordered as follows.

[Math. 34]

$$t_i = r_1 \cdot x_1[1], \ldots, t_j = r_{n+1} \cdot x_1[2] \qquad \text{(Expression 2-6)}$$

The masking processing using the mask array R may be omitted, and the registration data T may be generated in such a configuration. In this configuration, the data T as a vector, which is generated as a result of the permutation processing by the permutation processing unit 130A on the data after distribution, is an example of the registration information. Furthermore, the order of the mask processing and the permutation processing may be changed to generate the registration data T.

The registration information generation apparatus 1A transmits the registration data T generated in this manner to the DB 5A in step S15. The DB 5A stores the received registration data T therein. In step S15, the registration information generation apparatus 1A may transmit the registration data T regarding the biometric information on the user A to the DB 5A together with an identifier (user identifier) capable of identifying that the data is information on the user A.

As described above, the registration information generation apparatus 1A generates the registration data T by performing the mask processing and the permutation processing after performing the secret-sharing for the elements included in the feature data X. Therefore, in the case in which the permutation key K is not compromised, it is difficult to determine which element in the registration data T corresponds to which element in the feature data X. In addition, since the registration data T is generated from a state in which the secret-sharing has been performed on the feature data X, even if both the mask array R and the permutation key K are compromised, it is difficult to identify that registration data newly generated using the compromised mask array R and permutation key K, and the compromised registration data T are derived from the feature data of the same living body. From the above, the registration information generation apparatus 1A in the present example embodiment can further reduce the risk of information leakage.

<2.9. Flow of Processing of Generating Collation Information>

In the following, a flow of processing when the collation information generation apparatus 2A performs the cancelable transformation on input information according to the present example embodiment will be described. After the registration information has been stored in the DB 5A, in performing the collation processing to determine whether biometric authentication is acceptable, the collation system 1000A has to use biometric information of the same living body as that used when the registration information is generated. The collation information generation apparatus 2A acquires biometric information on a user via the sensor 19 or the I/F 15, and performs the cancelable transformation based on the acquired biometric information. Information generated by performing the cancelable transformation on the biometric information by the collation information generation apparatus 2A is an example of the collation information to be collated with respect to the registration information stored in the DB 5A.

Figure 11:
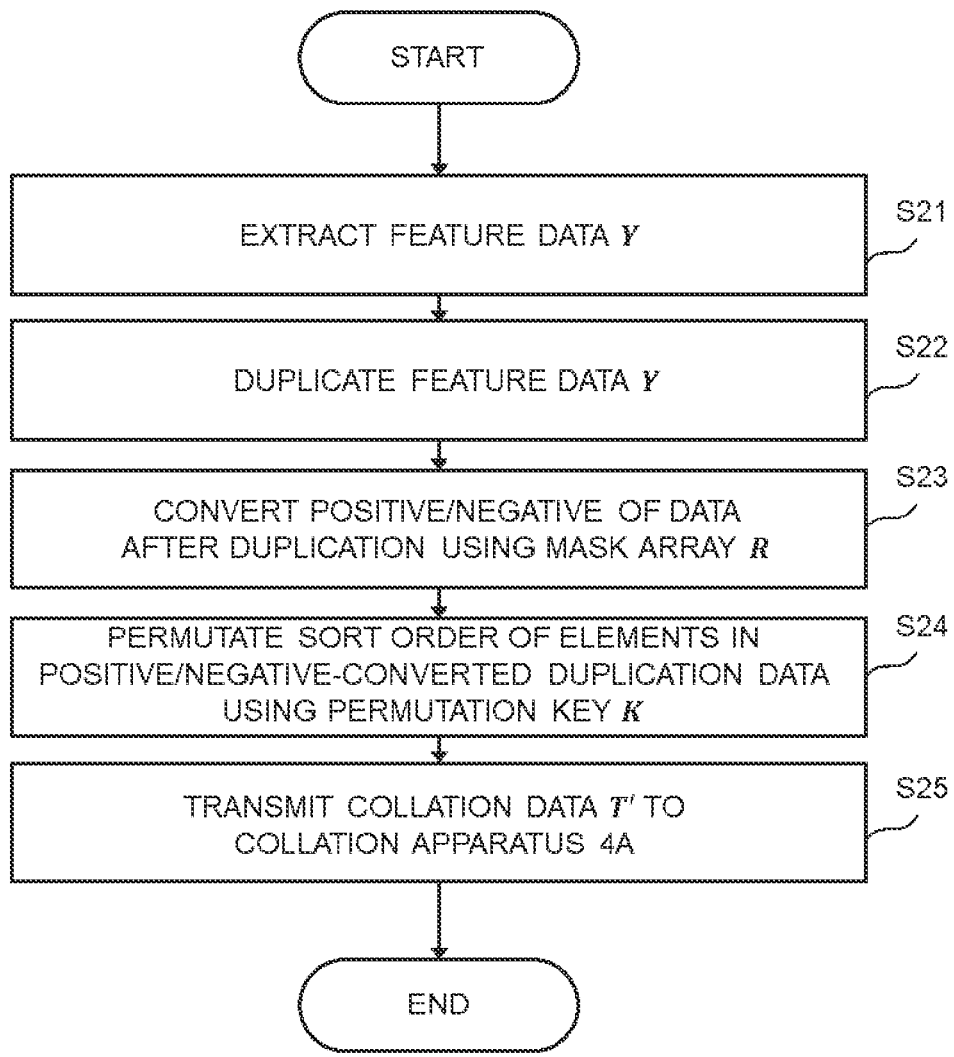
FIG. 11 is a flowchart illustrating a flow of processing of generating collation information according to the first example embodiment.
Figure 12:
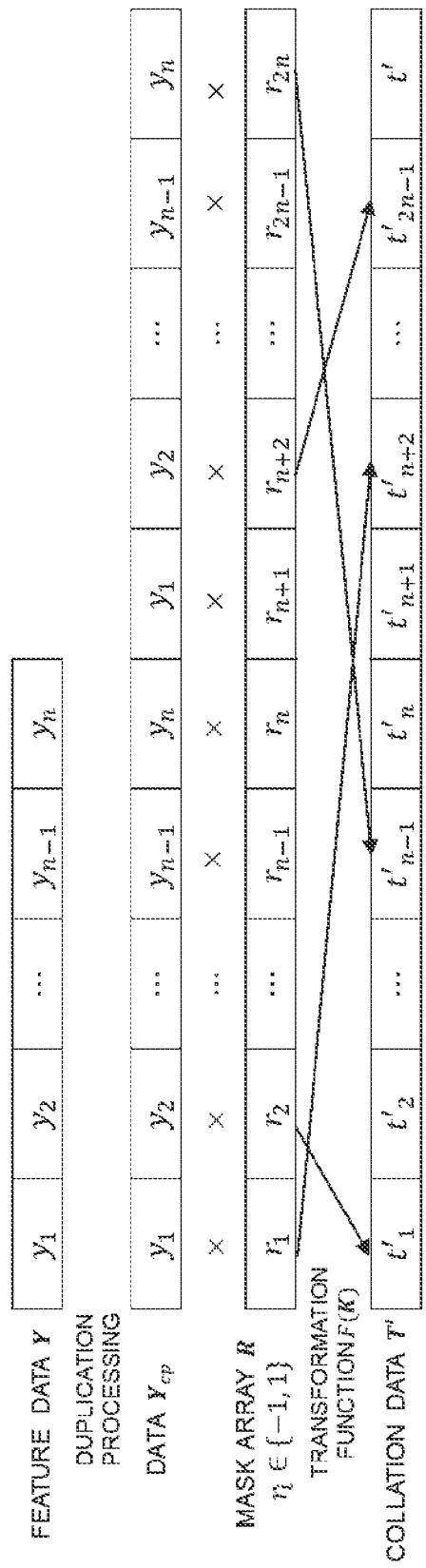
FIG. 12 is an explanation diagram of processing of generating the collation information according to the first example embodiment.

FIG. 11 is a flowchart illustrating a flow of processing of generating the collation information in the collation information generation apparatus 2A. FIG. 12 is an explanation diagram modeling processing of generating the collation information in the collation information generation apparatus 2A. Referring to FIGS. 11 and 12, a flow of the cancelable transformation in the collation information generation apparatus 2A will be described.

Biometric information on a user acquired by the collation information generation apparatus 2A is input to the controller 200A via the network I/F 201A. In the explanation of FIGS. 11 and 12, it is assumed that the facial image information on the user A is input to the collation information generation apparatus 2A.

In step S21, the feature extraction unit 210A extracts feature data from the facial image information on the user A (see the top row of FIG. 12) as follows.

[Math. 35]

$$Y = (y_1, y_2, \ldots, y_{n-1}, y_n) \qquad \text{(Expression 3-1)}$$

As shown in (Expression 3-1), in the present example embodiment, the explanation is based on the assumption that the feature extraction unit 210A generates feature data Y, which is an n-dimensional vector, from the facial image information on the user A. The collation information generation apparatus 2A may acquire the feature data Y via the sensor 19 or the I/F 15. The feature data Y is an example of collation-side input information in the present example embodiment. In the following description, the feature data Y, which is an n-dimensional vector, may be simply referred to as "n-dimensional feature data Y".

Then, in step S22, the duplication processing unit 220A performs duplication processing for duplicating elements corresponding from the first dimensional element to the n-th dimensional element in the n-dimensional feature data Y As a result, each dimensional element in the n-dimensional feature data Y is doubled, and as shown in (Expression 3-2), resulting in data which is a 2n-dimensional vector (see the second row from the top in FIG. 12).

[Math. 36]

$$Y_{cp} = (y_1, y_2, \ldots, y_n, y_1, \ldots, y_{n-1}, y_n) \qquad \text{(Expression 3-2)}$$

The duplication processing in the present example embodiment corresponds to the processing for the duplication processing unit 220A to duplicate each dimensional element in the feature data Y When the registration information generation apparatus TA divides each of the dimensional elements in the feature data X into n1 elements, the duplication processing unit 220A performs the duplication processing in which each dimensional element in the feature data Y is duplicated n2 times. Here, n1=n2, and n1 and n2 are integers of 2 or more, respectively. In the following description, the data $Y_{cp}$, which is a 2n-dimensional vector, generated by performing the duplication processing on the n-dimensional feature data Y may be referred to as "data after duplication". The data after duplication is an example of duplicated information in the present example embodiment.

In the present example embodiment, the distribution processing and the duplication processing are performed such that the number of divisions for the feature data X in the registration information generation apparatus 1A and the number of duplications for the feature data Y in the collation information generation apparatus 2A are the same.

Then, in step S23, the mask processing unit 240A performs the mask processing using the mask array R (see [Expression 2-5]) for each dimensional element in the data after duplication (see the third row from the top in FIG. 12). As mentioned above, the mask array R is information generated by the key generation apparatus 3A. The key generation apparatus 3A transmits the mask array R, which is a 2n-dimensional vector, to the collation information generation apparatus 2A. In the present example embodiment, the key generation apparatus 3A transmits the same mask array R to the registration information generation apparatus 1A and the collation information generation apparatus 2A.

The positive or negative of each dimensional element in the data after duplication can be converted by the mask processing for multiplying each dimensional element in the data after duplication by the mask array R. In the following explanation, the data after duplication, which has been obtained through the mask processing for multiplying each dimensional element by the mask array R, may be referred to as "positive/negative-converted duplication data".

Then, in step S24, the permutation processing unit 230A performs the permutation processing for reordering the dimensional elements in the positive/negative-converted duplication data by the permutation function F using the permutation key K. The permutation key K is an example of information that defines how to reorder elements in information of interest, and corresponds to a cryptographic key randomly generated by the key generation apparatus 3A. As mentioned above, the permutation key K is information generated by the key generation apparatus 3A, and transmitted from the key generation apparatus 3A to the collation information generation apparatus 2A to generate the collation information. In the present example embodiment, the key generation apparatus 3A transmits the same permutation key K to the registration information generation apparatus 1A and the collation information generation apparatus 2A.

The permutation processing unit 230A performs the permutation processing to transform the positive/negative-converted duplication data into data below (see the bottom row of FIG. 12).

[Math. 37]

$$T' = (t'_1, t'_2, \ldots, t'_{2n-1}, t'_{2n})$$

The data T', which is a vector, corresponds to data in which each dimensional element in the positive/negative-converted duplication data is transformed based on the permutation key K. The data T' as a vector, which is generated as a result of the permutation processing by the permutation processing unit 230A on the positive/negative-converted duplication data, is an example of the collation information. In the following explanation, the data T', which is a vector, may be referred to as "collation data T'".

The same permutation key K is used in both the registration information generation apparatus 1A and the collation information generation apparatus 2A. In other words, in the permutation processing performed by the collation information generation apparatus 2A, the dimensional elements in the positive/negative-converted duplication data are reordered in the same sort order as in the permutation processing in the registration information generation apparatus 1A.

Therefore, the collation data T' (i and j are any positive integers, respectively) generated in step S24 corresponds to data in which the dimensional elements included in the positive/negative-converted duplication data are reordered as follows.

[Math. 38]

$$t'_i = r_1 \cdot y_1, \ldots, t'_j = r_{n+1} \cdot y_1 \qquad \text{(Expression 3-3)}$$

The masking processing using the mask array R may be omitted, and the collation data T' may be generated in such a configuration. In this configuration, the data T' as a vector, which is generated as a result of the permutation processing by the permutation processing unit 230A on the data after duplication, is an example of the collation information. Furthermore, the order of the mask processing and the permutation processing may be changed to generate the collation data T'.

Then, in step S25, the network I/F 201A transmits the collation data T' to the collation apparatus 4A. At this time, the network I/F 201A may transmit the collation data T' to the collation apparatus 4A together with an identifier (user identifier) capable of identifying that the data is information on the user A.

As described above, the collation information generation apparatus 2A generates the collation data T' by performing the mask processing and the permutation processing after duplicating the elements included in the feature data Y Therefore, in the case in which the permutation key K is not compromised, it is difficult to determine which element in the collation data T' corresponds to which element in the feature data Y. From the above, the collation information generation apparatus 2A in the present example embodiment can further reduce the risk of information leakage.

<2.10. Flow of Processing of Calculating Similarity>

Figure 13:
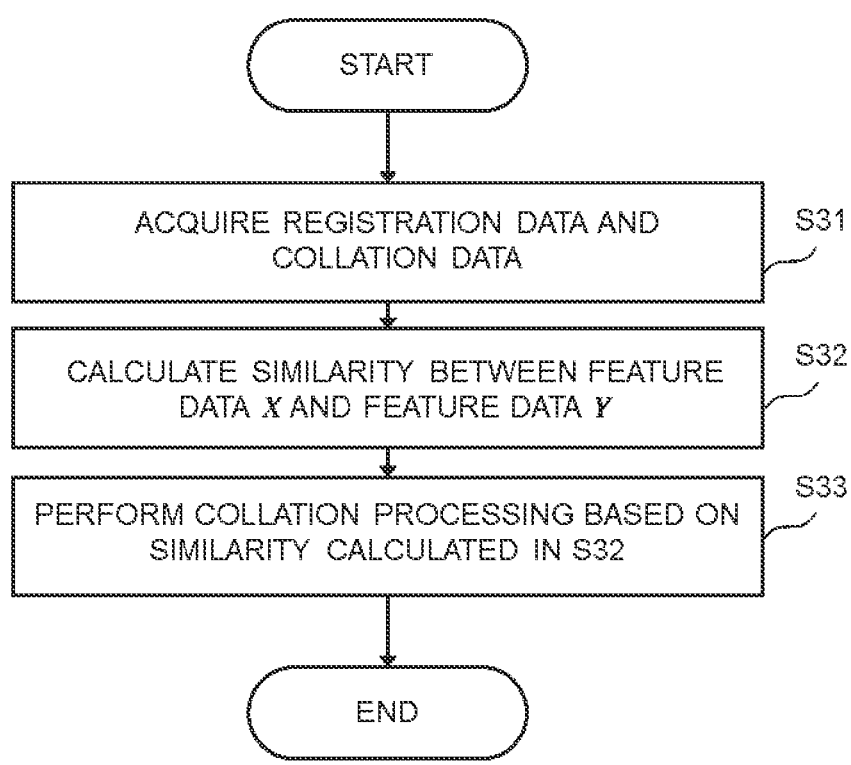
FIG. 13 is a flowchart illustrating a flow of processing performed by a collation apparatus according to the first example embodiment.

Next, referring to FIG. 13, a flow of processing in the collation apparatus 4A will be described. FIG. 13 is a flowchart illustrating a flow of processing in the collation apparatus 4A of performing collation between biometric information input to the registration information generation apparatus 1A and biometric information input to the collation information generation apparatus 2A.

In step S31, the network I/F 401A acquires the registration data T from the DB 5A. The DB 5A stores therein the registration data T regarding the biometric information on the user A received from the registration information generation apparatus 1A in step S15, together with an identifier capable of identifying that the data is information on the user A. The collation apparatus 4A acquires from the DB 5A the registration data T regarding the biometric information on the user corresponding to a user identifier received from the collation information generation apparatus 2A in step S25, that is, the user A.

Then, in step S32, the similarity calculation unit 410A calculates a similarity between the feature data X and the feature data Y.

In step S32, the similarity calculation unit 410A calculates an inner product of the registration data T and the collation data T' as a normalized correlation between the registration data T and the collation data T'. Here, the inner product of the registration data T and the collation data T', each of which is a 2n-dimensional vector, is defined as follows.

[Math. 39]

$$\langle T, T' \rangle = \sum t_i \cdot t'_i \bmod a^2$$

According to (Expression 2-2), (Expression 2-6) and (Expression 3-3), the following is calculated.

[Math. 40]

$$t_i \cdot t'_i + t_j \cdot t'_j = r_1^2 \cdot x_1[1] y_1 + r_{n+1}^2 \cdot x_1[2] y_1 = y_1(x_1[1] + x_1[2]) = x_1 \cdot y_1$$

In other words, the inner product of the registration data T and the collation data T' is equal to an inner product of the feature data X and the feature data Y (Expression 3-4).

[Math. 41]

$$d(T,T')=d(X,Y) \quad \text{(Expression 3-4)}$$

In other words, the similarity calculation unit 410A calculates the inner product of the registration data T and the collation data T' as the similarity between the feature data X and the feature data Y.

Next, in step S33, the collation processing unit 420A performs the collation processing for performing collation between the biometric information pertaining to the feature data X and the biometric information pertaining to the feature data Y, based on the similarity between the feature data X and the feature data Y calculated in step S32.

In addition, the collation apparatus 4A may authenticate a user identified by the collation information based on the result of the collation processing in step S33.

Further, for the mask array R used in the registration information generation apparatus 1A, the collation information generation apparatus 2A may perform the mask processing using a mask array below.

[Math. 42]

$$R' = \left(r_1^{-1}, r_2^{-1}, \ldots, r_{n-1}^{-1}, r_n^{-1}, \ldots, r_{2n-1}^{-1}, r_{2n}^{-1}\right) \quad \text{(Expression 3-5)}$$

Hereinafter, the mask array R', which is a vector, may be simply referred to as "mask array R'". According to (Expression 2-5) and (Expression 3-5), each element in the mask array R' satisfies the following expression for any positive integer j.

[Math. 43]

$$r_j \cdot r_j^{-1} = 1$$

That is, each element in the mask array R', which is $$r_j^{-1} \quad \text{[Math. 44]}$$

corresponds to a multiplicative inverse of each element $r_j$ of the mask array R shown in (Expression 2-5).

As described above, according to the present example embodiment, in the above calculation processing using the registration data T generated by the registration information generation apparatus 1A and the collation data T' generated by the collation information generation apparatus 2A, the similarity can be calculated by calculating the inner product once. Therefore, a high throughput can be expected, similar to the cancelable biometrics of the related art. In addition, since the inner product of the registration data T and the collation data T' is equal to the inner product of the feature data X and the feature data Y, the collation accuracy can be maintained as in the cancelable biometrics of the related art. Accordingly, the registration information generation apparatus 1A and the collation information generation apparatus 2A according to the present example embodiment can perform the cancelable transformation capable of suppressing the degradation of collation accuracy and reducing the risk of information leakage.

<2.11. Example Alternations of Registration Information Generation Apparatus and Collation Information Generation Apparatus>

Figure 14:
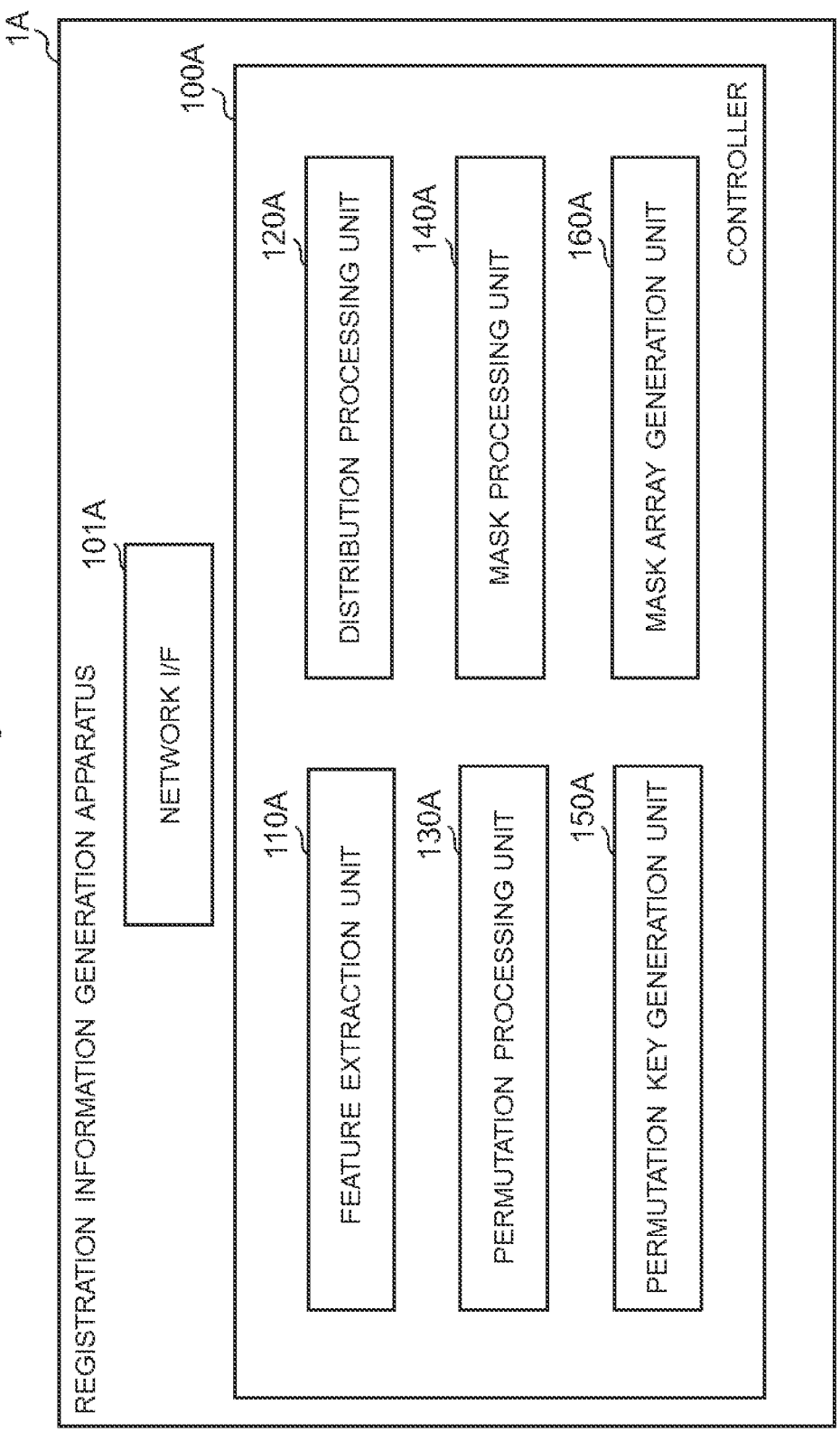
FIG. 14 is a functional block diagram illustrating an example of a functional configuration of the registration information generation apparatus according to an example alternation of the first example embodiment.
Figure 15:
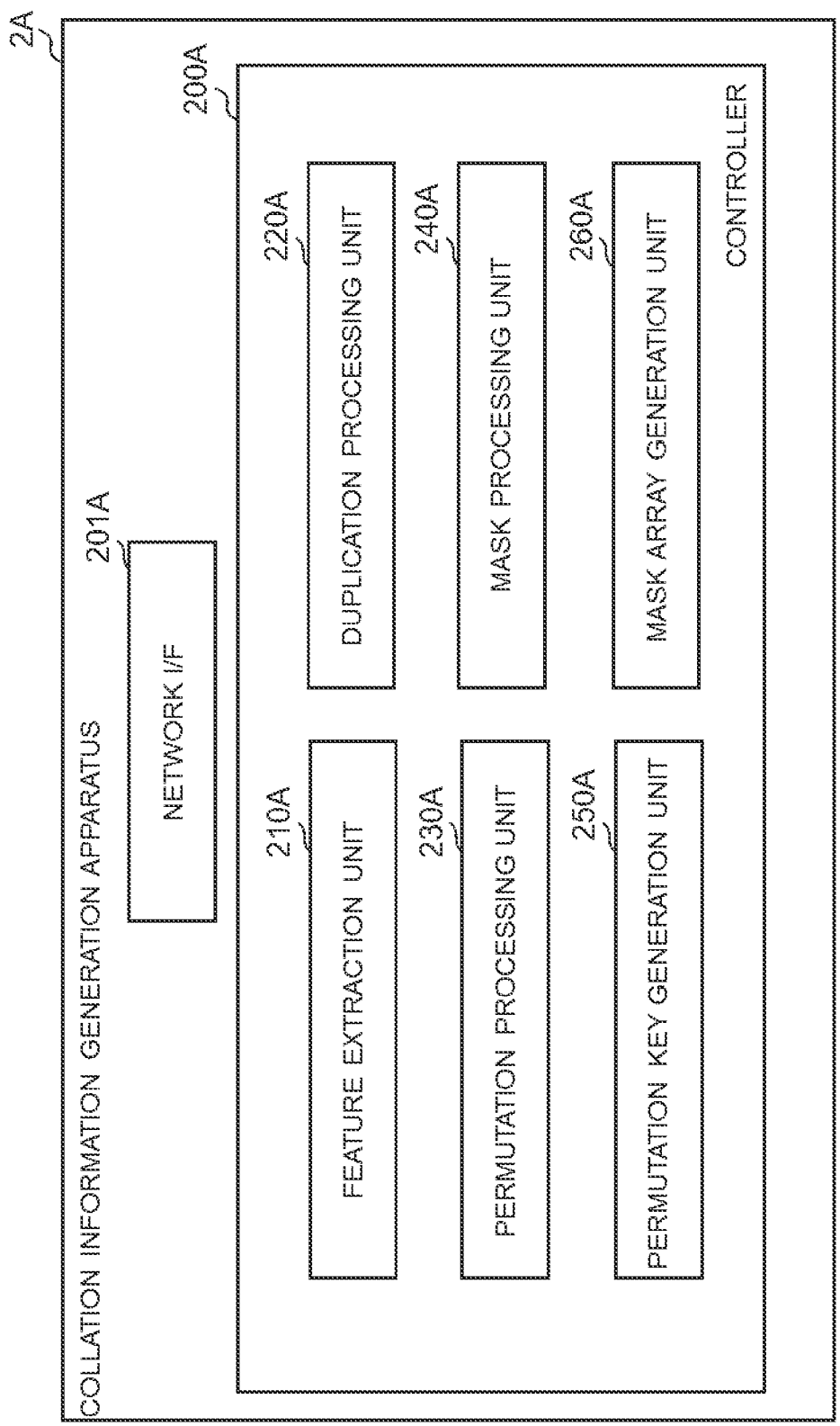
FIG. 15 is a functional block diagram illustrating an example of a functional configuration of the collation information generation apparatus according to an example alternation of the first example embodiment.

The registration information generation apparatus 1A and the collation information generation apparatus 2A each may include an element for generating the mask array R and an element for generating the permutation key K. FIG. 14 is a functional block diagram illustrating a functional configuration of the registration information generation apparatus 1A according to an example alternation of the first example embodiment. FIG. 15 is a functional block diagram illustrating a functional configuration of the collation information generation apparatus 2A according to the example alternation of the first example embodiment.

As illustrated in FIG. 14, the registration information generation apparatus 1A includes a permutation key generation unit 150A and a mask array generation unit 160A, in addition to the feature extraction unit 110A, the distribution processing unit 120A, the permutation processing unit 130A, and the mask processing unit 140A (see FIG. 5).

The permutation key generation unit 150A generates a secret key such as the permutation key K to be used by the registration information generation apparatus 1A in the permutation processing. The mask array generation unit 160A generates a mask array to be used by the registration information generation apparatus 1A in the masking processing.

In addition to the elements shown in FIG. 14, the registration information generation apparatus 1A may include an element corresponding to the index information generation unit 310A that generates index information being information for identifying what processing is to be performed for each element included in information.

As illustrated in FIG. 15, the collation information generation apparatus 2A includes a permutation key generation unit 250A and a mask array generation unit 260A in addition to the feature extraction unit 210A, the duplication processing unit 220A, the permutation processing unit 230A, and the mask processing unit 240A (see FIG. 6).

The permutation key generation unit 250A generates a secret key such as the permutation key K to be used by the collation information generation apparatus 2A in the permutation processing. The mask array generation unit 260A generates a mask array to be used by the collation information generation apparatus 2A in the mask processing.

In addition to the elements shown in FIG. 15, the collation information generation apparatus 2A may include an element corresponding to the index information generation unit 310A that generates index information being information for identifying what processing is to be performed for each element included in information.

According to the present example alternation, the registration information generation apparatus 1A and the collation information generation apparatus 2A can perform the cancelable transformation without communicating with the key generation apparatus 3A. Therefore, it is possible to further reduce the risk of leakage of the mask array R and the permutation key K on a communication path with the key generation apparatus 3A.

3. Second Example Embodiment

In the first example embodiment, the distribution processing is performed on all of the dimensional elements included in the feature data X. Meanwhile, in the present second example embodiment, an example aspect will be described in which the registration information generation apparatus 1A generates the registration data T by performing the distribution processing on some dimensional elements included in the feature data X. The hardware and functional configurations of the registration information generation apparatus 1A, the collation information generation apparatus 2A, the key generation apparatus 3A, and the collation apparatus 4A are the same as those in the first example embodiment. In the second example embodiment, explanations will be given for configurations that differ from the first example embodiment, and explanations will be omitted for the same configurations and aspects as in the first example embodiment.

<3.1. Flow of Processing of Generating Registration Information>

Figure 16:
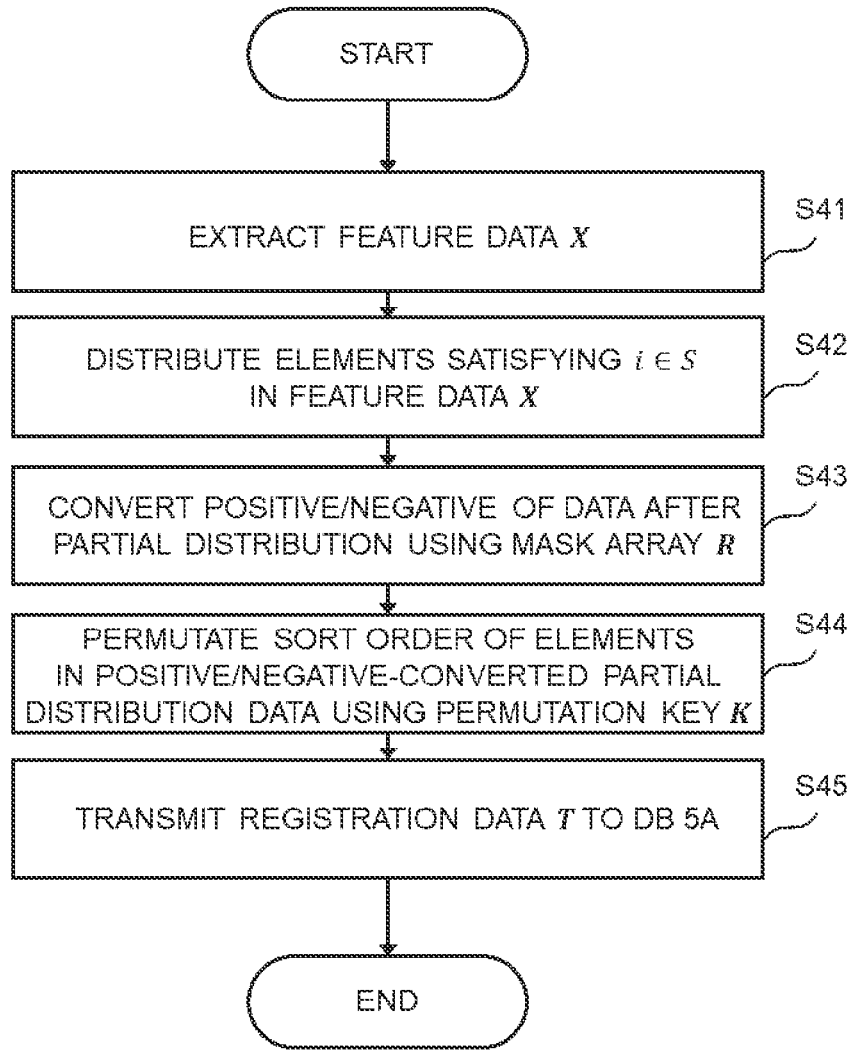
FIG. 16 is a flowchart illustrating a flow of processing of generating registration information according to a second example embodiment.
Figure 17:
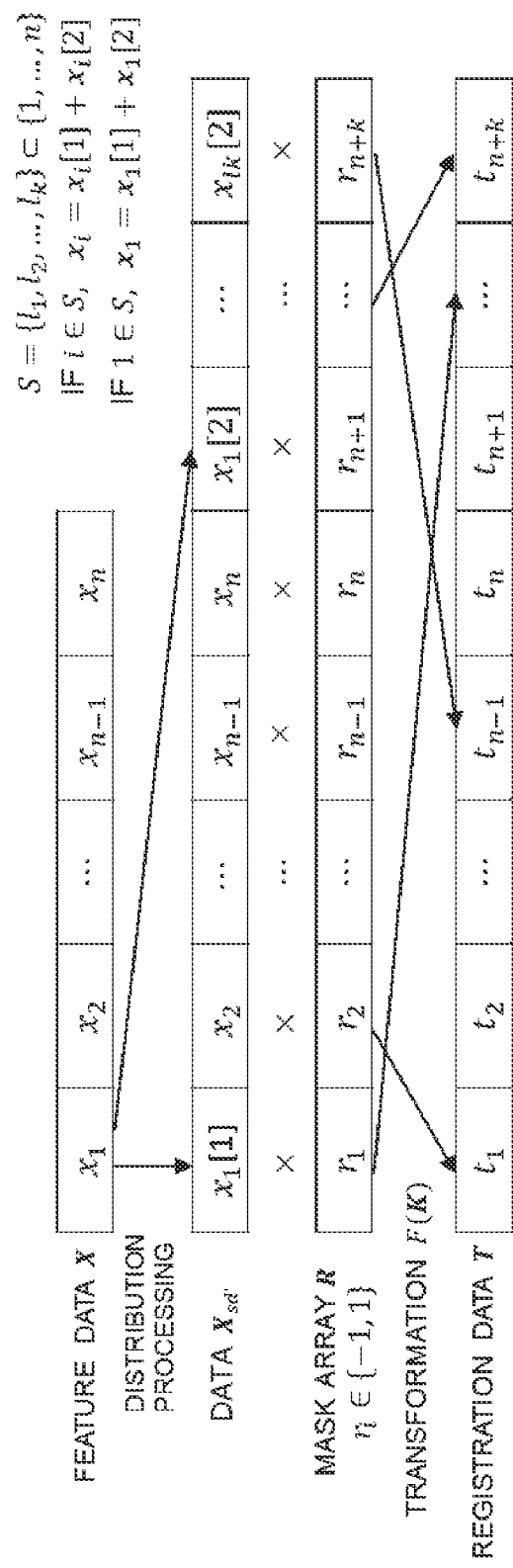
FIG. 17 is an explanation diagram of processing for generating the registration information according to the second example embodiment.

FIG. 16 is a flowchart illustrating a flow of processing of generating the registration information in the registration information generation apparatus 1A according to the present example embodiment. FIG. 17 is an explanation diagram modeling processing for generating the registration information in the registration information generation apparatus 1A according to the present example embodiment. Referring to FIGS. 16 and 17, a flow of the cancelable transformation in the registration information generation apparatus 1A will be described.

Biometric information on a user acquired by the registration information generation apparatus 1A is input to the controller 100A via the network I/F 101A. In the explanation of FIGS. 16 and 17, it is assumed that the facial image information on the user A is input to the registration information generation apparatus 1A. In the present example embodiment, the key generation apparatus 3A transmits to the registration information generation apparatus 1A index information that is information indicating that dimensional elements identified by data S correspond to a subset of n-dimensional data, that is, data is below.

[Math. 45]

$$S = \{l_1, l_2, \ldots, l_k\} \subset \{1, \ldots, n\}$$ (Expression 4-1)

The registration information generation apparatus 1A generates the registration information by referring to the index information.

First, in step S41, the feature extraction unit 110A generates the feature data X, which is an n-dimensional vector, from the facial image information on the user A (see [Expression 2-1] and the top row of FIG. 17). The registration information generation apparatus 1A may acquire the feature data X via the sensor 19 or the I/F 15.

Then, in step S42, the distribution processing unit 120A refers to the index information, and performs the distribution processing on some elements in the n-dimensional feature data X. Here, the index information corresponds to information indicating that the dimensional elements identified by the data S are a subset included in the first to n-th dimensional elements in the n-dimensional data. The distribution processing unit 120A performs the distribution processing (see [Expression 2-2]) when the following expression is satisfied for the i-th dimensional element in the n-dimensional feature data X.

$$i \in S$$ [Math. 46]

The distribution processing unit 120A does not perform the distribution processing when the following expression is satisfied for the i-th dimensional element in the n-dimensional feature data X.

$$i \notin S$$ [Math. 47]

According to (Expression 4-1), the distribution processing unit 120A divides each of the $l_1$-th dimensional element $x_{l1}, \ldots, l_k$-th dimensional element $x_{lk}$ included in the n-dimensional feature data X into a plurality of random numbers. This allows to generate data that is a vector in which each of the $l_1$-th dimensional element $x_{l1}, \ldots, l_k$-th dimensional element $x_{lk}$ included in the n-dimensional feature data X is divided as follows (see the second row from the top in FIG. 17).

[Math. 48]

$$X_{sd}' = (x_1[1], x_2, \ldots, x_n, x_1[2], \ldots, x_{lk}[2])$$ (Expression 4-2)

In the following description, the data $X_{sd}'$, which is the vector in which each of the $l_1$-th dimensional element $x_{l1}, \ldots, l_k$-th dimensional element $x_{lk}$ included in the n-dimensional feature data X is divided, may be referred to as "data after partial distribution". FIG. 17 is a model diagram illustrating a flow of processing for the n-dimensional feature data X in a configuration in which the first and second dimensional elements in the n-dimensional feature data X are included in elements corresponding to the data S.

In the data after partial distribution shown in (Expression 4-2), each of the first to k-th dimensional elements in the n-dimensional feature data X is divided. Therefore, the data after partial distribution is data which is an n+k-dimensional vector.

The distribution processing in the present example embodiment corresponds to the processing for the distribution processing unit 120A to distribute each of some dimensional elements in the feature data X to a plurality of random numbers. Here, the distribution processing unit 120A determines the dimensional elements in the feature data X to be distributed, based on the index information. The distribution processing unit 120A divides each of the dimensional elements identified by the index information from among the n dimensional elements in the feature data X into a plurality of random numbers.

As mentioned above, the index information corresponds to information indicating elements to be distributed by the distribution processing unit 120A among all elements included in the feature data X. In the present example embodiment, dividing the first dimensional element $x_1$ in the feature data X into a plurality of elements (e.g., in [Expression 4-2], the random numbers $x_1[1]$ and $x_1[2]$) such that it is impossible to restore the original first dimensional element $x_1$ in the n-dimensional feature data X from only one of them may be referred to as "secret-sharing".

In (Expression 4-2), the distribution processing unit 120A generates two random numbers (random numbers $x_{lk}[1]$ and $x_{lk}[2]$) by performing the secret-sharing for the lk-th dimensional element $x_{lk}$ in the n-dimensional feature data X. However, the number of divisions for the dimensional element x in the n-dimensional feature data x is not limited to two. For example, the distribution processing unit 120A may set the number of divisions for the l1-th dimensional element $x_{l1}$ in the n-dimensional feature data x to j (i and j are any positive integers, respectively), and perform the secret-sharing for the l1-th dimensional element $x_{l1}$ in the n-dimensional feature data x (see [Expression 4-3]).

[Math. 49]

$$x_{l_1} = x_{l_1}[1] + \ldots + x_{l_1}[j] \qquad \text{(Expression 4-3)}$$

In this configuration, through the distribution processing, the distribution processing unit 120A generates j random numbers (random numbers $x_{l1}[1]$ to $x_{l1}[j]$, see [Expression 4-3]) from the l1-th dimensional element $x_{l1}$ in the n-dimensional feature data x.

Then, in step S23, for each dimensional element in the data after partial distribution, the mask processing unit 140A performs the mask processing using a mask array below (see the third row from the top in FIG. 17).

[Math. 50]

$$R = (r_1, r_2, \ldots, r_{n-1}, r_n, r_{n+1}, \ldots, r_{n+k}) \qquad \text{(Expression 4-4)}$$

As mentioned above, the mask array R is information generated by the key generation apparatus 3A. The key generation apparatus 3A generates the mask array R, which is an n+k-dimensional vector, and transmits it to the registration information generation apparatus 1A. Each element in the mask array R shown in (Expression 4-4) is as follows.

$$r_i \in \{-1, 1\} \qquad \text{[Math. 51]}$$

The positive or negative of each dimensional element in the data after partial distribution can be converted by the mask processing for multiplying each dimensional element in the data after partial distribution by the mask array R. In the following explanation, the data after partial distribution, which has been obtained through the mask processing for multiplying each dimensional element by the mask array R, may be referred to as "positive/negative-converted partial distribution data".

Next, in step S44, the permutation processing unit 130A performs the permutation processing for reordering the dimensional elements in the positive/negative-converted partial distribution data by the permutation function F using the permutation key K. The permutation key K is an example of information that defines how to reorder elements in information of interest, and corresponds to a cryptographic key randomly generated by the key generation apparatus 3A. As mentioned above, the permutation key K is information generated by the key generation apparatus 3A, and transmitted from the key generation apparatus 3A to the registration information generation apparatus 1A to generate the registration information. The permutation processing unit 130A performs the permutation processing to transform the positive/negative-converted partial distribution data into data below (see the bottom row of FIG. 17).

[Math. 52]

$$T = (t_1, t_2, \ldots, t_n, t_{n+1}, \ldots, t_{n+k})$$

The data T, which is a vector, corresponds to data in which each dimensional element in the positive/negative-converted partial distribution data is transformed based on the permutation key K. In the following explanation, the data T, which is a vector, may be referred to as "registration data T".

The registration data T (i and j are any positive integers, respectively) corresponds to, for example, data in which dimensional elements included in the positive/negative-converted partial distribution data are reordered as in (Expression 2-6).

The masking processing using the mask array R may be omitted, and the registration data T may be generated in such a configuration. Furthermore, the order of the mask processing and the permutation processing may be changed to generate the registration data T.

The registration information generation apparatus 1A transmits the registration data T generated in this manner to the DB 5A in step S45. The DB 5A stores the received registration data T therein. In step S45, the registration information generation apparatus 1A may transmit the registration data T regarding the biometric information on the user A to the DB 5A together with an identifier (user identifier) capable of identifying that the data is information on the user A.

As described above, the registration information generation apparatus 1A generates the registration data T by performing the mask processing and the permutation processing after performing the secret-sharing for some elements included in the feature data X. Therefore, in the case in which the permutation key K is not compromised, it is difficult to determine which element in the registration data T corresponds to which element in the feature data X. In addition, since the registration data T is generated from a state in which the secret-sharing has been performed on the feature data X, even if both the mask array R and the permutation key K are compromised, it is difficult to identify that registration data newly generated using the compromised mask array R and permutation key K, and the compromised registration data T are derived from feature data of the same living body. From the above, the registration information generation apparatus 1A in the present example embodiment can further reduce the risk of information leakage.

<3.2. Flow of Processing of Generating Collation Information>

In the following, a flow of processing when the collation information generation apparatus 2A performs the cancelable transformation on input information according to the present example embodiment will be described. After the registration information has been stored in the DB 5A, in performing the collation processing to determine whether biometric authentication is acceptable, the collation system 1000A has to use biometric information of the same living body as that used when the registration information is generated. The collation information generation apparatus 2A acquires biometric information on a user via the sensor 19 or the I/F 15, and performs the cancelable transformation based on the acquired biometric information. Information generated by performing the cancelable transformation on the biometric information by the collation information generation apparatus 2A is an example of the collation information to be collated with respect to the registration information stored in the DB 5A.

Figure 18:
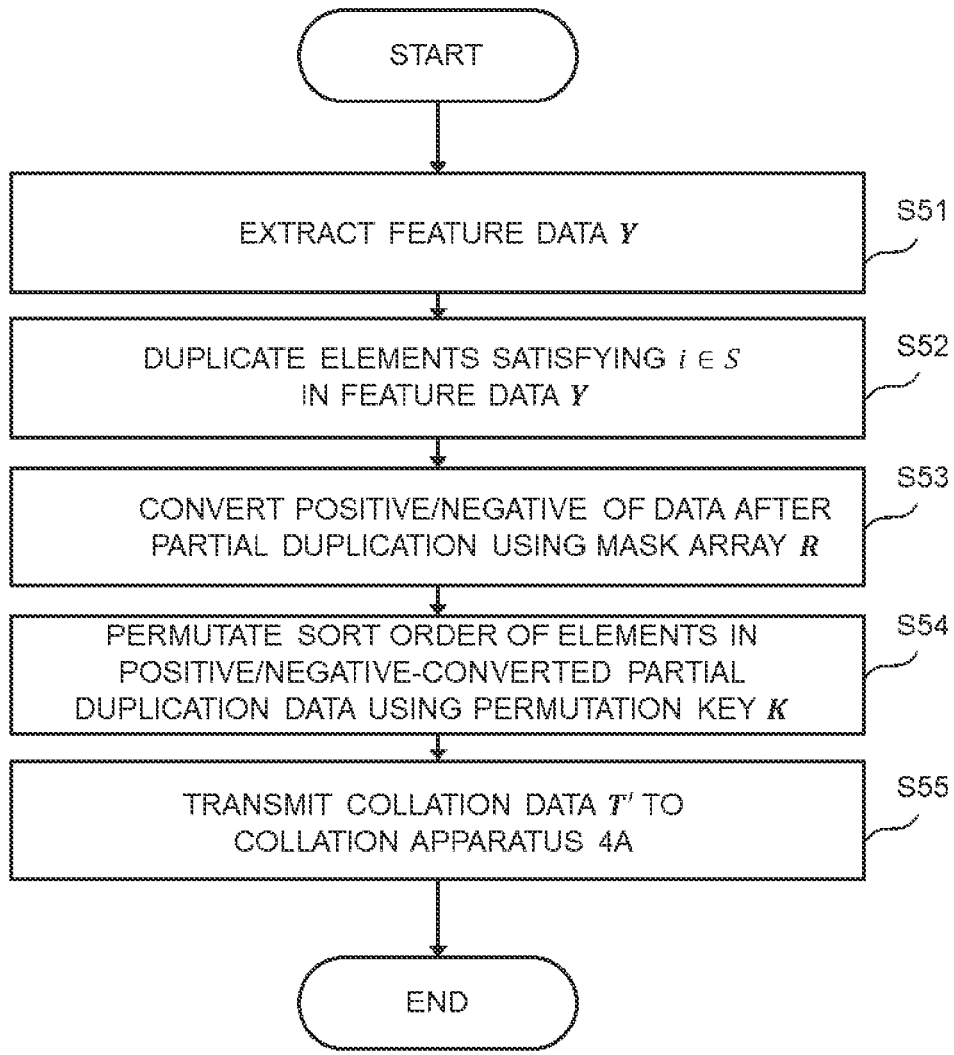
FIG. 18 is a flowchart illustrating a flow of processing of generating collation information according to the second example embodiment.
Figure 19:
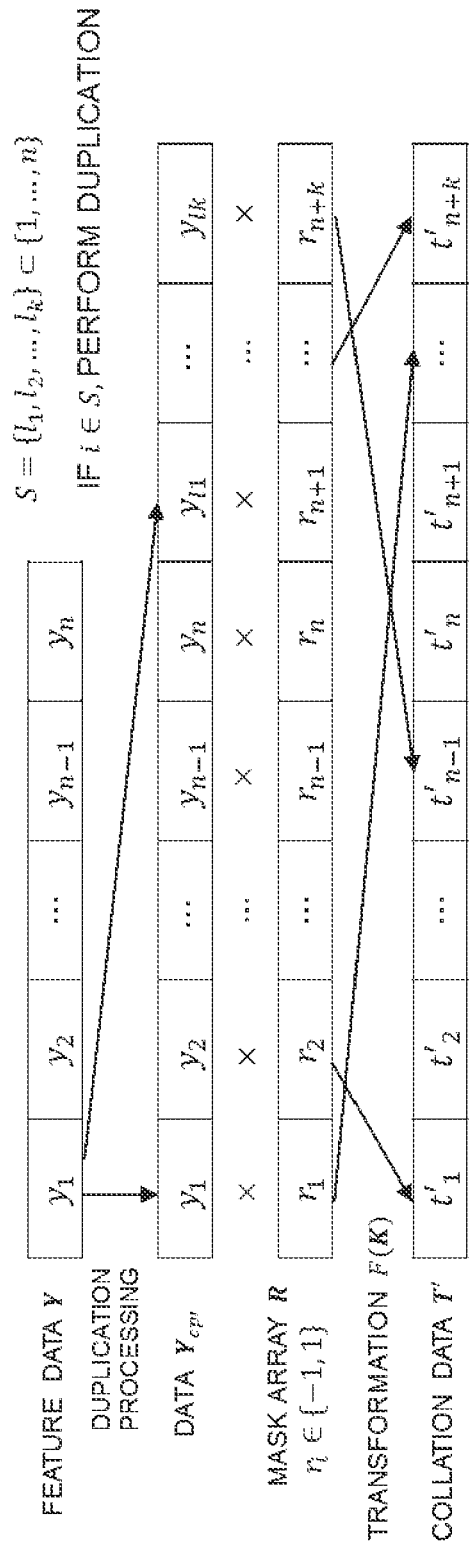
FIG. 19 is an explanation diagram of processing of generating the collation information according to the second example embodiment.

FIG. 18 is a flowchart illustrating a flow of processing of generating the collation information in the collation information generation apparatus 2A according to the present example embodiment. FIG. 19 is an explanation diagram modeling processing of generating the collation information in the collation information generation apparatus 2A according to the present example embodiment. Referring to FIGS. 18 and 19, a flow of the cancelable transformation in the collation information generation apparatus 2A will be described.

Biometric information on a user acquired by the collation information generation apparatus 2A is input to the controller 200A via the network I/F 201A. In the explanation of FIGS. 18 and 19, it is assumed that the facial image information on the user A is input to the collation information generation apparatus 2A. In the present example embodiment, the key generation apparatus 3A transmits to the collation information generation apparatus 2A index information that is information indicating that dimensional elements identified by data S correspond to a subset of n-dimensional data, that is, data is below.

[Math. 53]

$$S=\{l_1, l_2, \ldots, l_k\} \subset \{1, \ldots, n\} \quad \text{(Expression 5-1)}$$

The collation information generation apparatus 2A generates the collation information from the feature data Y by referring to the index information.

First, in step S51, the feature extraction unit 210A generates the feature data Y, which is an n-dimensional vector, from the facial image information on the user A (see [Expression 3-1] and the top row of FIG. 19). The collation information generation apparatus 2A may acquire the feature data Y via the sensor 19 or the I/F 15.

Then, in step S52, the duplication processing unit 220A refers to the index information, and performs the duplication processing on some elements in the n-dimensional feature data Y. Here, the index information corresponds to information indicating that the dimensional elements identified by the data S are a subset included in the first to n-th dimensional elements in the n-dimensional data. The duplication processing unit 220A performs the duplication processing when the following expression is satisfied for the i-th dimensional element in the n-dimensional feature data Y.

$$i \in S \quad \text{[Math. 54]}$$

The duplication processing unit 220A does not perform the duplication processing when the following expression is satisfied for the i-th dimensional element in the n-dimensional feature data Y.

$$i \notin S \quad \text{[Math. 55]}$$

According to (Expression 5-1), the duplication processing unit 220A duplicates each of the l1-th dimensional element $y_{l_1}, \ldots,$ lk-th dimensional element $y_{l_k}$ included in the n-dimensional feature data Y. This allows to generate data that is a vector in which each of the l1-th dimensional element $y_{l_1}, \ldots,$ lk-th dimensional element $y_{l_k}$ included in the n-dimensional feature data Y is duplicated as follows (see the second row from the top in FIG. 19).

[Math. 56]

$$Y_{cp'} = (y_1, y_2, \ldots, y_n, y_1, \ldots, y_{n+k}) \quad \text{(Expression 5-2)}$$

In the following description, the data $Y_{cp'}$, which is a vector in which each of the l1-th dimensional element $y_{l_1}, \ldots,$ lk-th dimensional element $y_{l_k}$ included in the n-dimensional feature data Y is duplicated, may be described as "data after partial duplication".

FIG. 19 is a model diagram illustrating a flow of processing for the n-dimensional feature data Y in a configuration in which the first and second dimensional elements in the n-dimensional feature data Y are included in elements corresponding to the data S. In the data after partial duplication shown in (Expression 5-2), each of the first to k-th dimensional elements in the n-dimensional feature data Y is duplicated. Therefore, the data after partial duplication is data which is an n+k-dimensional vector.

The duplication processing in the present example embodiment corresponds to the processing for the duplication processing unit 220A to duplicate each of some dimensional elements in the feature data Y. Here, the duplication processing unit 220A determines the dimensional elements in the feature data Y to be duplicated, based on the index information. The duplication processing unit 220A duplicates each of dimensional elements identified by the index information from among the n dimensional elements in the feature data Y.

As mentioned above, the index information corresponds to information indicating elements to be duplicated by the duplication processing unit 220A among all elements included in the feature data Y.

When the registration information generation apparatus 1A divides each of some dimensional elements in the feature data X into n1 elements, the duplication processing unit 220A performs the duplication processing in which each of some dimensional element in the feature data Y is duplicated n2 times. Here, n1=n2, and n1 and n2 are integers of 2 or more, respectively. In the following description, the data $Y_{cp'}$, which is a n+k-dimensional vector, generated by performing the duplication processing on the n-dimensional feature data Y may be referred to as "data after partial duplication".

In the present example embodiment, the distribution processing and the duplication processing are performed such that the number of divisions for the feature data X in the registration information generation apparatus 1A and the number of duplications for the feature data Y in the collation information generation apparatus 2A are the same.

Then, in step S53, the mask processing unit 240A performs the mask processing using the mask array R for each dimensional element in the data after partial duplication (see [Expression 4-4] and the third row from the top in FIG. 19). As mentioned above, the mask array R is information generated by the key generation apparatus 3A. The key generation apparatus 3A generates the mask array R, which is an n+k-dimensional vector, and transmits it to the collation information generation apparatus 2A. In the present example embodiment, the key generation apparatus 3A transmits the same mask array R to the registration information generation apparatus 1A and the collation information generation apparatus 2A.

The positive or negative of each dimensional element in the data after partial duplication can be converted by the mask processing for multiplying each dimensional element in the data after partial duplication by the mask array R. In the following explanation, the data after partial duplication obtained through the mask processing of multiplying each dimensional element by the mask array R may be referred to as "positive/negative-converted partial duplication data".

Then, in step S54, the permutation processing unit 230A performs the permutation processing for reordering the dimensional elements in the positive/negative-converted partial duplication data by the permutation function F using the permutation key K. The permutation key K is an example of information that defines how to reorder elements in information of interest, and corresponds to a cryptographic key randomly generated by the key generation apparatus 3A. As mentioned above, the permutation key K is information generated by the key generation apparatus 3A, and transmitted from the key generation apparatus 3A to the collation information generation apparatus 2A to generate the collation information. In the present example embodiment, the key generation apparatus 3A transmits the same permutation key K to the registration information generation apparatus 1A and the collation information generation apparatus 2A.

The permutation processing unit 230A performs the permutation processing to transform the positive/negative-converted partial duplication data into data below (see the bottom row of FIG. 19).

[Math. 57]

$$T' = (t'_1, t'_2, \ldots, t'_n, t'_{n+1}, \ldots, t'_{n+k})$$

The data T', which is a vector, corresponds to data in which each dimensional element in the positive/negative converted partial duplication data is transformed based on the permutation key K. In the following explanation, the data T', which is a vector, may be referred to as "collation data T'".

The same permutation key K is used in both the registration information generation apparatus 1A and the collation information generation apparatus 2A. In other words, in the permutation processing performed by the collation information generation apparatus 2A, the dimensional elements in the positive/negative-converted partial duplication data are reordered in the same sort order as in the permutation processing in the registration information generation apparatus 1A. In other words, the collation data T' (i and j are any positive integers, respectively) corresponds, for example, to data in which the dimensional elements in the positive/negative-converted partial duplication data are reordered as in (Expression 3-3).

The masking processing using the mask array R may be omitted, and the collation data T' may be generated in such a configuration. Furthermore, the order of the mask processing and the permutation processing may be changed to generate the collation data T'.

Then, in step S55, the network I/F 201A transmits the collation data T' to the collation apparatus 4A. At this time, the network I/F 201A may transmit the collation data T' to the collation apparatus 4A together with an identifier (user identifier) capable of identifying that the data is information on the user A.

As described above, the collation information generation apparatus 2A generates the collation data T' by performing the mask processing and the permutation processing after duplicating the elements included in the feature data Y. Therefore, in the case in which the permutation key K is not compromised, it is difficult to determine which element in the collation data T' corresponds to which element in the feature data Y. From the above, the collation information generation apparatus 2A in the present example embodiment can further reduce the risk of information leakage.

<3.3. Calculation of Similarity in Second Example Embodiment>

In the present example embodiment, the collation apparatus 4A performs collation between biometric information input to the registration information generation apparatus 1A and biometric information input to the collation information generation apparatus 2A in the same manner as in the first example embodiment (see FIG. 13).

In step S31, the network I/F 401A acquires the registration data T from the DB 5A. The DB 5A stores therein the registration data T regarding the biometric information on the user A received from the registration information generation apparatus 1A in step S45, together with an identifier capable of identifying that the data is information on the user A. The collation apparatus 4A acquires from the DB 5A the registration data T regarding the biometric information on the user corresponding to the user identifier received from the collation information generation apparatus 2A in step S55, that is, the user A.

In step S32, the similarity calculation unit 410A of the collation apparatus 4A calculates an inner product of the registration data T and the collation data T' as a normalized correlation between the registration data T and the collation data T'. Here, the inner product of the registration data T and the collation data T', each of which is an n+k-dimensional vector, is defined as follows.

[Math. 58]

$$\langle T, T' \rangle = \sum t_i \cdot t'_i$$

According to (Expression 2-2), (Expression 2-5) and (Expression 3-3), the following is calculated in the same manner as in the first example embodiment.

[Math. 59]

$$t_i \cdot t'_i + t_j \cdot t'_j = r_1^2 \cdot x_1[1] y_1 + r_{n+1}^2 \cdot x_1[2] y_1 = y_1(x_1[1] + x_1[2]) = x_1 \cdot y_1$$

In other words, the inner product of the registration data T and the collation data T' is equal to an inner product of the feature data X and the feature data Y (Expression 3-4).

Also in the present example embodiment, the similarity calculation unit 410A calculates the inner product of the registration data T and the collation data T' as the similarity between the feature data X and the feature data Y.

Next, in step S33, the collation processing unit 420A performs the collation processing for performing collation between the biometric information pertaining to the feature data X and the biometric information pertaining to the feature data Y, based on the similarity between the feature data X and the feature data Y calculated in step S32.

In addition, the collation apparatus 4A may authenticate a user identified by the collation information based on the result of the collation processing in step S33.

Further, for the mask array R used in the registration information generation apparatus 1A, the collation information generation apparatus 2A performs the mask processing using a mask array below.

[Math. 60]

$$R' = (r_1^{-1}, r_2^{-1}, \ldots, r_{n-1}^{-1}, r_n^{-1}, \ldots, r_{n+1}^{-1}, r_{n+k}^{-1}) \quad \text{(Expression 3-6)}$$

Hereinafter, the mask array R', which is a vector, may be simply referred to as "mask array R'". According to (Expression 4-4) and (Expression 3-6), each element in the mask array R' satisfies the following expression for any positive integer j.

$$r_j r_j^{-1} = 1 \quad \text{[Math. 61]}$$

That is, each element in the mask array R', which is $$r_j^{-1} \quad \text{[Math. 62]}$$

corresponds to a multiplicative inverse of each element $r_j$ of the mask array R shown in (Expression 4-4).

As described above, according to the present example embodiment, in the above calculation processing using the registration data T generated by the registration information generation apparatus 1A and the collation data T' generated by the collation information generation apparatus 2A, the similarity can be calculated by calculating the inner product once. Therefore, a high throughput can be expected, similar to the cancelable biometrics of the related art. In addition, since the inner product of the registration data T and the collation data T' is equal to the inner product of the feature data X and the feature data Y, the collation accuracy can be maintained as in the cancelable biometrics of the related art. Accordingly, the registration information generation apparatus 1A and the collation information generation apparatus 2A according to the present example embodiment can perform the cancelable transformation capable of suppressing the degradation of collation accuracy and reducing the risk of information leakage.

Also in the present example embodiment, as in the example alternation of the first example embodiment, the elements included in the key generation apparatus 3A may be provided in the registration information generation apparatus 1A and the collation information generation apparatus 2A (see FIGS. 14 and 15). In this way, the registration information generation apparatus 1A and the collation information generation apparatus 2A can perform the cancelable transformation without communicating with the key generation apparatus 3A. Therefore, it is possible to further reduce the risk of leakage of the mask array R and the permutation key K in a communication path with the key generation apparatus 3A.

4. Third Example Embodiment

Next, a third example embodiment of the present invention will be described below. In the first and second example embodiments, the distribution processing is performed on at least some of the dimensional elements included in the feature data X. Meanwhile, in the third example embodiment, a configuration will be described in which collating is performed based on information generated by performing the distribution processing and the duplication processing on features extracted from biometric information on a user. Note that, in the third example embodiment, elements to which the same configuration in the first and second example embodiments are applicable are denoted by the same reference signs, and overlapping descriptions hence are omitted.

<4.1. Overview of Example Operation Embodiment of Collation System>

Figure 20:
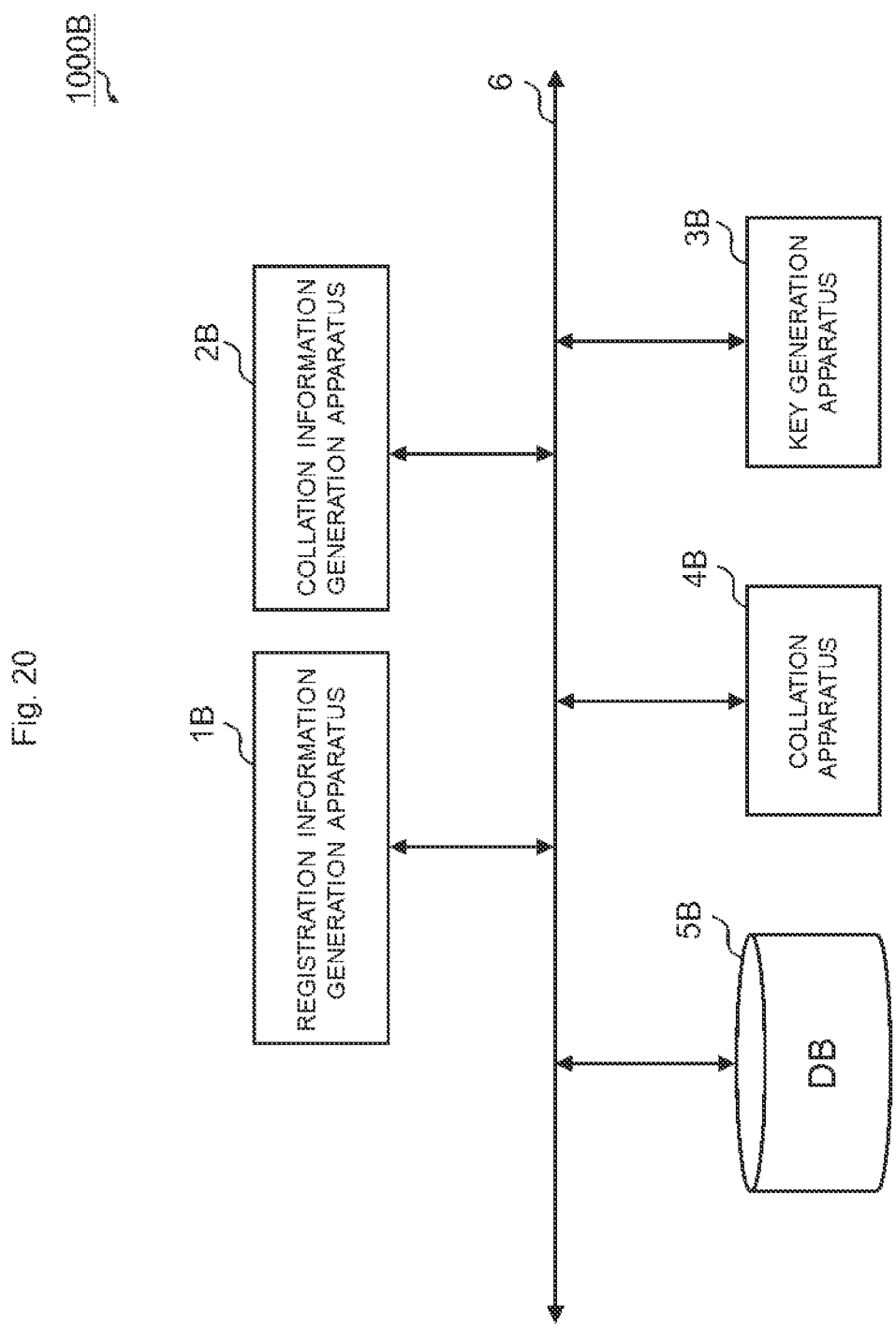
FIG. 20 is a diagram illustrating an example operation embodiment of a collation system according to a third example embodiment.

FIG. 20 is a diagram illustrating an example operation embodiment of a collation system 1000B according to the third example embodiment of the present invention. As illustrated in FIG. 20, the collation system 1000B includes a registration information generation apparatus 1B, a collation information generation apparatus 2B, a key generation apparatus 3B, a collation apparatus 4B, and a database (Data Base, hereinafter sometimes referred to as "DB") 5B, and these are connected via a network 6.

The registration information generation apparatus 1B, the collation information generation apparatus 2B, the key generation apparatus 3B, the collation apparatus 4B, and the DB 5B have the same hardware configuration as the registration information generation apparatus 1A, the collation information generation apparatus 2A, the key generation apparatus 3A, the collation apparatus 4A, and the DB 5A in the first and second embodiments, respectively (see FIG. 2). Therefore, in the description of the third example embodiment, descriptions of the hardware configuration pertaining to the registration information generation apparatus 1B, the collation information generation apparatus 2B, the key generation apparatus 3B, the collation apparatus 4B, and the DB 5B are omitted.

The registration information generation apparatus 1B is an information processing apparatus, such as a computer or server, on which a program for generating, from biometric information on a user, registration information for registration in the collation system 1000B is installed. The registration information generation apparatus 1B may be implemented, for example, by a portable information processing terminal such as a smartphone, an ATM, or a PC connected to a sensor for detecting the biometric information. Details of processing of generating the registration information in the registration information generation apparatus 1B will be described later.

The collation information generation apparatus 2B is an information processing apparatus, such as a computer or server, on which a program for generating, from the biometric information on a user, collation information for collating with the registration information registered in the collation system 1000B is installed. The collation information generation apparatus 2B may be implemented, for example, by a portable information processing terminal such as a smartphone, an ATM, or a PC connected to a sensor for detecting the biometric information. Details of processing of generating the collation information in the collation information generation apparatus 2B will be described later.

The key generation apparatus 3B is an information processing apparatus for generating a secret key to be used in transforming biometric information on a user into the registration information or the collation information. The key generation apparatus 3B generates, for example, random numbers, mask arrays, and permutation keys as secret keys. The key generation apparatus 3B transmits the generated secret keys to the registration information generation apparatus 1B and the collation information generation apparatus 2B via the network 6.

The collation apparatus 4B is an information processing apparatus for performing collation between the collation information and the registration information. For example, in a biometric authentication technology, the collation apparatus 4B collates features in biometric information on a user, which is input for authentication, with features in biometric information on the user, which have been stored as the registration information. The collation system 1000B may authenticate the user identified by the collation information based on a result of the collation between the collation information and the registration information.

The DB 5B is a storage medium that stores the registration information generated by the registration information generation apparatus 1B. The collation apparatus 4B collates the collation information with the registration information stored in the DB 5B. Although FIG. 20 illustrates the collation apparatus 4B and the DB 5B as separated elements, the DB 5B may be implemented in a storage medium such as an HDD included in the collation apparatus 4B.

Although FIG. 20 illustrates an example in which the registration information generation apparatus 1B and the collation information generation apparatus 2B are connected to the network 6, they do not need to be connected to the network 6. For example, the registration information generation apparatus 1B or the collation information generation apparatus 2B may be connected to the key generation apparatus 3B, the collation apparatus 4B, and the DB 5B by using a USB or the like. The registration information generation apparatus 1B may be connected to the DB 5B when transmitting the registration information to the DB 5B. Further, the collation information generation apparatus 2B may be connected to the collation apparatus 4B when transmitting the collation information. Furthermore, the key generation apparatus 3B may be connected to the registration information generation apparatus 1B or the collation information generation apparatus 2B when transmitting a secret key.

In the hardware configuration illustrated in FIG. 2, the CPU 11 of the registration information generation apparatus 1B performs calculations in accordance with a program stored in the ROM 12 of the registration information generation apparatus 1B, or a program loaded into the RAM 13 of the registration information generation apparatus 1B from the storage medium 14 of the registration information generation apparatus 1B, thereby to implement software control units of the registration information generation apparatus 1B.

The combination of the software control units configured above and the hardware allows to implement functional blocks that can realize functions of a controller 100B (see FIG. 21) of the registration information generation apparatus 1B according to the present example embodiment.

In the hardware configuration illustrated in FIG. 2, the CPU 11 of the collation information generation apparatus 2B performs calculations according to a program stored in the ROM 12 of the collation information generation apparatus 2B, or a program loaded into the RAM 13 of the collation information generation apparatus 2B from the storage medium 14 of the collation information generation apparatus 2B, thereby to implement software control units of the collation information generation apparatus 2B.

The combination of the software control units configured above and the hardware allows to implement functional blocks that can realize functions of a controller 200B (see FIG. 22) of the collation information generation apparatus 2B according to the present example embodiment.

In the hardware configuration illustrated in FIG. 2, the CPU 11 of the key generation apparatus 3B performs calculations in accordance with a program stored in the ROM 12 of the key generation apparatus 3B or a program loaded into the RAM 13 of the key generation apparatus 3B from the storage medium 14 of the key generation apparatus 3B, thereby to implement software control units of the key generation apparatus 3B.

The combination of the software control units configured above and the hardware allows to implement functional blocks that can realize functions of a controller 300B (see FIG. 23) of the key generation apparatus 3B according to the present example embodiment.

In the hardware configuration illustrated in FIG. 2, the CPU 11 of the collation apparatus 4B performs calculations in accordance with a program stored in the ROM 12 of the collation apparatus 4B or a program loaded into the RAM 13 of the collation apparatus 4B from the storage medium 14 of the collation apparatus 4B, thereby to implement software control units of the collation apparatus 4B.

The combination of the software control units configured above and the hardware allows to implement functional blocks that can realize functions of a controller 400B (see FIG. 24) of the collation apparatus 4B according to the present example embodiment.

<4.2. Functional Configuration of Registration Information Generation Apparatus>

Figure 21:
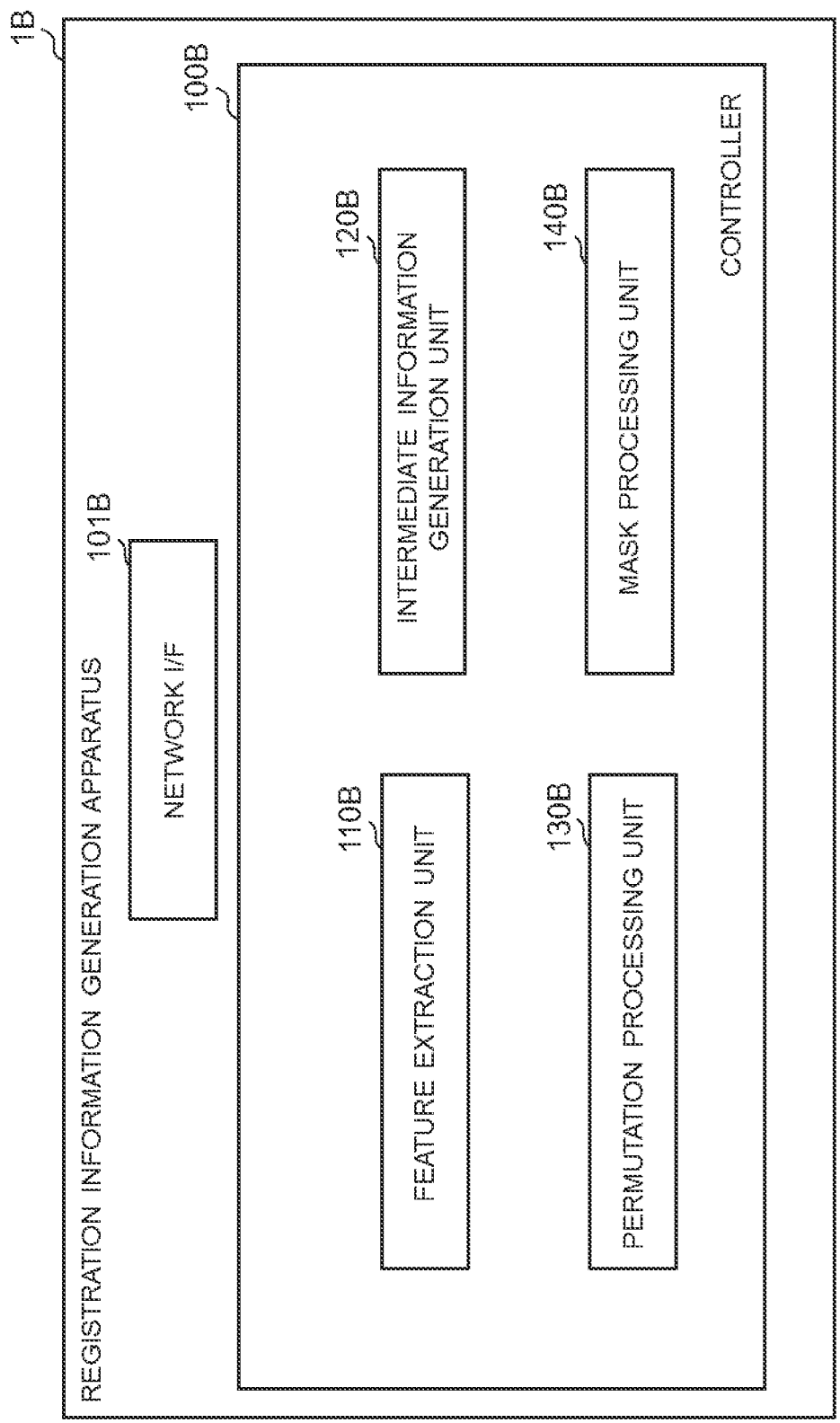
FIG. 21 is a functional block diagram illustrating an example of a functional configuration of a registration information generation apparatus according to the third example embodiment.

Next, with reference to FIG. 21, a functional configuration of the registration information generation apparatus 1B will be described. FIG. 21 is a functional block diagram illustrating an example of a functional configuration of the registration information generation apparatus 1B. As illustrated in FIG. 21, the registration information generation apparatus 1B includes the controller 100B, and a network I/F 101B that is an interface for the controller 100B to exchange information with other devices via the network 6.

The controller 100B generates registration information to be used in the collation system 1000B from information acquired via the network I/F 101B. The registration information is one of pieces of information to be used for collating in the collation system 1000B. The registration information generated by the registration information generation apparatus 1B is stored in the DB 5B. The controller 100B is implemented by installing a dedicated software program in the information processing apparatus such as the registration information generation apparatus 1B. The controller 100B includes a feature extraction unit 110B, an intermediate information generation unit 120B, a permutation processing unit 130B, and a mask processing unit 140B.

For authentication, the feature extraction unit 110B extracts features from biometric information input to the controller 100B via the sensor 19 or the I/F 15 of the registration information generation apparatus 1B. In the present example embodiment, for example, feature data X, which is an n-dimensional vector, is extracted from biometric information such as fingerprints, veins, irises, and face images.

The intermediate information generation unit 120B generates intermediate information from input information by performing distribution processing and duplication processing. Details of the respective distribution processing and duplication processing in the present example embodiment will be described later.

The permutation processing unit 130B performs permutation processing for permutating the arrangement of elements in input information based on a secret key such as the permutation key K. Details of the permutation processing in the present example embodiment are described later.

The mask processing unit 140B performs mask processing for transforming elements in input information using a mask array. Details of the mask processing in the present example embodiment are described later.

<4.3. Functional Configuration of Collation Information Generation Apparatus>

Figure 22:
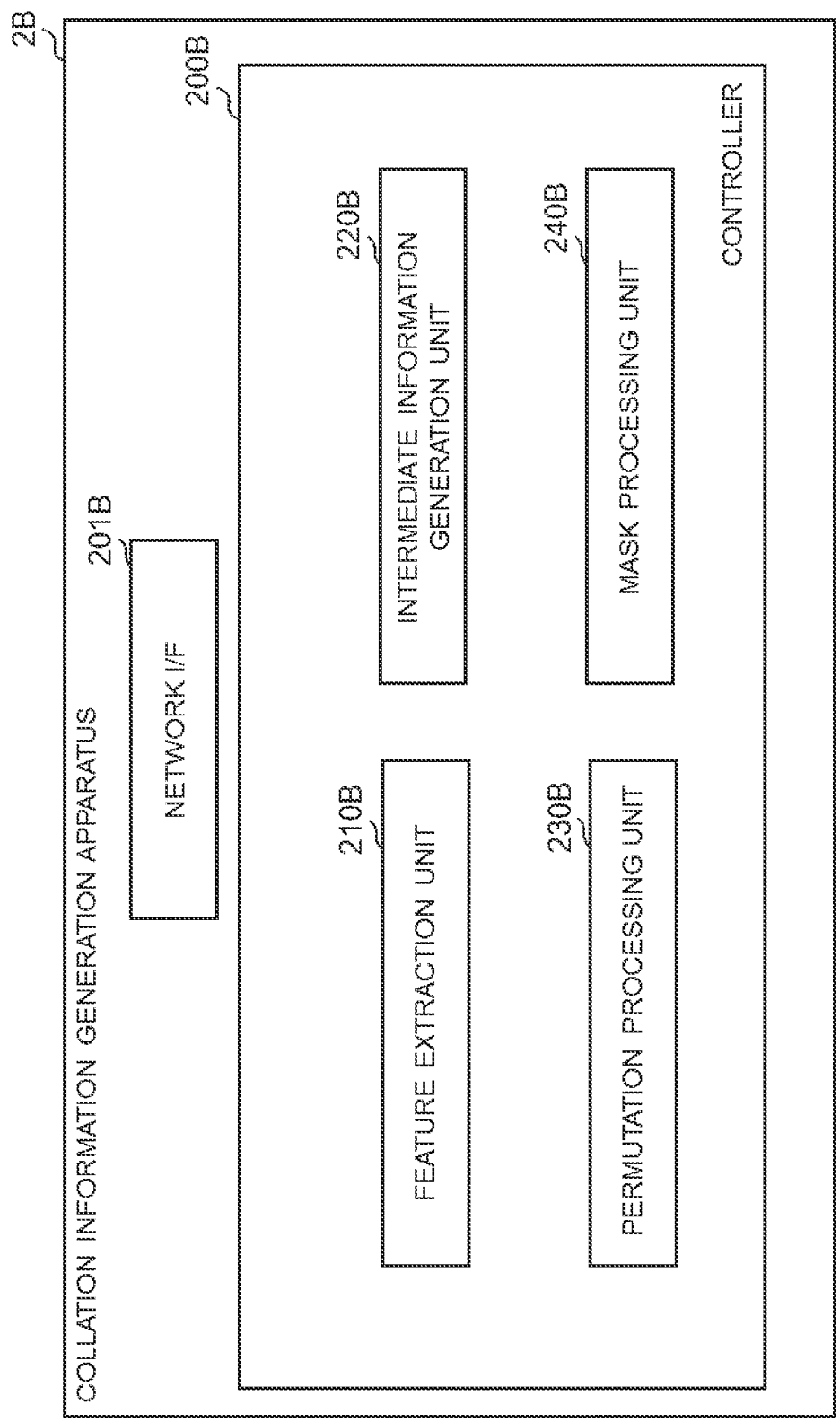
FIG. 22 is a functional block diagram illustrating an example of a functional configuration of a collation information generation apparatus according to the third example embodiment.

Next, with reference to FIG. 22, a functional configuration of the collation information generation apparatus 2B will be described. FIG. 22 is a functional block diagram illustrating an example of a functional configuration of the collation information generation apparatus 2B. As illustrated in FIG. 22, the collation information generation apparatus 2B includes the controller 200B, and a network I/F 201B that is an interface for the controller 200B to exchange information with other devices via the network 6.

The controller 200B generates collation information to be used in the collation system 1000B from information acquired via the network I/F 201B. The collation information is one of pieces of information to be used for collating in the collation system 1000B. The collation information generated by the collation information generation apparatus 2B is transmitted to the collation apparatus 4B. The controller 200B is implemented by installing a dedicated software program in the information processing apparatus such as the collation information generation apparatus 2B. The controller 200B includes a feature extraction unit 210B, an intermediate information generation unit 220B, a permutation processing unit 230B, and a mask processing unit 240B.

For authentication, the feature extraction unit 210B extracts features from biometric information input to the controller 200B via the sensor 19 or the I/F 15 of the collation information generation apparatus 2B. In the present example embodiment, for example, feature data Y, which is an n-dimensional vector, is extracted from biometric information such as fingerprints, veins, irises, and face images.

The intermediate information generation unit 220B generates intermediate information from input information by performing distribution processing and duplication processing. Details of the respective distribution processing and duplication processing in the present example embodiment will be described later.

The permutation processing unit 230B performs permutation processing for permutating the arrangement of elements in input information based on a secret key such as the permutation key K. Details of the permutation processing in the present example embodiment are described later.

The mask processing unit 240B performs mask processing for transforming elements in input information using a mask array. Details of the mask processing in the present example embodiment are described later.

<4.4. Functional Configuration of Key Generation Apparatus>

Figure 23:
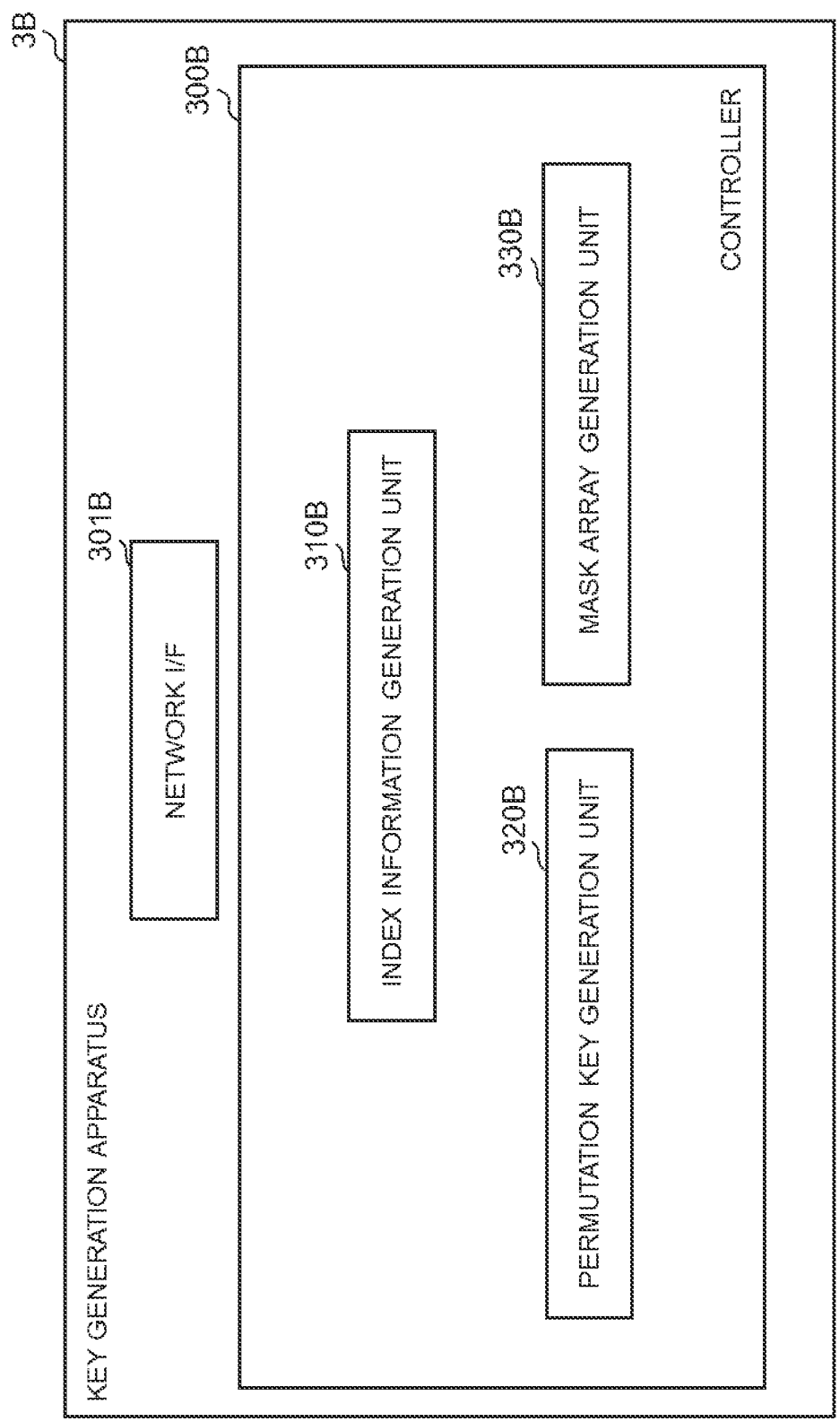
FIG. 23 is a functional block diagram illustrating an example of a functional configuration of a key generation apparatus according to the third example embodiment.

Further, with reference to FIG. 23, a functional configuration of the key generation apparatus 3B will be described. FIG. 23 is a functional block diagram illustrating an example of a functional configuration of the key generation apparatus 3B. As illustrated in FIG. 23, the key generation apparatus 3B includes the controller 300B, and a network I/F 301B that is an interface for the controller 300B to exchange information with other devices via the network 6.

The controller 300B generates a secret key to be used in the collation system 1000B from information acquired via the network I/F 301B. The controller 300B is implemented by installing a dedicated software program in the information processing apparatus such as the key generation apparatus 3B. The controller 300B includes an index information generation unit 310B, a permutation key generation unit 320B, and a mask array generation unit 330B.

The index information generation unit 310B generates index information that is information for identifying what processing is to be performed for each element with respect to elements included in information. As described above, the registration information generation apparatus 1B and the collation information generation apparatus 2B perform the distribution processing and the duplication processing for elements included in information. The index information generation unit 310B generates, for example, information indicating an element subject to the distribution processing as the index information. The index information generation unit 310B may generate index information including information indicating an element subject to the distribution processing, and information indicating an element subject to the duplication processing. The network I/F 301B transmits the index information generated by the index information generation unit 310B to the registration information generation apparatus 1B and the collation information generation apparatus 2B.

The permutation key generation unit 320B generates a secret key such as the permutation key K to be used in the permutation processing performed in each of the registration information generation apparatus 1B and the collation information generation apparatus 2B. The network I/F 301B transmits the secret key such as the permutation key K generated by the permutation key generation unit 320B to the registration information generation apparatus 1B and the collation information generation apparatus 2B.

The mask array generation unit 330B generates a mask array to be used in the mask processing performed in each of the registration information generation apparatus 1B and the collation information generation apparatus 2B. The network interface 301B transmits the mask array generated by the mask array generation unit 330B to the registration information generation apparatus 1B and the collation information generation apparatus 2B.

<4.5. Functional Configuration of Collation Apparatus>

Figure 24:
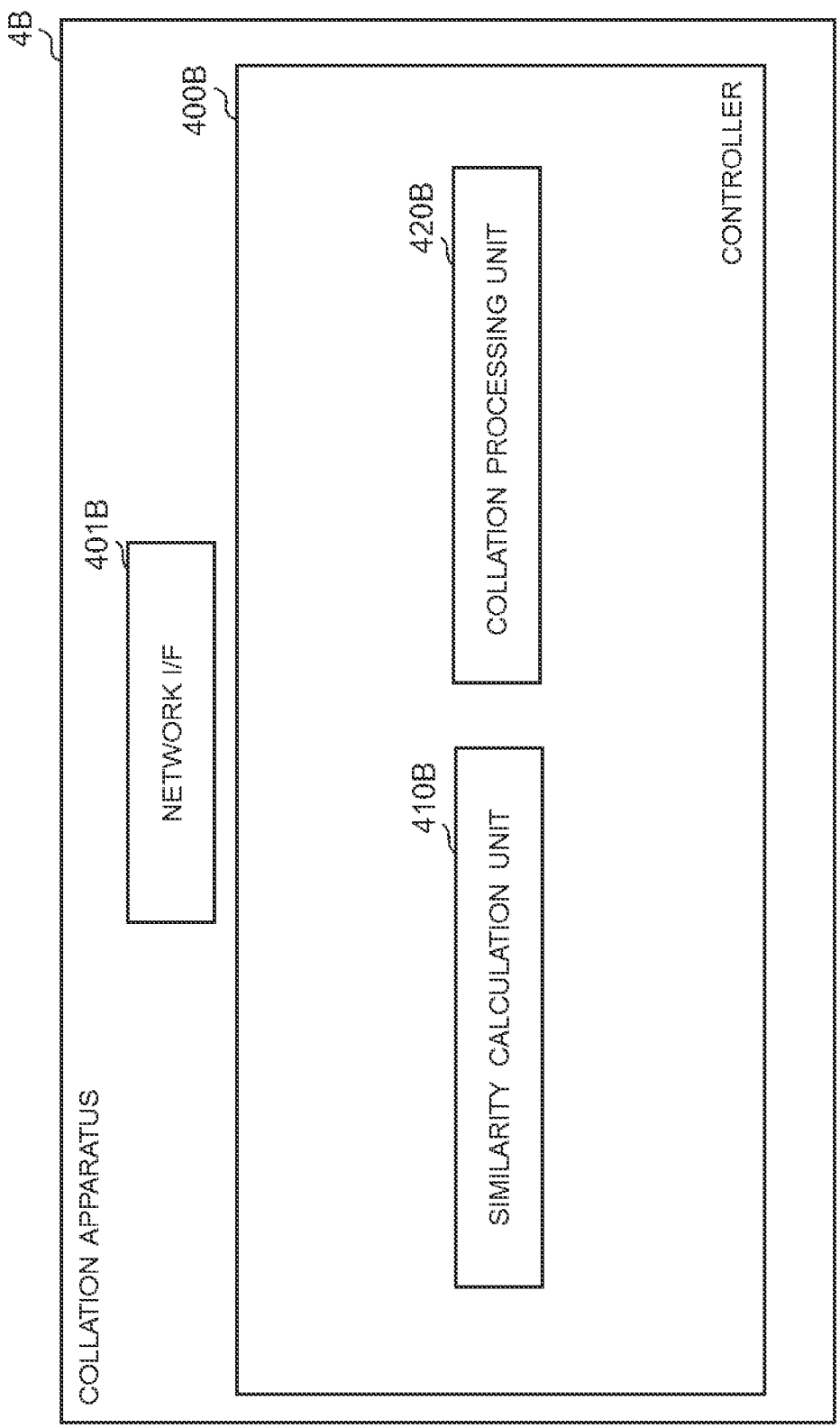
FIG. 24 is a functional block diagram illustrating an example of a functional configuration of a collation apparatus according to the third example embodiment.

Furthermore, with reference to FIG. 24, a functional configuration of the collation apparatus 4B will be described. FIG. 24 is a functional block diagram illustrating an example of a functional configuration of the collation apparatus 4B. As illustrated in FIG. 24, the collation apparatus 4B includes the controller 400B, and a network I/F 401B that is an interface for the controller 400B to exchange information with other devices via the network 6.

The controller 400B acquires pieces of information input to the collation system 1000B via the network I/F 401B, and performs collation based on the acquired pieces of information. The controller 400B is implemented by installing a dedicated software program in the information processing apparatus such as the collation apparatus 4B. The controller 400B includes a similarity calculation unit 410B and a collation processing unit 420B.

The similarity calculation unit 410B calculates, with respect to a plurality of pieces of information, a similarity indicating a degree of similarity between the pieces of information. In the present example embodiment, the similarity calculation unit 410B calculates the similarity based on a normalized correlation between the registration information and the collation information. Details of the processing performed by the similarity calculation unit 410B will be described later.

The collation processing unit 420B performs collation processing for determining whether the plurality of pieces of information match with each other, based on the similarity calculated by the similarity calculation unit 410B. For example, in the case in which the similarity calculation unit 410B calculates the similarity between the registration information and the collation information, the collation processing unit 420B determines, in the collation processing, whether the collation information matches the registration information based on the similarity calculated by the similarity calculation unit 410B.

With the configuration described above, the collation system 1000B calculates the similarity between the registration information generated by the registration information generation apparatus 1B and the collation information generated by the collation information generation apparatus 2B. Then, based on the calculated similarity, the collation system 1000B determines whether the registration information and the collation information match with each other. Information related to a determination result indicating whether the collation information in the collation processing matches the registration information may be used as information to determine whether the user is authenticated in the authentication system having the collation system 1000B.

<4.6. Flow of Processing of Generating Registration Information>

In the following, a flow of processing when the registration information generation apparatus 1B performs the cancelable transformation on input information according to the present example embodiment will be described. In performing the collation processing to determine whether to be authenticated in the biometric authentication, the collation system 1000B first generates the registration information, which is one of pieces of information to be used for collation, from biometric information on a user input to the collation system 1000B. The registration information generation apparatus 1B acquires the biometric information on the user input to the collation system 1000B via the sensor 19 or the I/F 15 (see FIG. 2), and generates the registration information based on the acquired biometric information.

Figure 25:
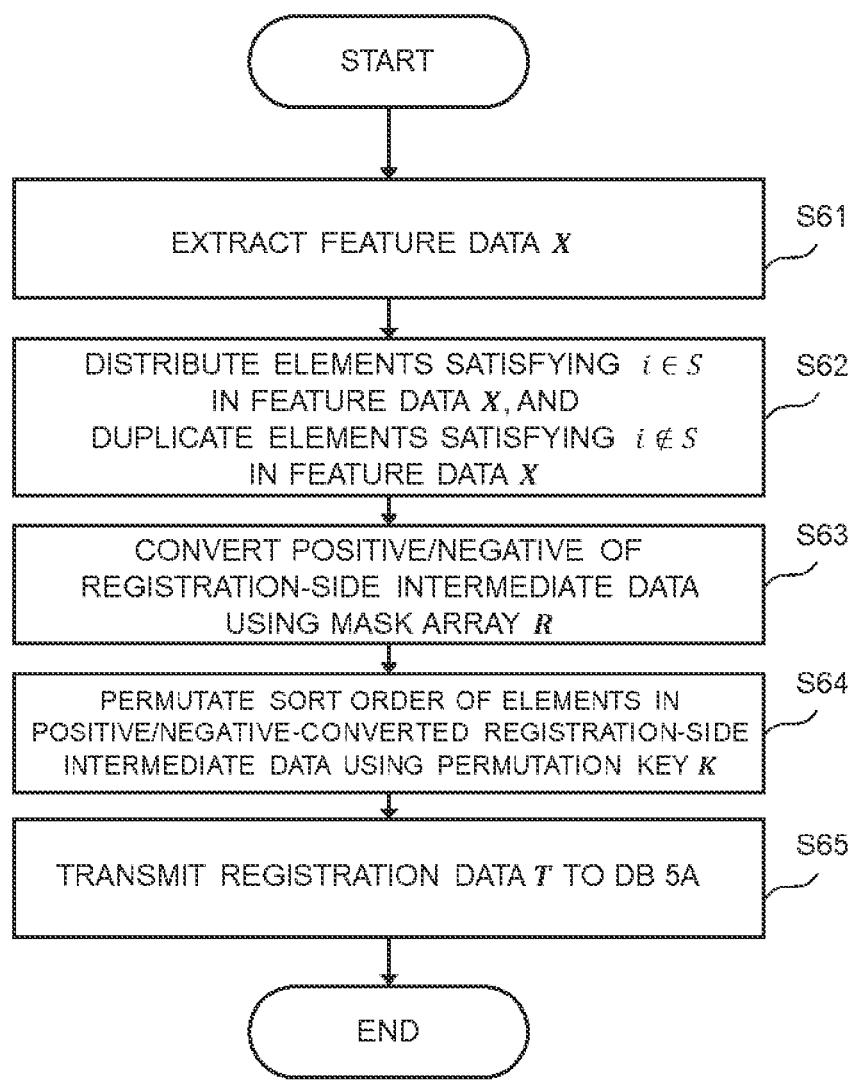
FIG. 25 is a flowchart illustrating a flow of processing for generating registration information according to the third example embodiment.
Figure 26:
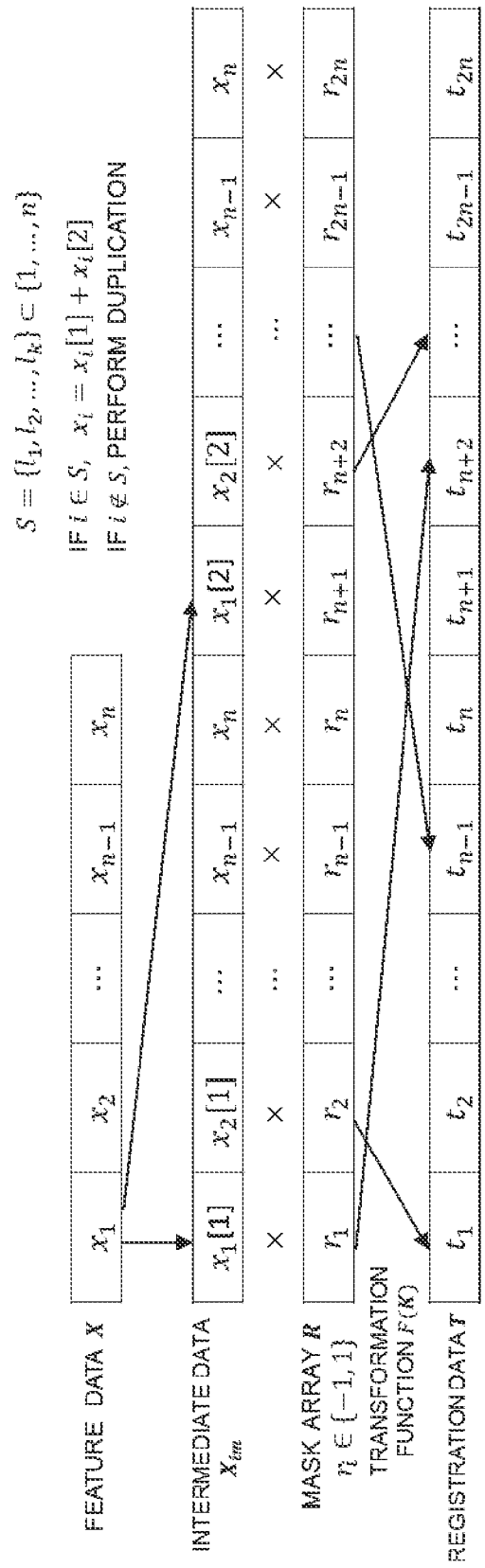
FIG. 26 is an explanation diagram of processing for generating the registration information according to the third example embodiment.

FIG. 25 is a flowchart illustrating a flow of processing for generating the registration information in the registration information generation apparatus 1B according to the present example embodiment. FIG. 26 is an explanation diagram modeling processing for generating the registration information in the registration information generation apparatus 1B according to the present example embodiment. Referring to FIGS. 25 and 26, a flow of the cancelable transformation in the registration information generation apparatus 1B will be described.

Biometric information on a user acquired by the registration information generation apparatus 1B is input to the controller 100B via the network I/F 101B. In the explanation of FIGS. 25 and 26, it is assumed that facial image information on a user B is input to the registration information generation apparatus 1B. In the present example embodiment, the key generation apparatus 3B transmits to the registration information generation apparatus 1B index information that is information indicating that dimensional elements identified by data S correspond to a subset of n-dimensional data, that is, data is below.

[Math. 63]

$$S = \{l_1, l_2, \ldots, l_k\} \subset \{1, \ldots, n\} \quad \text{(Expression 6-1)}$$

The registration information generation apparatus 1B generates the registration information by referring to the index information.

First, in step S61, the feature extraction unit 110B generates the feature data X, which is an n-dimensional vector, from the facial image information on the user B (see [Expression 2-1] and the top row of FIG. 26). The registration information generation apparatus 1B may acquire the feature data X via the sensor 19 or the I/F 15.

Then, in step S62, the intermediate information generation unit 120B refers to the index information, and performs the distribution processing on some elements in the n-dimensional feature data X. Here, as shown in (Expression 6-1), the index information corresponds to information indicating that the dimensional elements identified by the data S are a subset included in the first to n-th dimensional elements in the n-dimensional data. The intermediate information generation unit 120B performs the distribution processing (see [Expression 2-2]) when the following expression is satisfied for the i-th dimensional element in the n-dimensional feature data X.

$$i \in S \quad \text{[Math. 64]}$$

The intermediate information generation unit 120B performs the duplication processing when the following expression is satisfied for the i-th dimensional element in the n-dimensional feature data X.

$$i \notin S \quad \text{[Math. 65]}$$

According to (Expression 4-1), in step S62, the intermediate information generation unit 120B divides each of the l1-th dimensional element $x_{l_1}$, . . . , lk-th dimensional element $x_{l_k}$ included in the n-dimensional feature data X into a plurality of random numbers. In addition, in step S62, the intermediate information generation unit 120B duplicates dimensional elements other than the l1-th to lk-th dimensional elements $x_{l_1}$, . . . , $x_{l_k}$ included in the n-dimensional feature data X. This allows to generate data that is a vector in which each of the l1-th dimensional element $x_{l_1}$, . . . , lk-th dimensional element $x_{l_k}$ included in the n-dimensional feature data X is divided, and the dimensional elements other than the l1-th to lk-th dimensional elements $x_{l_1}$, . . . , $x_{l_k}$ included in the n-dimensional feature data X are duplicated as follows (see the second row from the top in FIG. 26).

[Math. 66]

$$X_{im} = \quad \text{(Expression 6-2)}$$

$$(x_1[1], x_2[1], \ldots, x_{n-1}, x_n, x_1[2], x_2[2], \ldots, x_{n-1}, x_n)$$

In the following description, the data $X_{im}$, which is a vector, may be referred to as "registration-side intermediate data".

FIG. 26 is a model diagram illustrating a flow of processing for the n-dimensional feature data X in a configuration in which the first and second dimensional elements in the n-dimensional feature data X are elements corresponding to the data S and the n−1-th and n-th dimensional elements in the n-dimensional feature data X are elements not corresponding to the data S.

In the registration-side intermediate data shown in (Expression 6-2), each of the first to k-th dimensional elements included in the feature data X, which is a n-dimensional vector, is distributed, and each of the dimensional elements other than the first to k-th dimensional elements is duplicated. Therefore, the registration-side intermediate data corresponds to data in which either the distribution processing or the duplication processing is applied for each dimensional element in the feature data X which is an n-dimensional vector. In other words, the registration-side intermediate data is data which is a 2n-dimensional vector.

The distribution processing in the present example embodiment corresponds to the processing for the intermediate information generation unit 120B to distribute each of some dimensional elements in the feature data X to a plurality of random numbers. Here, the intermediate information generation unit 120B determines the dimensional elements in the feature data X to be distributed, based on the index information. The intermediate information generation unit 120B divides each of the dimensional elements identified by the index information, which correspond from the first dimensional element to the k-th dimensional element from among the n dimensional elements in the feature data X, into a plurality of random numbers.

The duplication processing in the present example embodiment corresponds to the processing for the intermediate information generation unit 120B to duplicate each of some dimensional elements in the feature data X. In the case in which each of the first to k-th dimensional elements included in the n-dimensional feature data X is divided with the number of divisions n1 in the distribution processing on the feature data X, the intermediate information generation unit 120B duplicates each of dimensional elements other than the first to k-th dimensional elements n2 times in the duplication processing (n1=n2, and n1 and n2 are integers of 2 or more, respectively). In other words, the intermediate information generation unit 120B performs the distribution processing and the duplication processing such that the number of divisions n1 for the elements in the feature data X in the distribution processing and the number of duplications n2 for the elements in the feature data X are the same.

As mentioned above, the index information corresponds to information indicating elements to be distributed in the distribution processing, and elements to be duplicated in the duplication processing among the elements in the feature data X. In the present example embodiment, dividing the i-th dimensional element $x_i$ in the feature data X into a plurality of elements such that it is impossible to restore the original i-th dimensional element $x_i$ in the n-dimensional feature data X from only one of them may be referred to as "secret-sharing". For example, in (Expression 6-2), the secret-sharing is performed on the first dimensional element $x_1$ in the feature data X to generate the random numbers $x_1[1]$ and $x_1[2]$.

In (Expression 6-2), the intermediate information generation unit 120B generates two random numbers (random numbers $x_1[1]$ and $x_1[2]$) by performing the secret-sharing for the first dimensional element $x_1$ in the n-dimensional feature data X. However, the number of divisions for the l1-th dimensional element $x_{l1}$ in the n-dimensional feature data X is not limited to two. For example, the intermediate information generation unit 120B may set the number of divisions for the l1-th dimensional element $x_{l1}$ in the n-dimensional feature data X to j (1 and j are any positive integers, respectively), and perform the secret-sharing for the l1-th dimensional element $x_{l1}$ in the n-dimensional feature data X (see [Expression 6-3]).

[Math. 67]

$$x_{l_1} = x_{l_1}[1] + \ldots + x_{l_1}[j] \qquad \text{(Expression 6-3)}$$

In this configuration, through the distribution processing, the intermediate information generation unit 120B generates j random numbers (random numbers $x_{l1}[1]$ to $x_{l1}[j]$, see [Expression 6-3]) from the l1-th dimensional element $x_{l1}$ in the n-dimensional feature data X. In addition, through the duplication processing, the intermediate information generation unit 120B duplicates each of dimensional elements other than the l1-th to lk-th dimensional elements $x_{l1}, \ldots, x_{lk}$ included in the n-dimensional feature data X j times.

Then, in step S63, for each dimensional element in the registration-side intermediate data, the mask processing unit 140B performs the mask processing using a mask array below.

[Math. 68]

$$R = (r_1, r_2, \ldots, r_{n-1}, r_n, r_{n+1}, \ldots, r_{2n}) \qquad \text{(Expression 6-4)}$$

As mentioned above, the mask array R is information generated by the key generation apparatus 3B. The key generation apparatus 3B generates the mask array R, which is a 2n-dimensional vector, and transmits it to the registration information generation apparatus 1B. Each element in the mask array R shown in (Expression 6-4) is as follows.

$$r_i \in \{-1, 1\} \qquad \text{[Math. 69]}$$

The positive or negative of each dimensional element in the registration-side intermediate data can be converted by the mask processing for multiplying each dimensional element in the registration-side intermediate data by the mask array R (see the third row from the top in FIG. 26). In the following explanation, the registration-side intermediate data obtained through the mask processing for multiplying each dimensional element by the mask array R may be referred to as "positive/negative-converted registration-side intermediate data".

Next, in step S64, the permutation processing unit 130B performs the permutation processing for reordering the dimensional elements in the positive/negative-converted registration-side intermediate data by the permutation function F using the permutation key K. The permutation key K is an example of information that defines how to reorder elements in information of interest, and corresponds to a cryptographic key randomly generated by the key generation apparatus 3B. As mentioned above, the permutation key K is information generated by the key generation apparatus 3B, and transmitted from the key generation apparatus 3B to the registration information generation apparatus 1B. The permutation processing unit 130B performs the permutation processing to transform the positive/negative-converted registration-side intermediate data into data below (see the bottom row of FIG. 26).

[Math. 70]

$$T = (t_1, t_2, \ldots, t_n, t_{n+1}, \ldots, t_{2n})$$

The data T, which is a vector, corresponds to data in which each dimensional element in the positive/negative-converted registration-side intermediate data is transformed based on the permutation key K. In the following explanation, the data T, which is a vector, may be referred to as "registration data T". The same permutation key K is used in both the registration information generation apparatus 1B and the collation information generation apparatus 2B.

The registration data T (i and j are any positive integers, respectively) corresponds to, for example, data such that the dimensional elements included in the positive/negative-converted registration-side intermediate data are reordered as in (Expression 6-5).

[Math. 71]

$$t_i = r_1 \cdot x_1[1], \ldots, t_j = r_{n+1} \cdot x_1[2] \quad \text{(Expression 6-5)}$$

In addition, the registration data T (i' and j' are any positive integers, respectively) corresponds to, for example, data such that the dimensional elements included in the positive/negative-converted registration-side intermediate data are reordered as in (Expression 6-6).

[Math. 72]

$$t_{i'} = r_n \cdot x_n, \ldots, t_{j'} = r_{2n} \cdot x_n \quad \text{(Expression 6-6)}$$

The masking processing using the mask array R may be omitted, and the registration data T may be generated in such a configuration. Furthermore, the order of the mask processing and the permutation processing may be changed to generate the registration data T.

The registration information generation apparatus 1B transmits the registration data T generated in this manner to the DB 5B in step S65. The DB 5B stores the received registration data T therein. In step S65, the registration information generation apparatus 1B may transmit the registration data T regarding the biometric information on the user B to the DB 5B together with an identifier (user identifier) capable of identifying that the data is information on the user B.

As described above, the registration information generation apparatus 1B generates the registration data T by performing the mask processing and permutation processing after performing the secret-sharing for some elements included in the feature data X and performing the duplication. Therefore, in the case in which the permutation key K is not compromised, it is difficult to determine which element in the registration data T corresponds to which element in the feature data X. In addition, since the registration data T is generated from a state in which the secret-sharing and the duplication have been performed on the feature data X, even if both the mask array R and the permutation key K are compromised, it is difficult to identify that registration data newly generated using the compromised mask array R and permutation key K, and the compromised registration data T are derived from feature data of the same living body. From the above, the registration information generation apparatus 1B in the present example embodiment can further reduce the risk of information leakage.

<4.7. Flow of Processing of Generating Collation Information>

In the following, a flow of processing when the collation information generation apparatus 2B performs the cancelable transformation on input information according to the present example embodiment will be described. After the registration information has been stored in the DB 5B, in performing the collation processing to determine whether biometric authentication is acceptable, the collation system 1000B has to use biometric information of the same living body as that used when the registration information is generated. The collation information generation apparatus 2B acquires biometric information on a user via the sensor 19 or the I/F 15, and performs the cancelable transformation based on the acquired biometric information. Information generated by performing the cancelable transformation on the biometric information by the collation information generation apparatus 2B is an example of the collation information to be collated with respect to the registration information stored in the DB 5B.

Figure 27:
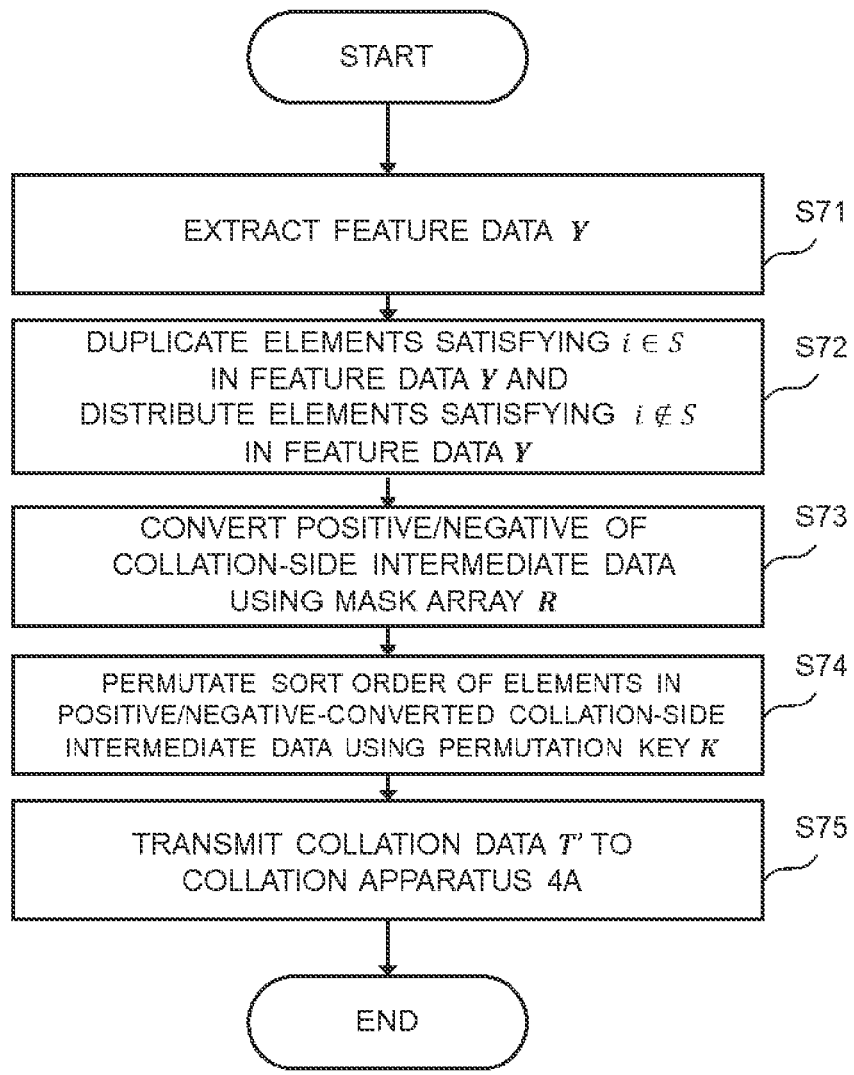
FIG. 27 is a flowchart illustrating a flow of processing of generating collation information according to the third example embodiment.
Figure 28:
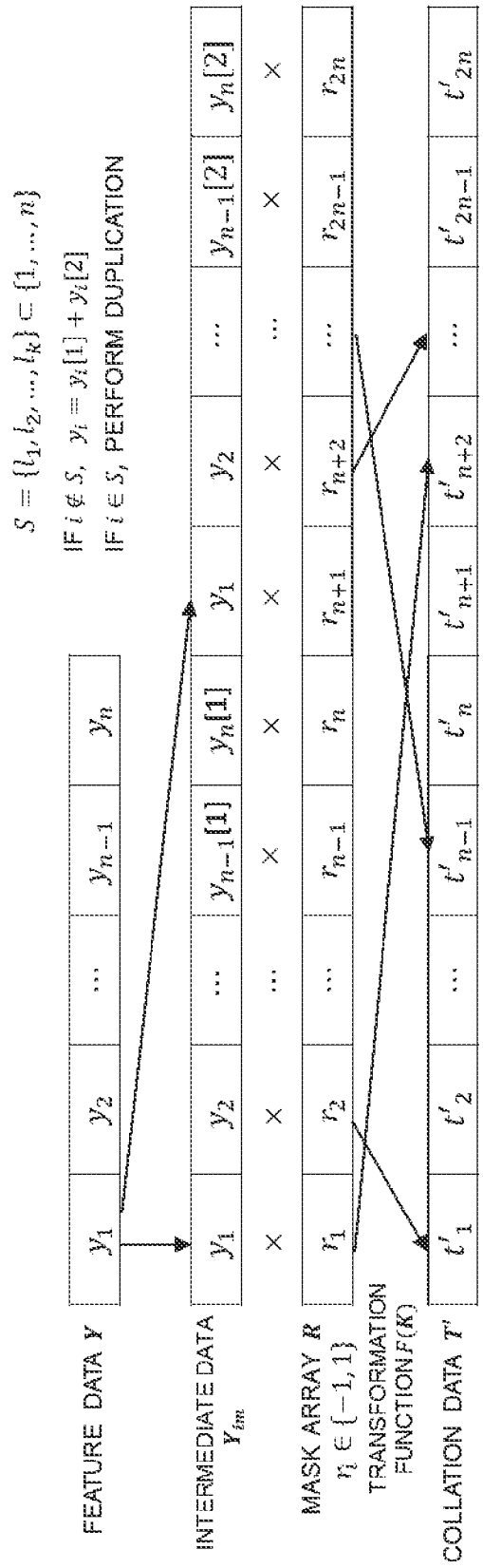
FIG. 28 is an explanation diagram of processing of generating the collation information according to the third example embodiment.

FIG. 27 is a flowchart illustrating a flow of processing of generating the collation information in the collation information generation apparatus 2B according to the present example embodiment. FIG. 28 is an explanation diagram modeling processing of generating the collation information in the collation information generation apparatus 2B according to the present example embodiment. Referring to FIGS. 27 and 28, a flow of the cancelable transformation in the collation information generation apparatus 2B will be described.

Biometric information on a user acquired by the collation information generation apparatus 2B is input to the controller 200B via the network I/F 201B. In the explanation of FIGS. 27 and 28, it is assumed that the facial image information on the user B is input to the collation information generation apparatus 2B. In the present example embodiment, the key generation apparatus 3B transmits to the collation information generation apparatus 2B index information that is information indicating that dimensional elements identified by data S correspond to a subset of n-dimensional data, that is, data is below.

[Math. 73]

$$S = \{l_1, l_2, \ldots, l_k\} \subset \{1, \ldots, n\} \quad \text{(Expression 7-1)}$$

The collation information generation apparatus 2B generates the collation information from the facial image information on the user B by referring to the index information.

First, in step S71, the feature extraction unit 210B generates the feature data Y, which is an n-dimensional vector, from the facial image information on the user B (see [Expression 3-1] and the top row of FIG. 28). The collation information generation apparatus 2B may acquire the feature data Y via the sensor 19 or the I/F 15.

Then, in step S72, the intermediate information generation unit 220B refers to the index information, and generates intermediate information from the n-dimensional feature data Y. Here, the index information corresponds to information indicating that the dimensional elements identified by the data S are a subset included in the first to n-th dimensional elements in the n-dimensional data. In step S72, when the following is satisfied for the i-th dimensional element in the n-dimensional feature data Y, $$i \in S \quad \text{[Math. 74]}$$

the intermediate information generation unit 220B performs the distribution processing for distributing it to random numbers shown as [Math. 76] satisfying the following expression.

[Math. 75]

$$y_i = y_i[1] + y_i[2] \quad \text{(Expression 7-2)}$$

[Math. 76]

$$y_i[1], y_i[2]$$

In addition, in step S72, when the following is satisfied for the i-th dimensional element in the n-dimensional feature data Y, $$i \in S \quad \text{[Math. 77]}$$

the intermediate information generation unit 220B performs the duplication processing on that element. According to (Expression 7-1), in step S72, the intermediate information generation unit 220B duplicates each of the l1-th dimensional element $y_{l1}, \ldots,$ lk-th dimensional element $y_{lk}$ included in the n-dimensional feature data Y Furthermore, in step S72, the intermediate information generation unit 220B divides each of dimensional elements other than the l1-th to lk-th dimensional elements $y_{l1}, \ldots, y_{lk}$ included in the n-dimensional feature data Y into a plurality of random numbers. This allows to generate data that is a vector in which each of the l1-th to lk-th dimensional elements $y_{l1}, \ldots, y_{lk}$ included in the n-dimensional feature data Y is duplicated, and each of the dimensional elements other than the l1-th to lk-th dimensional elements $y_{l1}, \ldots, y_{lk}$ included in the n-dimensional feature data Y is divided into a plurality of random numbers as follows (see the second row from the top in FIG. 28).

[Math. 78]

$$Y_{im} = \quad \text{(Expression 7-3)}$$

$$(y_1, y_2, \ldots, y_{n-1}[1], y_n[1], y_1, y_2, \ldots, y_{n-1}[2], y_n[2])$$

In the following description, the data $Y_{im}$, which is a vector, may be referred to as "collation-side intermediate data".

FIG. 28 is a model diagram illustrating a flow of processing for the n-dimensional feature data Y in a configuration in which the first and second dimensional elements in the n-dimensional feature data Y are elements corresponding to the data S and the n−1-th and n-th dimensional elements in the n-dimensional feature data Y are elements not corresponding to the data S.

In the collation-side intermediate data shown in (Expression 7-3), each of the first to k-th dimensional elements included in the feature data Y, which is a n-dimensional vector, is duplicated, and each of the dimensional elements other than the first to k-th dimensional elements is distributed. Therefore, the collation-side intermediate data corresponds to data in which either the distribution processing or the duplication processing is applied for each dimensional element in the feature data Y, which is an n-dimensional vector. In other words, the collation-side intermediate data is data which is a 2n-dimensional vector.

The distribution processing in the present example embodiment corresponds to the processing for the intermediate information generation unit 220B to distribute each of some dimensional elements in the feature data Y to a plurality of random numbers. Here, the intermediate information generation unit 220B determines the dimensional elements in the feature data Y to be distributed, based on the index information. The intermediate information generation unit 220B divides each of the dimensional elements, which are other than the first to k-th dimensional elements in the feature data Y identified by the index information from among the n dimensional elements in the feature data Y, into a plurality of random numbers.

The duplication processing in the present example embodiment corresponds to the processing for the intermediate information generation unit 220B to duplicate each of some dimensional elements in the feature data Y. In the case in which each of dimensional elements other than the first to k-th dimensional elements included in the n-dimensional feature data Y is divided with the number of divisions n1 in the distribution processing on the feature data Y, the intermediate information generation unit 220B duplicates each of the first to k-th dimensional elements in the feature data Y n2 times in the duplication processing (n1=n2, and n1 and n2 are integers of 2 or more, respectively). In other words, the intermediate information generation unit 220B performs the distribution processing and the duplication processing such that the number of divisions n1 for the elements in the feature data Y in the distribution processing and the number of duplications n2 for the elements in the feature data Y are the same.

The intermediate information generation unit 220B performs the distribution processing such that the number of divisions n1 when dividing the element in the feature data Y is the same as the number of divisions when dividing the element in the feature data X in the registration information generation apparatus 1B. Further, the intermediate information generation unit 220B performs the duplication processing such that the number of duplications n2 when duplicating the element in the feature data Y is the same as the number of duplications when duplicating the element in the feature data X in the registration information generation apparatus 1B.

As mentioned above, the index information corresponds to information indicating elements to be distributed in the distribution processing, and elements to be duplicated in the duplication processing among the elements in the feature data Y. In the present example embodiment, dividing the i-th dimensional element $y_i$ in the feature data Y into a plurality of elements such that it is impossible to restore the original i-th dimensional element $y_i$ in the n-dimensional feature data Y from only one of them may be referred to as "secret-sharing". For example, in (Expression 7-3), the secret-sharing is performed on the n-th dimensional element $y_n$ in the feature data Y to generate the random numbers $y_n[1]$ and $y_n[2]$.

In (Expression 7-3), the intermediate information generation unit 220B generates two random numbers (random numbers $y_n[1]$ and $y_n[2]$) by performing the secret-sharing for the n-th dimensional element $y_n$ in the n-dimensional feature data Y. However, the number of divisions for the n-th dimensional element $y_n$ in the n-dimensional feature data Y is not limited to two. For example, the intermediate information generation unit 220B may set the number of divisions for the n-th dimensional element $y_n$ in the n-dimensional feature data Y to j (j is any positive integer), and perform the secret-sharing for the n-th dimensional element $y_n$ in the n-dimensional feature data Y (see (Expression 7-4)).

[Math. 79]

$$y_n = y_n[1] + \ldots + y_n[j] \quad \text{(Expression 7-4)}$$

In this configuration, through the distribution processing, the intermediate information generation unit 220B generates j random numbers (random numbers $y_n[1]$ to $y_n[j]$, see [Expression 7-4]) from the n-th dimensional element $y_n$ in the n-dimensional feature data Y. In addition, through the duplication processing, the intermediate information generation unit 220B duplicates each of the l1-th to lk-th dimensional elements $y_{l1}, \ldots, y_{lk}$ included in the n-dimensional feature data Y j times.

Then, in step S73, for each dimensional element in the collation-side intermediate data, the mask processing unit 240B performs the mask processing using the mask array R (see [Expression 6-4], and the third row from the top in FIG. 28). As mentioned above, the mask array R is information generated by the key generation apparatus 3B. The key generation apparatus 3B generates the mask array R, which is a 2n-dimensional vector, and transmits it to the collation information generation apparatus 2B. The positive or negative of each dimensional element in the collation-side intermediate data can be converted by the mask processing for multiplying each dimensional element in the collation-side intermediate data by the mask array R. In the following explanation, the collation-side intermediate data obtained through the mask processing for multiplying each dimensional element by the mask array R may be referred to as "positive/negative-converted collation-side intermediate data".

Next, in step S74, the permutation processing unit 230B performs the permutation processing for reordering the dimensional elements in the positive/negative-converted collation-side intermediate data by the permutation function F using the permutation key K. The permutation key K is an example of information that defines how to reorder elements in information of interest, and corresponds to a cryptographic key randomly generated by the key generation apparatus 3B. As mentioned above, the permutation key K is information generated by the key generation apparatus 3B, and transmitted from the key generation apparatus 3B to the collation information generation apparatus 2B. The permutation processing unit 230B performs the permutation processing to transform the positive/negative-converted collation-side intermediate data into data below (see the bottom row of FIG. 28).

[Math. 80]

$$T' = (t'_1, t'_2, \ldots, t'_n, t'_{n+1}, \ldots, t'_{2n})$$

The data T', which is a vector, corresponds to data in which each dimensional element in the positive/negative-converted collation-side intermediate data is transformed based on the permutation key K. In the following explanation, the data T', which is a vector, may be referred to as "collation data T'".

The same permutation key K is used in both the registration information generation apparatus 1B and the collation information generation apparatus 2B. In other words, in the permutation processing performed by the collation information generation apparatus 2B, the dimensional elements in the positive/negative-converted collation-side intermediate data are reordered in the same sort order as in the permutation processing in the registration information generation apparatus 1B.

Therefore, the collation data T' (i and j are any positive integers, respectively) corresponds to data in which the dimensional elements included in the positive/negative-converted collation-side intermediate data are reordered in the same way as the permutation processing (see [Expression 6-5] and [Expression 6-6]) by the registration information generation apparatus 1B as in (Expression 7-5).

[Math. 81]

$$t'_i = r_1 \cdot y_1, \ldots, t'_j = r_{n+1} \cdot y_1 \quad \text{(Expression 7-5)}$$

The collation data T' (i' and j' are any positive integers, respectively) corresponds to data in which the dimensional elements included in the positive/negative-converted collation-side intermediate data are reordered as in (Expression 7-6).

[Math. 82]

$$t'_{i'} = r_n \cdot y_n[1], \ldots, t'_{j'} = r_{2n} \cdot y_n[2] \quad \text{(Expression 7-6)}$$

The masking processing using the mask array R may be omitted, and the collation data T' may be generated in such a configuration. Furthermore, the order of the mask processing and the permutation processing may be changed to generate the collation data T'.

The collation information generation apparatus 2B transmits the collation data T' generated in this manner to the collation apparatus 4B in step S75. The collation apparatus 4B stores the received collation data T' therein. At this time, the collation information generation apparatus 2B may transmit the collation data T' to the collation apparatus 4B together with an identifier (user identifier) capable of identifying that the data is information on the user B.

As described above, the collation information generation apparatus 2B generates the collation data T' by performing the mask processing and permutation processing after performing the secret-sharing for some elements included in the feature data Y and performing the duplication. Therefore, in the case in which the permutation key K is not compromised, it is difficult to determine which element in the collation data T' corresponds to which element in the feature data Y. In addition, since the collation data T' is generated from a state in which the secret-sharing and the duplication have been performed on the feature data Y, even if both the mask array R and the permutation key K are compromised, it is difficult to identify that collation data newly generated using the compromised mask array R and permutation key K, and the compromised collation data T' are derived from feature data of the same living body. From the above, the collation information generation apparatus 2B in the present example embodiment can further reduce the risk of information leakage.

<4.8. Flow of Processing of Calculating Similarity>

Figure 29:
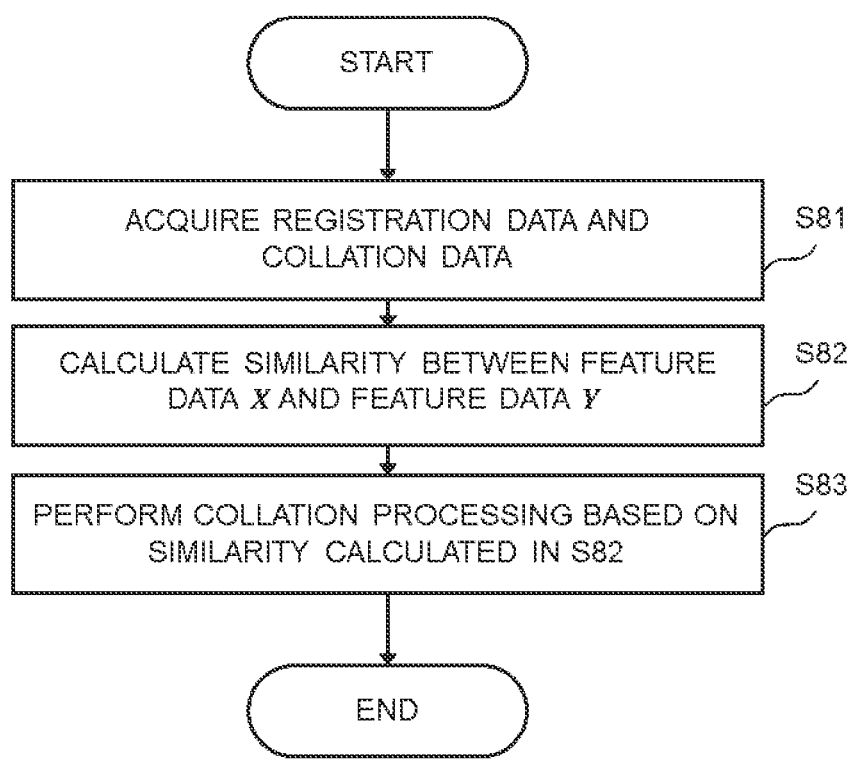
FIG. 29 is a flowchart illustrating a flow of processing performed by the collation apparatus according to the third example embodiment.

Next, referring to FIG. 29, a flow of processing in the collation apparatus 4B according to the present example embodiment will be described. FIG. 29 is a flowchart illustrating a flow of processing in the collation apparatus 4B of performing collation between biometric information input to the registration information generation apparatus 1B and biometric information input to the collation information generation apparatus 2B.

In step S81, the network I/F 401B acquires the registration data T from the DB 5B. The DB 5B stores therein the registration data T regarding the biometric information on the user B received from the registration information generation apparatus 1B in step S65, together with an identifier capable of identifying that the data is information on the user B. The collation apparatus 4B acquires from the DB 5B the registration data T regarding the biometric information on the user corresponding to the user identifier received from the collation information generation apparatus 2B in step S75, that is, the user B.

Then, in step S82, the similarity calculation unit 410B calculates a similarity between the feature data X and the feature data Y.

In step S82, the similarity calculation unit 410B calculates an inner product of the registration data T and the collation data T' as a normalized correlation between the registration data T and the collation data T'. Here, the inner product of the registration data T and the collation data T', each of which is a 2n-dimensional vector, is defined as follows.

[Math. 83]

$$\langle T, T' \rangle = \sum t_i \cdot t'_i \bmod a^2 \quad \text{(Expression 8-1)}$$

According to (Expression 2-2), (Expression 7-5) and (Expression 8-5), the following is calculated for any positive integers i and j.

[Math. 84]

$$t_i \cdot t'_i + t_j \cdot t'_j = r_1^2 \cdot x_1[1] y_1 + r_{n+1}^2 \cdot x_1[2] y_1 = y_1(x_1[1] + x_1[2]) = x_1 \cdot y_1$$

Also, for any positive integers i=i' and j=j', (Expression 8-1) is calculated according to (Expression 2-2), (Expression 6-6) and (Expression 7-6) as follows.

[Math. 85]

$$t_i \cdot t'_i + t_j \cdot t'_j = r_n^2 \cdot x_n y_n[1] + r_{2n}^2 \cdot x_n y_n[2] = x_n(y_n[1] + y_n[2]) = x_n \cdot y_n$$

In other words, the inner product of the registration data T and the collation data T' is equal to an inner product of the feature data X and the feature data Y (Expression 8-2).

[Math. 86]

$$d(T,T)=d(X,Y) \quad \text{(Expression 8-2)}$$

The similarity calculation unit 410B calculates the inner product of the registration data T and the collation data T' as the similarity between the feature data X and the feature data Y.

Next, in step S83, the collation processing unit 420B performs the collation processing for performing collation between the biometric information pertaining to the feature data X and the biometric information pertaining to the feature data Y based on the similarity between the feature data X and the feature data Y calculated in step S82.

In addition, the collation apparatus 4B may authenticate a user identified by the collation information based on the result of the collation processing in step S83.

Further, for the mask array R used in the registration information generation apparatus 1B, the collation information generation apparatus 2B may perform the mask processing using a mask array below.

[Math. 87]

$$R' = (r_1^{-1}, r_2^{-1}, \ldots, r_{n-1}^{-1}, r_n^{-1}, \ldots, r_{2n-1}^{-1}, r_{2n}^{-1}) \quad \text{(Expression 8-4)}$$

Hereinafter, the mask array R', which is a vector, may be simply referred to as "mask array R'". According to (Expression 6-4) and (Expression 8-4), each element in the mask array R' satisfies the following expression for any positive integer j.

[Math. 88]

$$r_j \cdot r_j^{-1} = 1$$

That is, each element in the mask array R', which is $$r_j^{-1} \quad \text{[Math. 89]}$$

corresponds to a multiplicative inverse of each element $r_j$ of the mask array R shown in (Expression 6-4).

As described above, according to the present example embodiment, in the above calculation processing using the registration data T generated by the registration information generation apparatus 1B and the collation data T' generated by the collation information generation apparatus 2B, the similarity can be calculated by calculating the inner product once. Therefore, a high throughput can be expected, similar to the cancelable biometrics of the related art. In addition, since the inner product of the registration data T and the collation data T' is equal to the inner product of the feature data X and the feature data Y, the collation accuracy can be maintained as in the cancelable biometrics of the related art. Accordingly, the registration information generation apparatus 1B and the collation information generation apparatus 2B according to the present example embodiment can perform the cancelable transformation capable of suppressing the degradation of collation accuracy and reducing the risk of information leakage.

<4.9. Example Alternations of Registration Information Generation Apparatus and Collation Information Generation Apparatus>

Figure 30:
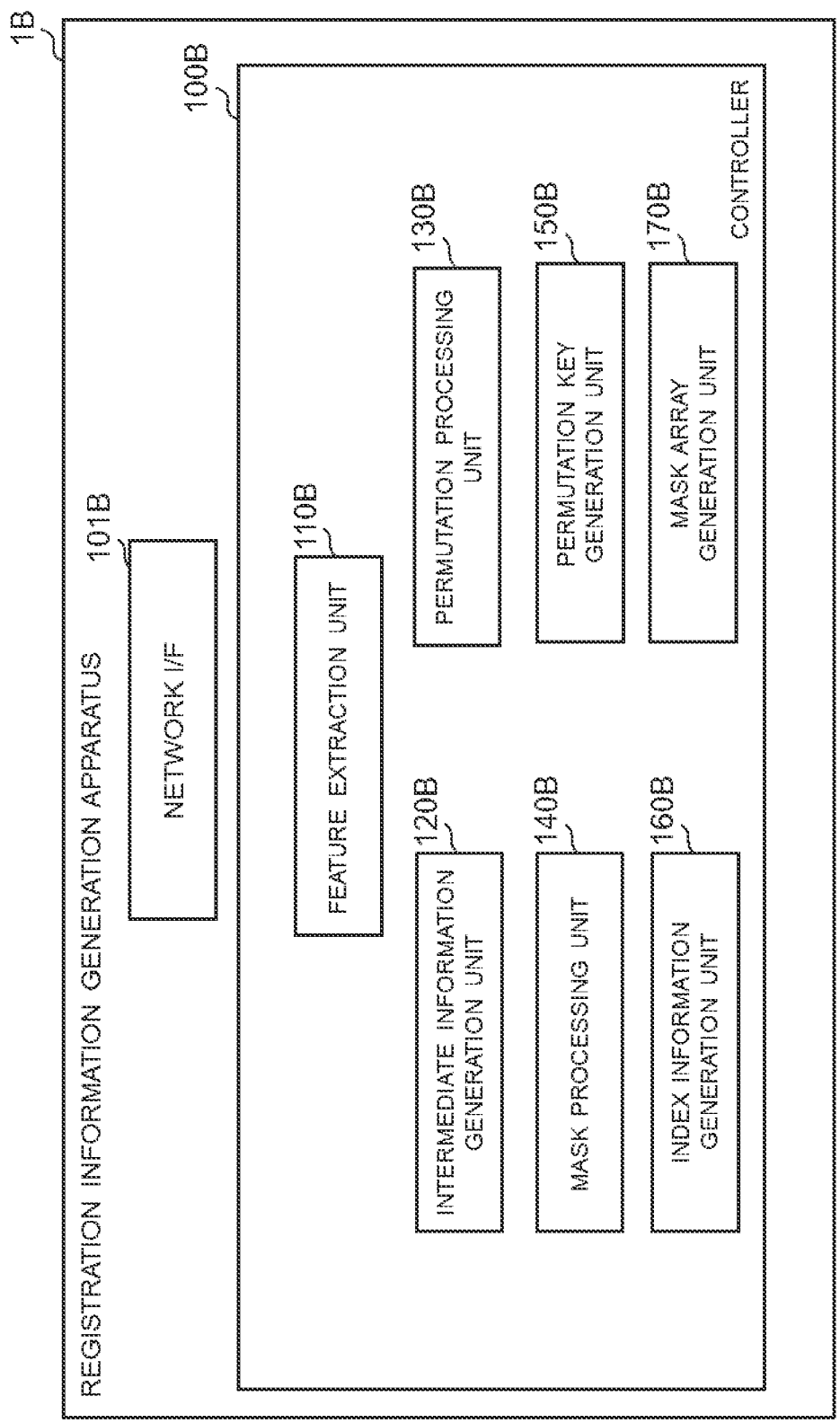
FIG. 30 is a functional block diagram illustrating an example of a functional configuration of the registration information generation apparatus according to an example alternation of the third example embodiment.
Figure 31:
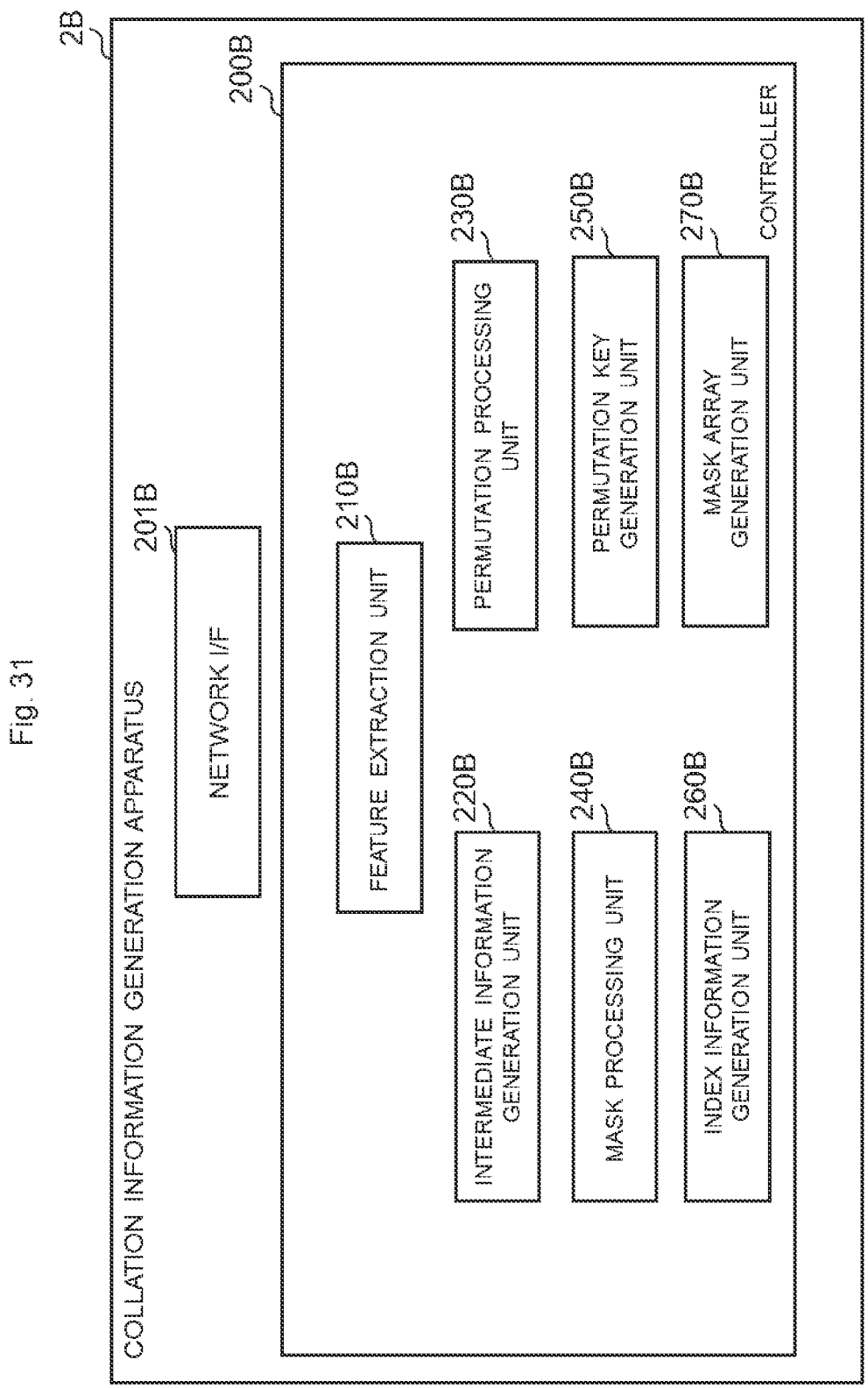
FIG. 31 is a functional block diagram illustrating an example of a functional configuration of the collation information generation apparatus according to an example alternation of the third example embodiment.

The registration information generation apparatus 1B and the collation information generation apparatus 2B each may include an element for generating the mask array R and an element for generating the permutation key K. FIG. 30 is a functional block diagram illustrating a functional configuration of the registration information generation apparatus 1B according to an example alternation of the third example embodiment. FIG. 31 is a functional block diagram illustrating a functional configuration of the collation information generation apparatus 2B according to an example alternation of the third example embodiment.

As illustrated in FIG. 30, the registration information generation apparatus 1B includes a permutation key generation unit 150B, an index information generation unit 160B and a mask array generation unit 170B, in addition to the feature extraction unit 110B, the intermediate information generation unit 120B, the permutation processing unit 130B, and the mask processing unit 140B (see FIG. 21).

The permutation key generation unit 150B generates a secret key such as the permutation key K to be used by the registration information generation apparatus 1B in the permutation processing. The index information generation unit 160B generates index information which is information for identifying what processing is to be performed for each element included in information. The mask array generation unit 170B generates a mask array to be used by the registration information generation apparatus 1B in the masking processing.

As illustrated in FIG. 31, the collation information generation apparatus 2B includes a permutation key generation unit 250B, an index information generation unit 260B and a mask array generation unit 270B in addition to the feature extraction unit 210B, the intermediate information generation unit 220B, the permutation processing unit 230B, and the mask processing unit 240B (see FIG. 22).

The permutation key generation unit 250B generates a secret key such as the permutation key K to be used by the collation information generation apparatus 2B in the permutation processing. The index information generation unit 260B generates index information which is information for identifying what processing is to be performed for each element included in information. The mask array generation unit 270B generates a mask array to be used by the collation information generation apparatus 2B in the mask processing.

According to the present example alternation, the registration information generation apparatus 1B and the collation information generation apparatus 2B can perform the cancelable transformation without communicating with the key generation apparatus 3B. Therefore, it is possible to further reduce the risk of leakage of the mask array R and the permutation key K in a communication path with the key generation apparatus 3B.

5. Fourth Example Embodiment

In the third example embodiment, the registration information is generated by performing the distribution processing or the duplication processing on each dimensional element included in the feature data X. Meanwhile, in a fourth example embodiment, an example aspect will be described in which the registration information generation apparatus 1B performs one or both of the distribution processing and the duplication processing on each element included in the feature data X to generate the registration information. In the present example embodiment, when a character with a hat is indicated, "(hat)" is described after the character. The hardware and functional configurations of the registration information generation apparatus 1B, the collation information generation apparatus 2B, the key generation apparatus 3B, and the collation apparatus 4B are the same as those in the third example embodiment. In the fourth example embodiment, explanations will be given for configurations that differ from the third example embodiment, and explanations will be omitted for the same configurations and aspects as in the third example embodiment.

<5.1. Flow of Processing of Generating Registration Information>

Figure 32:
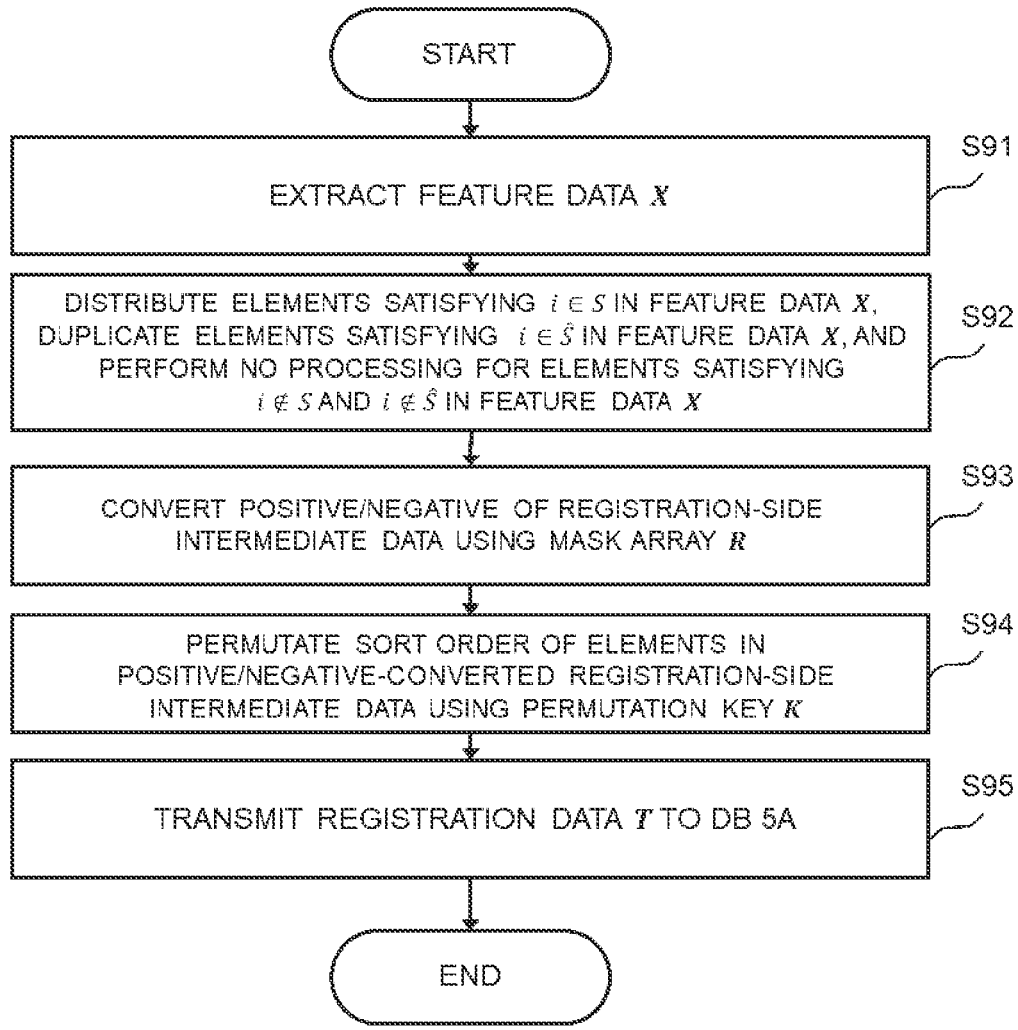
FIG. 32 is a flowchart illustrating a flow of processing for generating registration information according to a fourth example embodiment.
Figure 33:
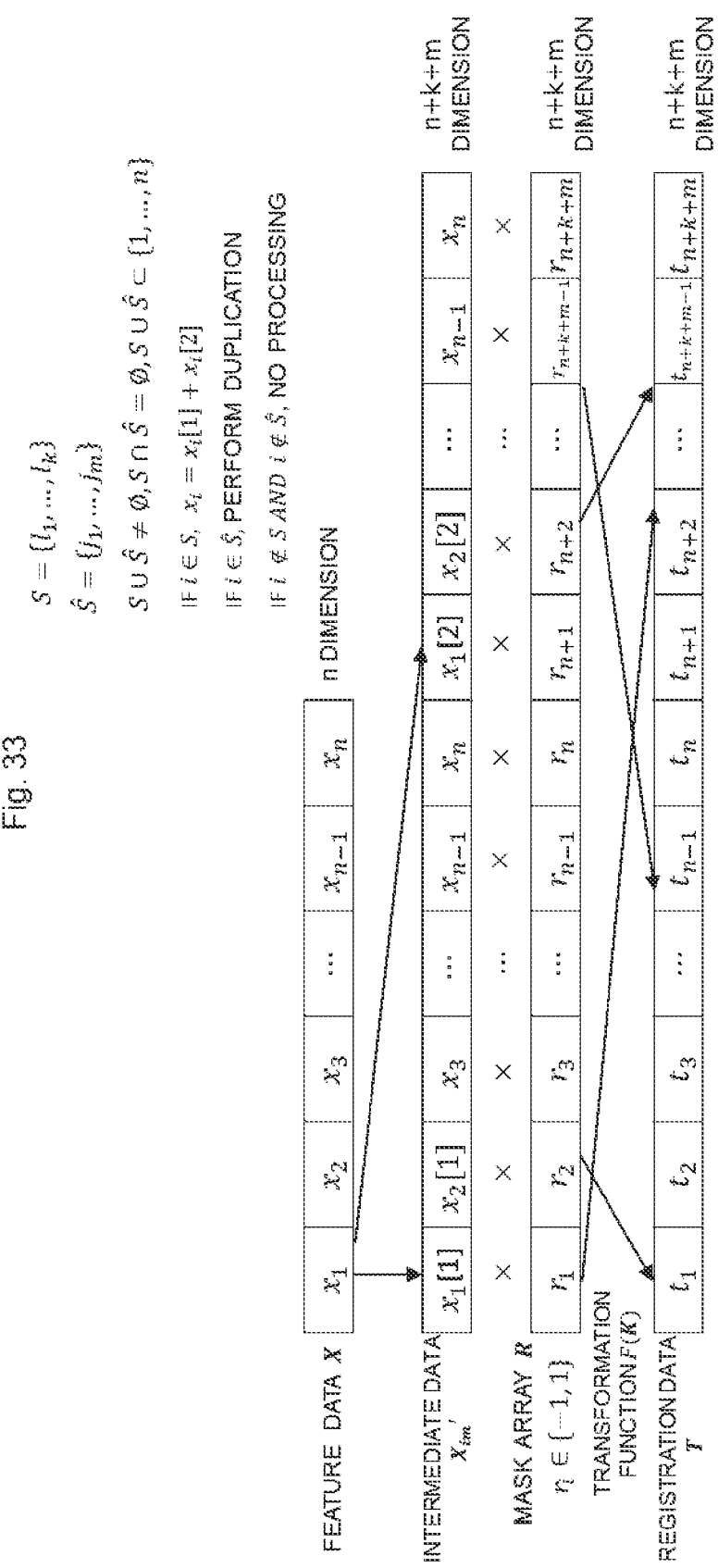
FIG. 33 is an explanation diagram of processing for generating the registration information according to the fourth example embodiment.

FIG. 32 is a flowchart illustrating a flow of processing for generating the registration information in the registration information generation apparatus 1B according to the present example embodiment. FIG. 33 is an explanation diagram modeling processing for generating the registration information in the registration information generation apparatus 1B according to the present example embodiment. Referring to FIGS. 32 and 33, a flow of the cancelable transformation in the registration information generation apparatus 1B will be described.

Biometric information on a user acquired by the registration information generation apparatus 1B is input to the controller 100B via the network I/F 101B. In the explanation of FIGS. 32 and 33, it is assumed that the facial image information on the user B is input to the registration information generation apparatus 1B. In the present example embodiment, the key generation apparatus 3B transmits to the registration information generation apparatus 1B index information that is information indicating that one or both of data S and data S(hat) correspond to a subset of n-dimensional data as follows.

[Math. 90]

$$S = \{l_1, \ldots, l_k\} \subset \{1, \ldots, n\} \quad \text{(Expression 94)}$$

[Math. 91]

$$\hat{S} = \{j_1, \ldots, j_m\} \subset \{1, \ldots, n\} \quad \text{(Expression 9-2)}$$

[Math. 92]

$$S \cup \hat{S} \neq \emptyset, S \cap \hat{S} = \emptyset, S \cup \hat{S} \subset \{1, \ldots, n\} \quad \text{(Expression 9-3)}$$

The registration information generation apparatus 1B generates the registration information by referring to the index information. For the sake of explanation, it is assumed that both the data S and the data S(hat) are subsets included in the n-dimensional data, respectively. From (Expression 9-3), it is assumed that there are no elements included in both the data S and the data S(hat).

First, in step S91, the feature extraction unit 110B generates the feature data X, which is an n-dimensional vector, from the facial image information on the user B (see [Expression 2-1] and the top row of FIG. 33). The registration information generation apparatus 1B may acquire the feature data X via the sensor 19 or the I/F 15. The feature data X is an example of registration-side input information in the present example embodiment.

Then, in step S92, the intermediate information generation unit 120B refers to the index information, and performs the distribution processing on some elements in the n-dimensional feature data X. Here, the index information corresponds to information indicating that the dimensional elements identified by the data S are a subset in the n-dimensional data. The intermediate information generation unit 120B performs the distribution processing (see [Expression 2-2]) when the following expression is satisfied for the i-th dimensional element in the n-dimensional feature data X.

$$i \in S \quad \text{[Math. 93]}$$

The distribution processing performed by the intermediate information generation unit 120B is an example of registration-side distribution processing in the present example embodiment. The intermediate information generation unit 120B performs the duplication processing when the following expression is satisfied for the i-th dimensional element in the n-dimensional feature data X.

$$i \in \hat{S} \quad \text{[Math. 94]}$$

The duplication processing performed by the intermediate information generation unit 120B is an example of registration-side duplication processing in the present example embodiment. Furthermore, in step S92, the intermediate information generation unit 120B proceeds to step S93 without performing the distribution processing and the duplication processing on the i-th dimensional element in the n-dimensional feature data X, when the following expression is satisfied for the i-th dimensional element of the n-dimensional feature data X.

$$i \notin S \text{ AND } i \notin \hat{S} \quad \text{[Math. 95]}$$

FIG. 33 is a model diagram illustrating a flow of processing for the n-dimensional feature data X in a configuration in which the first and second dimensional elements in the n-dimensional feature data X are elements corresponding to the data S, the third dimensional element in the n-dimensional feature data X is an element not corresponding to both the data S and the data S(hat), and the n−1-th and n-th dimensional elements in the n-dimensional feature data X are elements corresponding to the data S(hat).

According to (Expression 9-1), in step S92, the intermediate information generation unit 120B divides each of the first and second dimensional elements $x_1$ and $x_2$ included in the n-dimensional feature data X into a plurality of random numbers. In step S92, the intermediate information generation unit 120B duplicates each of the n−1-th and n-th dimensional elements $x_{n-1}$ and $x_n$ included in the n-dimensional feature data X. This allows to generate data that is a vector in which each of the first and second dimensional elements $x_1$ and $x_2$ included in the n-dimensional feature data X is divided, and each of the n−1-th and n-th dimensional elements $x_{n-1}$ and $x_n$ included in the n-dimensional feature data X is duplicated as follows (see the second row from the top in FIG. 33).

[Math. 96]

$$X_{im} = \quad \text{(Expression 9-4)}$$
$$(x_1[1], x_2[1], x_3, \ldots, x_{n-1}, x_n, x_1[2], x_2[2], \ldots, x_{n-1}, x_n)$$

From (Expression 9-1) and (Expression 9-2), the data S is information indicating k pieces of dimensional elements, and the data S(hat) is information indicating m pieces of dimensional elements. Therefore, the intermediate information generation unit 120B generates the data $X_{im}$, which is an n+k+m-dimensional vector, from the n-dimensional feature data X. In the following description, the data $X_{im}$, which is a vector, may be referred to as "registration-side intermediate data". The registration-side intermediate data is an example of registration-side intermediate information in the present example embodiment.

The distribution processing in the present example embodiment corresponds to the processing for the intermediate information generation unit 120B to distribute each of some dimensional elements in the feature data X to a plurality of random numbers. Here, the intermediate information generation unit 120B determines the dimensional elements in the feature data X to be distributed, based on the index information. The intermediate information generation unit 120B divides each of the dimensional elements corresponding to the data S from among the n dimensional elements in the feature data X into a plurality of random numbers.

The duplication processing in the present example embodiment corresponds to the processing for the intermediate information generation unit 120B to duplicate each of some dimensional elements in the feature data X. In the case in which each of the dimensional elements corresponding to the data S among the n dimensional elements in the feature data X is divided with the number of divisions n1 in the distribution processing on the feature data X, the intermediate information generation unit 120B duplicates each of the dimensional elements corresponding to the data S(hat) among the n dimensional elements in the feature data X n2 times in the duplication processing (n1=n2, and n1 and n2 are integers of 2 or more, respectively). In other words, the intermediate information generation unit 120B performs the distribution processing and the duplication processing such that the number of divisions n1 for the elements in the feature data X in the distribution processing and the number of duplications n2 for the elements in the feature data X are the same.

As mentioned above, the index information corresponds to information indicating elements to be distributed in the distribution processing, and elements to be duplicated in the duplication processing among the elements in the feature data X. In the present example embodiment, the dimensional elements corresponding to the data S among the elements in the feature data X are an example of elements corresponding to a first set, and the dimensional elements corresponding to the data S(hat) among the elements in the feature data X are an example of elements corresponding to a second set.

In the present example embodiment, dividing the i-th dimensional element $x_i$ in the feature data X into a plurality of elements such that it is impossible to restore the original i-th dimensional element $x_i$ in the n-dimensional feature data X from only one of them is sometimes referred to as "secret-sharing". For example, in (Expression 9-4), the secret-sharing is performed on the first dimensional element $x_1$ in the feature data X to generate the random numbers $x_1[1]$ and $x_1[2]$.

In (Expression 9-4), the intermediate information generation unit 120B generates two random numbers (random numbers $x_1[1]$ and $x_1[2]$) by performing the secret-sharing for the first dimensional element $x_1$ in the n-dimensional feature data x. However, the configuration is not limited to the following: the number of divisions n1=2. For example, the intermediate information generation unit 120B may set the number of divisions for the l1-th dimensional element $x_{l1}$ in the n-dimensional feature data X to p (p is any positive integer of 2 or more), and perform the secret-sharing for the l1-th dimensional element $x_{l1}$ in the n-dimensional feature data X (see [Expression 9-5]).

[Math. 97]

$$x_{l_1} = x_{l_1}[1] + \ldots + x_{l_1}[p] \quad \text{(Expression 9-5)}$$

In this configuration, through the distribution processing, the intermediate information generation unit 120B generates p random numbers (random numbers $x_{lk}[1]$ to $x_{lk}[p]$, see [Expression 9-5]) from the lk-th dimensional element $x_{lk}$ in the n-dimensional feature data X. In addition, through the duplication processing, the intermediate information generation unit 120B duplicates each of the j1-th to jm-th dimensional elements $x_{j1}, \ldots, x_{jm}$ included in the n-dimensional feature data X p times.

Then, in step S93, for each dimensional element in the registration-side intermediate data, the mask processing unit 140B performs the mask processing using a mask array below (see the third row from the top in FIG. 33).

[Math. 98]

$$R = (r_1, r_2, \ldots, r_{n-1}, r_n, r_{n+1}, \ldots, r_{n+k+m-1}, r_{n+k+m})$$ (Expression 9-6)

The mask processing performed by the mask processing unit 140B is an example of registration-side mask processing in the present example embodiment. As mentioned above, the mask array R is information generated by the key generation apparatus 3B. The key generation apparatus 3B generates the mask array R, which is an n+k+m-dimensional vector, and transmits it to the registration information generation apparatus 1B. Each element in the mask array R is as follows.

$$r_i \in \{-1, 1\}$$ [Math. 99]

The positive or negative of each dimensional element in the registration-side intermediate data can be converted by the mask processing for multiplying each dimensional element in the registration-side intermediate data by the mask array R. In the following explanation, the registration-side intermediate data obtained through the mask processing for multiplying each dimensional element by the mask array R may be referred to as "positive/negative-converted registration-side intermediate data".

Next, in step S94, the permutation processing unit 130B performs the permutation processing for reordering the dimensional elements in the positive/negative-converted registration-side intermediate data by the permutation function F using the permutation key K. The permutation processing performed by the permutation processing unit 130B is an example of registration-side permutation processing in the present example embodiment. The permutation key K is an example of information that defines how to reorder elements in information of interest, and corresponds to a cryptographic key randomly generated by the key generation apparatus 3B. As mentioned above, the permutation key K is information generated by the key generation apparatus 3B, and transmitted from the key generation apparatus 3B to the registration information generation apparatus 1B. The permutation processing unit 130B performs the permutation processing to transform the positive/negative-converted registration-side intermediate data into data below (see the bottom row of FIG. 33).

[Math. 100]

$$T = (t_1, t_2, \ldots, t_n, t_{n+1}, \ldots, t_{n+k+m-1}, t_{n+k+m})$$

The data T, which is a vector, corresponds to data in which each dimensional element in the positive/negative-converted registration-side intermediate data is transformed based on the permutation key K. In the following explanation, the data T, which is a vector, may be referred to as "registration data T". The registration data T is an example of registration information in the present example embodiment. The same permutation key K is used in both the registration information generation apparatus 1B and the collation information generation apparatus 2B.

The registration data T (i and j are any positive integers, respectively) corresponds to, for example, data such that the dimensional elements included in the positive/negative-converted registration-side intermediate data are reordered as in (Expression 9-7).

[Math. 101]

$$t_i = r_k \cdot x_k[1], \ldots, t_j = r_{n+k} \cdot x_k[2]$$ (Expression 9-7)

The registration data T (i' and j' are any positive integers, respectively) corresponds to, for example, data such that the dimensional elements included in the positive/negative-converted registration-side intermediate data are reordered as in (Expression 9-8).

[Math. 102]

$$t_{i'} = r_m \cdot x_m, \ldots, t_{j'} = r_{n+m} \cdot x_m$$ (Expression 9-8)

The masking processing using the mask array R may be omitted, and the registration data T may be generated in such a configuration. Furthermore, the order of the mask processing and the permutation processing may be changed to generate the registration data T.

The registration information generation apparatus 1B transmits the registration data T generated in this manner to the DB 5B in step S95. The DB 5B stores the received registration data T therein. In step S95, the registration information generation apparatus 1B may transmit the registration data T regarding the biometric information on the user B to the DB 5B together with an identifier (user identifier) capable of identifying that the data is information on the user B.

As described above, the registration information generation apparatus 1B generates the registration data T by performing the mask processing and permutation processing after performing the secret-sharing for some elements included in the feature data X and performing the duplication. Therefore, in the case in which the permutation key K is not compromised, it is difficult to determine which element in the registration data T corresponds to which element in the feature data X. In addition, since the registration data T is generated from a state in which the secret-sharing and the duplication have been performed on the feature data X, even if both the mask array R and the permutation key K are compromised, it is difficult to identify that registration data newly generated using the compromised mask array R and permutation key K, and the compromised registration data T are derived from feature data of the same living body. From the above, the registration information generation apparatus 1B in the present example embodiment can further reduce the risk of information leakage.

<5.2. Flow of Processing of Generating Collation Information>

In the following, a flow of processing when the collation information generation apparatus 2B performs the cancelable transformation on input information according to the present example embodiment will be described. After the registration information has been stored in the DB 5B, in performing the collation processing to determine whether biometric authentication is acceptable, the collation system 1000B has to use biometric information of the same living body as that used when the registration information is generated. The collation information generation apparatus 2B acquires biometric information on a user via the sensor 19 or the I/F 15, and performs the cancelable transformation based on the acquired biometric information. Information generated by performing the cancelable transformation on the biometric information by the collation information generation apparatus 2B is an example of the collation information to be collated with respect to the registration information stored in the DB 5B.

Figure 34:
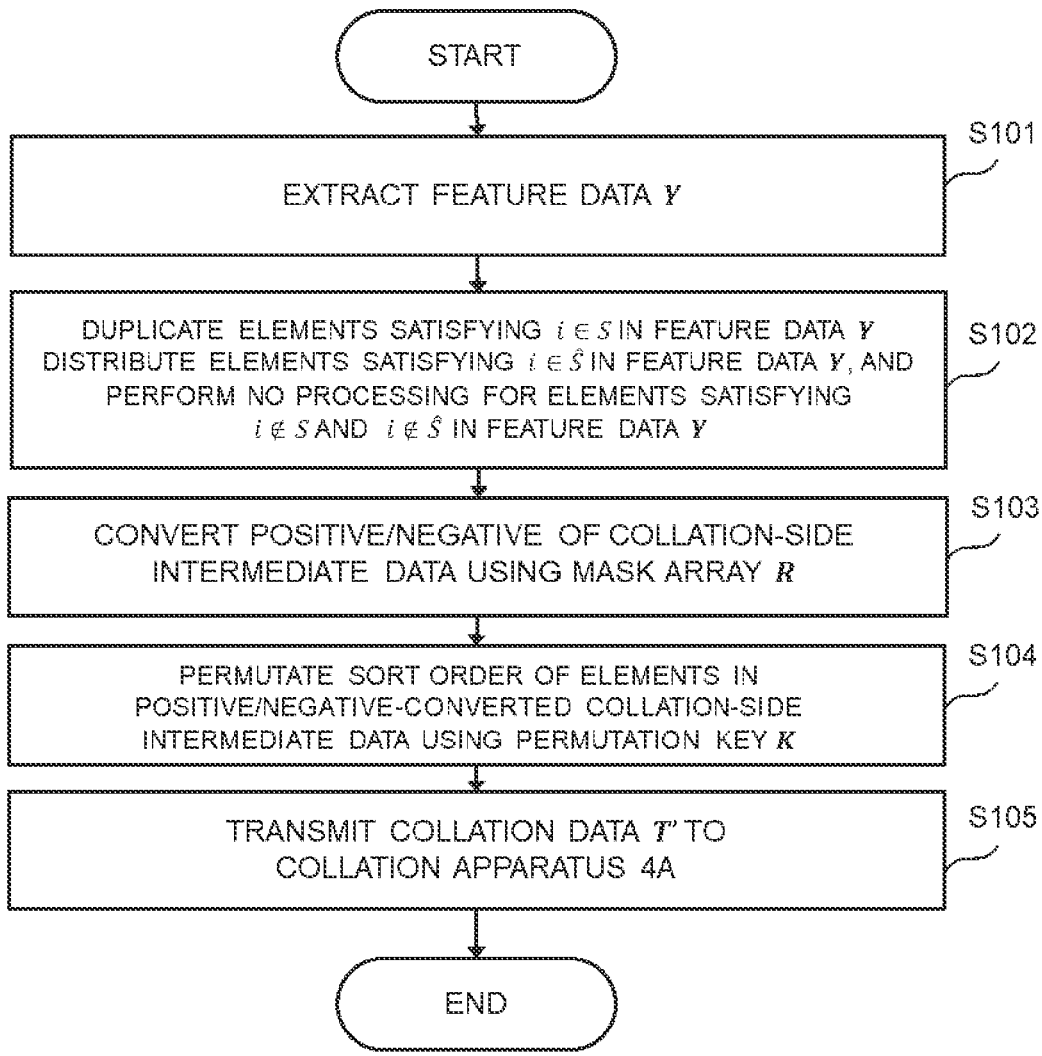
FIG. 34 is a flowchart illustrating a flow of processing of generating collation information according to the fourth example embodiment.
Figure 35:
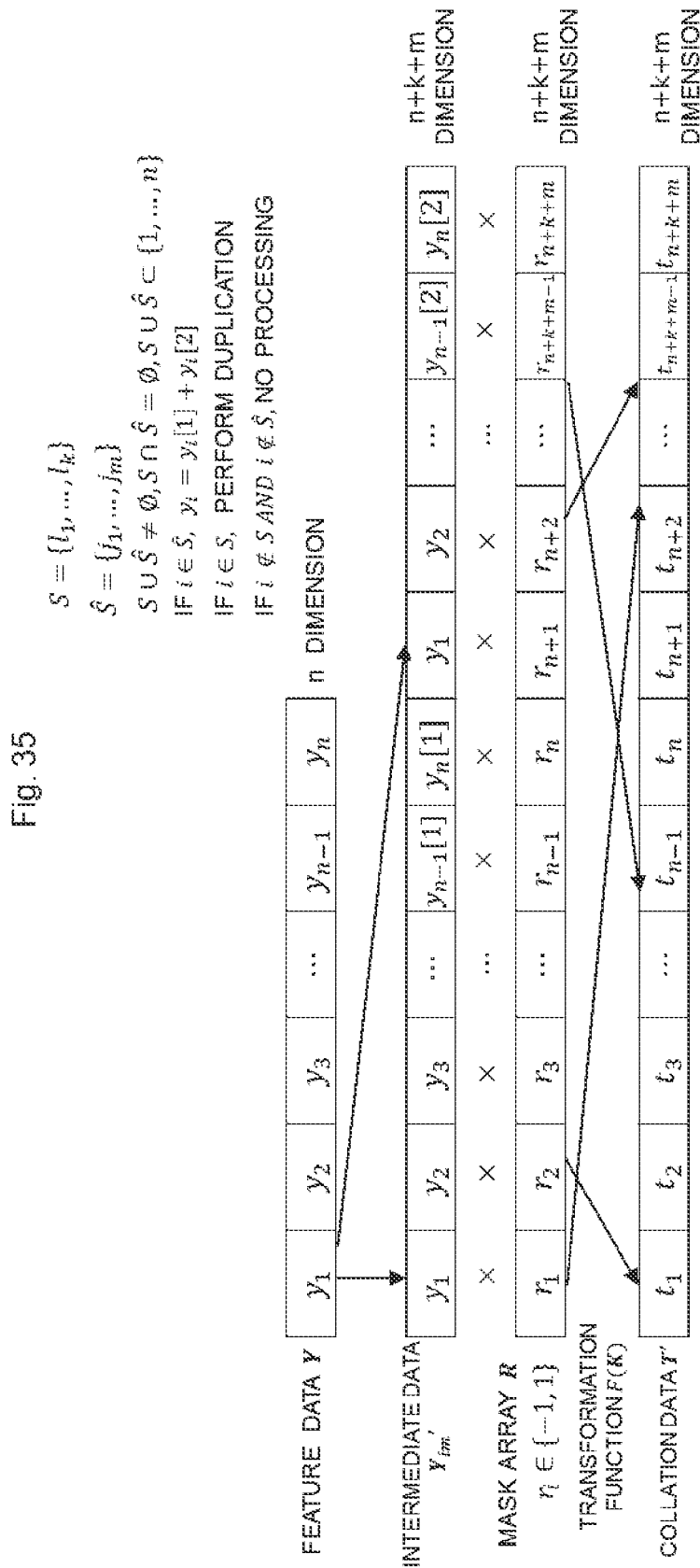
FIG. 35 is an explanation diagram of processing of generating the collation information according to the fourth example embodiment.

FIG. 34 is a flowchart illustrating a flow of processing of generating the collation information in the collation information generation apparatus 2B according to the present example embodiment. FIG. 35 is an explanation diagram modeling processing of generating the collation information in the collation information generation apparatus 2B according to the present example embodiment. Referring to FIGS. 34 and 35, a flow of the cancelable transformation in the collation information generation apparatus 2B will be described.

Biometric information on a user acquired by the collation information generation apparatus 2B is input to the controller 200B via the network I/F 201B. In the explanation of FIGS. 34 and 35, it is assumed that the facial image information on the user B is input to the collation information generation apparatus 2B.

In the present example embodiment, the key generation apparatus 3B transmits to the collation information generation apparatus 2B information indicating that one or both of the data S and the data S(hat) correspond to a subset included in n-dimensional data, as index information (see [Expression 9-1], [Expression 9-2], and [Expression 9-3]). The collation information generation apparatus 2B generates the collation information from the facial image information on the user B by referring to the index information. For the sake of explanation, it is assumed that both the data S and the data S(hat) are subsets in the n-dimensional data, respectively. From (Expression 9-3), it is assumed that there are no elements included in both the data S and the data S(hat).

First, in step S101, the feature extraction unit 210B generates the feature data Y, which is an n-dimensional vector, from the facial image information on the user B (see [Expression 3-1] and the top row of FIG. 35). The collation information generation apparatus 2B may acquire the feature data Y via the sensor 19 or the I/F 15. The feature data Y is an example of collation-side input information in the present example embodiment.

Then, in step S102, the intermediate information generation unit 220B refers to the index information, and performs the distribution processing on some elements in the n-dimensional feature data Y Here, the index information corresponds to information indicating that the dimensional elements identified by the data S are a subset in the n-dimensional data. In step S102, the intermediate information generation unit 220B performs the distribution processing (see [Expression 7-4]) when the following expression is satisfied for the i-th dimensional element in the n-dimensional feature data Y.

$$i \in \hat{S}$$ [Math. 103]

The distribution processing performed by the intermediate information generation unit 220B is an example of collation-side distribution processing in the present example embodiment. Further, in step S102, the intermediate information generation unit 220B performs the duplication processing when the following expression is satisfied for the i-th dimensional element in the n-dimensional feature data Y.

$$i \in S$$ [Math. 104]

The duplication process performed by the intermediate information generation unit 220B is an example of collation-side duplication processing in the present example embodiment. In step S102, the intermediate information generation unit 220B proceeds to step S103 without performing the distribution processing and the duplication processing on the i-th dimensional element in the n-dimensional feature data Y, when the following expression is satisfied for the i-th dimensional element in the n-dimensional feature data Y.

$$i \notin S \text{ AND } i \notin \hat{S}$$ [Math. 105]

FIG. 35 is a model diagram illustrating a flow of processing for the n-dimensional feature data Y in a configuration in which the first and second dimensional elements in the n-dimensional feature data Y are elements corresponding to the data S, the third dimensional element in the n-dimensional feature data Y is an element not corresponding to both the data S and the data S(hat), and the n−1-th and n-th dimensional elements in the n-dimensional feature data Y are elements corresponding to the data S(hat).

According to (Expression 9-1), in step S102, the intermediate information generation unit 220B duplicates the first and second dimensional elements $y_1$ and $y_2$ included in the n-dimensional feature data Y In step S102, the intermediate information generation unit 220B divides each of the n−1-th and n-th dimensional elements $y_{n-1}$ and $y_n$ included in the n-dimensional feature data Y into a plurality of random numbers. This allows to generate data that is a vector in which each of the first and second dimensional elements $y_1$ and $y_2$ included in the n-dimensional feature data Y is duplicated, and each of the n−1-th and n-th dimensional elements $y_{n-1}$ and $y_n$ included in the n-dimensional feature data Y is divided as follows (see the second row from the top in FIG. 35).

[Math. 106]

$$Y_{im} = (y_1, y_2, y_3, \ldots ,$$ (Expression 10-1)

$$y_{n-1}[1], y_n[1], y_1, y_2, \ldots , y_{n-1}[2], y_n[2])$$

From (Expression 9-1) and (Expression 9-2), the data S is information indicating k pieces of dimensional elements, and the data S(hat) is information indicating m pieces of dimensional elements. Therefore, the intermediate information generation unit 220B generates the data $Y_{im}$, which is an n+k+m-dimensional vector, from the n-dimensional feature data Y. In the following description, the data $Y_{im}$, which is a vector, may be referred to as "collation-side intermediate data". The collation-side intermediate data is an example of collation-side intermediate information in the present example embodiment.

The distribution processing in the present example embodiment corresponds to the processing for the intermediate information generation unit 220B to distribute each of some dimensional elements in the feature data Y to a plurality of random numbers. Here, the intermediate information generation unit 220B determines the dimensional elements in the feature data Y to be distributed, based on the index information. The intermediate information generation unit 220B divides each of the dimensional elements corresponding to the data S(hat) from among the n dimensional elements in the feature data Y into a plurality of random numbers.

The duplication processing in the present example embodiment corresponds to the processing for the intermediate information generation unit 220B to duplicate each of some dimensional elements in the feature data Y. In the case in which each of the dimensional elements corresponding to the data S(hat) among the n dimensional elements in the feature data Y is divided with the number of divisions n1 in the distribution processing on the feature data Y, the intermediate information generation unit 220B duplicates each of the dimensional elements corresponding to the data S among the n dimensional elements in the feature data Y n2 times in the duplication processing (n1=n2, and n1 and n2 are integers of 2 or more, respectively). In other words, the intermediate information generation unit 220B performs the distribution processing and the duplication processing such that the number of divisions n1 for the elements in the feature data Y in the distribution processing and the number of duplications n2 for the elements in the feature data Y are the same.

As mentioned above, the index information corresponds to information indicating elements to be distributed in the distribution processing, and elements to be duplicated in the duplication processing among the elements in the feature data Y In the present example embodiment, the dimensional elements corresponding to the data S among the elements in the feature data Y are an example of elements corresponding to a first set, and the dimensional elements corresponding to the data S(hat) among the elements in the feature data Y are an example of elements corresponding to a second set.

In the present example embodiment, dividing the i-th dimensional element $y_i$ in the feature data Y into a plurality of elements such that it is impossible to restore the original i-th dimensional element $y_i$ in the n-dimensional feature data Y from only one of them is sometimes referred to as "secret-sharing". For example, in (Expression 10-1), the secret-sharing is performed on the n−1-th dimensional element $y_{n-1}$ in the feature data Y to generate the random numbers $y_{n-1}[1]$ and $y_{n-1}[2]$.

In (Expression 10-1), the intermediate information generation unit 220B generates two random numbers (random numbers $y_{n-1}[1]$ and $y_{n-1}[2]$) by performing the secret-sharing for the n−1-th dimensional element $y_{n-1}$ in the n-dimensional feature data Y. However, the configuration is not limited to the following: the number of divisions n1=2. For example, the intermediate information generation unit 220B may set the number of divisions for the $j_1$-th dimensional element $y_{j1}$ in the n-dimensional feature data Y to p (p is any positive integer of 2 or more), and perform the secret-sharing for the $j_1$-th dimensional element $y_{j1}$ in the n-dimensional feature data Y (see [Expression 10-2]).

[Math. 107]

$$y_{j_1} = y_{j_1}[1] + \ldots + y_{j_1}[p] \quad \text{(Expression 10-2)}$$

In this configuration, through the distribution processing, the intermediate information generation unit 220B generates p random numbers (random numbers $y_{jm}[1]$ to $y_{jm}[p]$, see [Expression 10-2]) from the jm-th dimensional element $y_{jm}$ in the n-dimensional feature data Y. In addition, through the duplication processing, the intermediate information generation unit 220B duplicates each of the $l_1$-th to $l_k$-th dimensional elements $y_{1l}, \ldots, y_{lk}$ included in the n-dimensional feature data Y p times.

Then, in step S103, for each dimensional element in the collation-side intermediate data, the mask processing unit 240B performs the mask processing using the mask array R (see [Expression 9-6] and the third row from the top in FIG. 35). The mask processing performed by the mask processing unit 240B is an example of collation-side mask processing in the present example embodiment. As mentioned above, the mask array R is information generated by the key generation apparatus 3B. The key generation apparatus 3B generates the mask array R, which is an n+k+m-dimensional vector, and transmits it to the collation information generation apparatus 2B. In the present example embodiment, the key generation apparatus 3B transmits the same mask array R to the registration information generation apparatus 1B and the collation information generation apparatus 2B. Each element in the mask array R is as follows.

$$r_i \in \{-1, 1\} \quad \text{[Math. 108]}$$

The positive or negative of each dimensional element in the collation-side intermediate data can be converted by the mask processing for multiplying each dimensional element in the collation-side intermediate data by the mask array R. In the following explanation, the collation-side intermediate data obtained through the mask processing for multiplying each dimensional element by the mask array R may be referred to as "positive/negative-converted collation-side intermediate data".

Next, in step S104, the permutation processing unit 230B performs the permutation processing for reordering the dimensional elements in the positive/negative-converted collation-side intermediate data by the permutation function F using the permutation key K. The permutation processing performed by the permutation processing unit 230B is an example of collation-side permutation processing in the present example embodiment. The permutation key K is an example of information that defines how to reorder elements in information of interest, and corresponds to a cryptographic key randomly generated by the key generation apparatus 3B. As mentioned above, the permutation key K is information generated by the key generation apparatus 3B, and transmitted from the key generation apparatus 3B to the collation information generation apparatus 2B. The permutation processing unit 230B performs the permutation processing to transform the positive/negative-converted collation-side intermediate data into data below (see the bottom row of FIG. 35).

[Math. 109]

$$T' = (t'_1, t'_2, \ldots, t'_n, t'_{n+1}, \ldots, t'_{n+k+m-1}, t'_{n+k+m})$$

The data T', which is a vector, corresponds to data in which each dimensional element in the positive/negative-converted collation-side intermediate data is transformed based on the permutation key K. In the following explanation, the data T', which is a vector, may be referred to as "collation data T'". The collation data T' is an example of collation information in the present example embodiment.

The same permutation key K is used in both the registration information generation apparatus 1B and the collation information generation apparatus 2B. In other words, in the permutation processing performed by the collation information generation apparatus 2B, the dimensional elements in the positive/negative-converted collation-side intermediate data are reordered in the same sort order as in the permutation processing in the registration information generation apparatus 1B.

Therefore, the collation data T' (i and j are any positive integers, respectively) corresponds to data in which the dimensional elements included in the positive/negative-converted collation-side intermediate data are reordered as in (Expression 10-3).

[Math. 110]

$$t'_i = r_k \cdot y_k, \ldots, t'_j = r_{n+k} \cdot y_k \quad \text{(Expression 10-3)}$$

The collation data T' (i' and j' are any positive integers, respectively) corresponds to data in which the dimensional elements included in the positive/negative-converted collation-side intermediate data are reordered as in (Expression 10-4).

[Math. 111]

$$t'_{i'} = r_m \cdot y_m[1], \ldots, t'_{j'} = r_{n+m} \cdot y_m[2] \quad \text{(Expression 10-4)}$$

The masking processing using the mask array R may be omitted, and the collation data T' may be generated in such a configuration. Furthermore, the order of the mask processing and the permutation processing may be changed to generate the collation data T'.

The collation information generation apparatus 2B transmits the collation data T' generated in this manner to the collation apparatus 4B in step S75. The collation apparatus 4B stores the received collation data T' therein. At this time, the collation information generation apparatus 2B may transmit the collation data T' to the collation apparatus 4B together with an identifier (user identifier) capable of identifying that the data is information on the user B.

As described above, the collation information generation apparatus 2B generates the collation data T' by performing the mask processing and permutation processing after performing the secret-sharing for some elements included in the feature data Y and performing the duplication. Therefore, in the case in which the permutation key K is not compromised, it is difficult to determine which element in the collation data T' corresponds to which element in the feature data Y In addition, since the collation data T' is generated from a state in which the secret-sharing and the duplication have been performed on the feature data Y, even if both the mask array R and the permutation key K are compromised, it is difficult to identify that collation data newly generated using the compromised mask array R and permutation key K, and the compromised collation data T' are derived from feature data of the same living body. From the above, the collation information generation apparatus 2B in the present example embodiment can further reduce the risk of information leakage.

<5.3. Flow of Processing of Calculating Similarity>

In the present example embodiment, the collation apparatus 4B performs collation between biometric information input to the registration information generation apparatus 1B and biometric information input to the collation information generation apparatus 2B in the collation apparatus 4B (see FIG. 29) in the same way as the third example embodiment.

In step S81, the network I/F 401B acquires the registration data T from the DB 5B. The DB 5B stores therein the registration data T regarding the biometric information on the user B received from the registration information generation apparatus 1B in step S65, together with an identifier capable of identifying that the data is information on the user B. The collation apparatus 4B acquires from the DB 5B the registration data T regarding the biometric information on the user corresponding to the user identifier received from the collation information generation apparatus 2B in step S75, that is, the user A.

In step S82, the similarity calculation unit 410B calculates an inner product of the registration data T and the collation data T' as a normalized correlation between the registration data T and the collation data T'. Here, the inner product of the registration data T and the collation data T', each of which is an n+k+m-dimensional vector, is defined as follows.

[Math. 112]

$$\langle T, T' \rangle = \sum t_i \cdot t'_i \quad \text{(Expression 8-3)}$$

According to (Expression 2-2), (Expression 9-7) and (Expression 10-3), the following is calculated for any positive integers i and j.

[Math. 113]

$$t_i \cdot t'_i + t_j \cdot t'_j = r_k^2 \cdot x_k[1] y_k + r_{n+k}^2 \cdot x_k[2] y_k = y_k(x_k[1] + x_k[2]) = x_k \cdot y_k$$

Also, for any positive integers i=i', and j=j', (Expression 8-3) is calculated according to (Expression 7-2), (Expression 9-8) and (Expression 10-4) as follows.

[Math. 114]

$$t_i \cdot t'_i \cdot t_j \cdot t'_j = r_m^2 \cdot x_m y_m[1] + r_{n+m}^2 \cdot x_m y_m[2] = x_m(y_m[1] + y_m[2]) = x_m \cdot y_m$$

In other words, the inner product of the registration data T and the collation data T' is equal to an inner product of the feature data X and the feature data Y (see [Expression 8-2]).

Also in the present example embodiment, the similarity calculation unit 410B calculates the inner product of the registration data T and the collation data T' as the similarity between the feature data X and the feature data Y.

Next, in step S83, the collation processing unit 420B performs the collation processing for performing collation between the biometric information pertaining to the feature data X and the biometric information pertaining to the feature data Y based on the similarity between the feature data X and the feature data Y calculated in step S82.

In addition, the collation apparatus 4B may authenticate a user identified by the collation information based on the result of the collation processing in step S83.

Further, for the mask array R used in the registration information generation apparatus 1B, the collation information generation apparatus 2B may perform the mask processing using a mask array below.

[Math. 115]

$$R' = r_1^{-1}, r_2^{-1}, \ldots, r_{n-1}^{-1}, \quad \text{(Expression 10-5)}$$
$$r_n^{-1}, r_n+1^{-1}, \ldots, r_{n+k+m}^{-1}, r_{n+k+m}^{-1})$$

Hereinafter, the mask array R', which is a vector, may be simply referred to as "mask array R'". According to (Expression 9-6) and (Expression 10-5), each element in the mask array R' satisfies the following expression for any positive integer j.

[Math. 116]

$$r_j \cdot r_j^{-1} = 1$$

That is, each element in the mask array R', which is $$r_j^{-1} \quad \text{[Math. 117]}$$

corresponds to a multiplicative inverse of each element $r_j$ of the mask array R shown in (Expression 9-6).

As described above, according to the present example embodiment, in the above calculation processing using the registration data T generated by the registration information generation apparatus 1B and the collation data T' generated by the collation information generation apparatus 2B, the similarity can be calculated by calculating the inner product once. Therefore, a high throughput can be expected, similar to the cancelable biometrics of the related art. In addition, since the inner product of the registration data T and the collation data T' is equal to the inner product of the feature data X and the feature data Y, the collation accuracy can be maintained as in the cancelable biometrics of the related art. Accordingly, the registration information generation apparatus 1B and the collation information generation apparatus 2B according to the present example embodiment can perform the cancelable transformation capable of suppressing the degradation of collation accuracy and reducing the risk of information leakage.

Also in the present example embodiment, as in the example alternation of the third example embodiment, the elements included in the key generation apparatus 3B may be provided in the registration information generation apparatus 1B and the collation information generation apparatus 2B (see FIGS. 30 and 31). In this way, the registration information generation apparatus 1B and the collation information generation apparatus 2B can perform the cancelable transformation without communicating with the key generation apparatus 3B. Therefore, it is possible to further reduce the risk of leakage of the mask array R, the permutation key K and the index information in a communication path with the key generation apparatus 3B.

6. Application to Euclidean Distance

Figure 36:
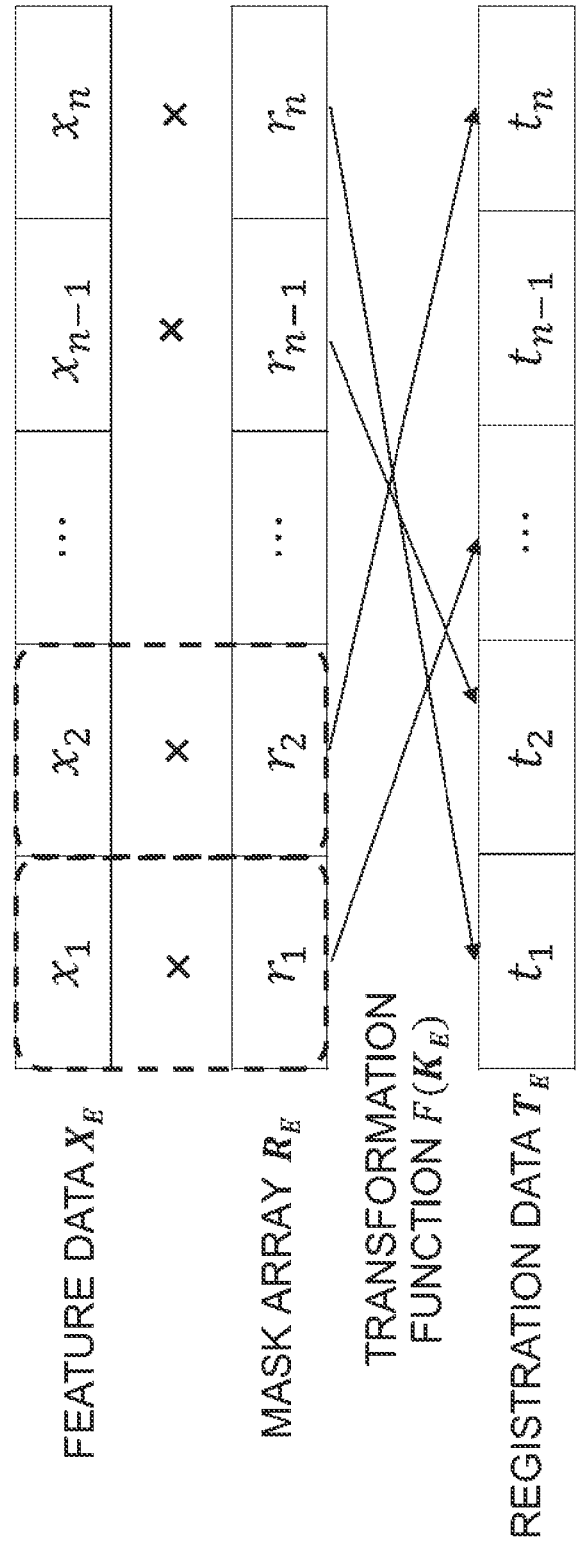
FIG. 36 is a model diagram of cancelable transformation for the Euclidean distance as a second reference example.

The similarity between the feature data X and the feature data Y generated from biometric data may be calculated using an Euclidean distance in place of the normalized correlation. FIG. 36 is a model diagram of the cancelable transformation for the Euclidean distance as a second reference example.

In FIG. 36, features extracted from biometric information are represented by feature data below, which is an n-dimensional vector.

[Math. 118]

$$X_E = (x_1, x_2, \ldots, x_{n-1}, x_n)$$

Hereinafter, the feature data $X_E$, which is a vector, may be simply referred to as "feature data $X_E$".

When generating registration information for face authentication from the feature data $X_E$, first, the mask processing is performed by using a mask array below for each dimensional element in the feature data $X_E$.

[Math. 119]

$$R_E = (r_1, r_2, \ldots, r_{n-1}, r_n)$$

Hereinafter, the mask array $R_E$, which is a vector, may be simply referred to as "mask array $R_E$". Each element in the mask array $R_E$ is a random number, and the mask array $R_E$ is added to each dimensional element in the feature data $X_E$ through the mask processing. In the following description, the feature data $X_E$ obtained through the mask processing for multiplying each dimensional element by the mask array $R_E$ may be referred to as "random-number-transformed feature data $X_E$".

Next, the sort order of dimensional elements in the random-number-transformed feature data $X_E$ is reordered by a permutation function F using a permutation key below.

$$K_E \quad \text{[Math. 120]}$$

Through the above processing, registration data is generated as follows.

[Math. 121]

$$T_E = (t_1, t_2, \ldots, t_{n-1}, t_n)$$

Hereinafter, the registration data $T_E$, which is an n-dimensional vector, may be simply referred to as "registration data $T_E$". The permutation key $K_E$, which is a vector, is a parameter that defines how to reorder elements in data which is an n-dimensional vector.

When generating collation information for collating, features extracted from biometric information to be used for collation are represented by feature data below which is an n-dimensional vector.

[Math. 122]

$$Y_E = (y_1, y_2, \ldots, y_{n-1}, y_n)$$

Hereinafter, the feature data $Y_E$, which is a vector, may be simply referred to as "feature data $Y_E$". The same processing as for the feature data $X_E$ is applied to the feature data $Y_E$ to obtain collation data below.

[Math. 123]

$$T'_E = (t'_1, t'_2, \ldots, t'_{n-1}, t'_n)$$

Hereinafter, the collation data $T'_E$, which is an n-dimensional vector, may be simply referred to as "collation data $T'_E$".

Then, a similarity between the registration data $T_E$ and the collation data $T'_E$ can be obtained by using the following Euclidean distance between the registration data $T_E$ and the collation data $T'_{E'}$.

[Math. 124]

$$d(T_E, T'_E) = \sum (t_i - t'_i)^2$$

Also, a similarity between the feature data $X_E$ and the feature data $Y_E$ can be obtained by using the following Euclidean distance between the feature data $X_E$ and the feature data $Y_E$.

[Math. 125]

$$d(X_E, Y_E) = \sum (x_i - y_i)^2$$

In this configuration, for any positive integers i and j, the following expression is satisfied.

[Math. 126]

$$(t_i - t'_i)^2 = ((x_j + r_j) - (y_j + r_j))^2 = (x_j - y_j)^2 \quad \text{(Expression 11-1)}$$

Therefore, the following expression is obviously satisfied.

$$d(T_E, T'_E) = d(X_E, Y_E) \quad \text{[Math. 127]}$$

In other words, in collating in authentication using the registration data $T_E$ and the collation data $T'_E$, its collation accuracy can be obtained at the same level as the collation accuracy between the feature data $X_E$ and the feature data $Y_E$.

However, in authentication systems using the cancelable transformation for the Euclidean distance, one combination of the mask processing using the mask array $R_E$ and the permutation key $K_E$ is defined for one authentication system. Hence, there is a problem that data in which the mask array $R_E$ is transformed with the permutation key $K_E$ is compromised if an attacker attempts to register "data that is close to the feature data X" below.

$$X1^* = (0, \ldots, 0) \quad \text{[Math. 128]}$$

It is assumed that an attacker attempts to register "data close to the feature data X" below

[Math. 129]

$$X2^* = (x_1, x_2, \ldots, x_{n-1}, x_n)$$

and "data close to the feature data X" below.

[Math. 130]

$$X3^* = (x'_1, x_2, \ldots, x_{n-1}, x_n)$$

In this case, the transformed aspect of data in the first dimensional element in the permutation key K is compromised.

In the case in which the registration data $T_E$ is leaked, it is assumed that, using the same mask array $R_E$ and permutation key $K_E$ as when the registration data $T_E$ was generated, registration data $T_E2$ is generated from feature data $X_E2$ for new biometric information of the same person pertaining to the registration data $T_E$, and the registration data $T_E2$ is registered in an authentication system.

In this case, since the feature data $X_E$ pertaining to the registration data $T_E$ and the feature data $X_E2$ are close to each other, there may arise a problem that it is easy to perform the so-called spoofing act of collating against the registration data $T_E2$ using the leaked registration data $T_E$.

Furthermore, if the registration data $T_E$ is compromised, the mask array $R_E$ and the permutation key $K_E$ have to be updated to ensure the security of the entire authentication system. Then, the registration data $T_E$ already registered in the authentication system must be updated with registration information generated using a new mask array $R_E$ and permutation key $K_E$.

Figure 37:
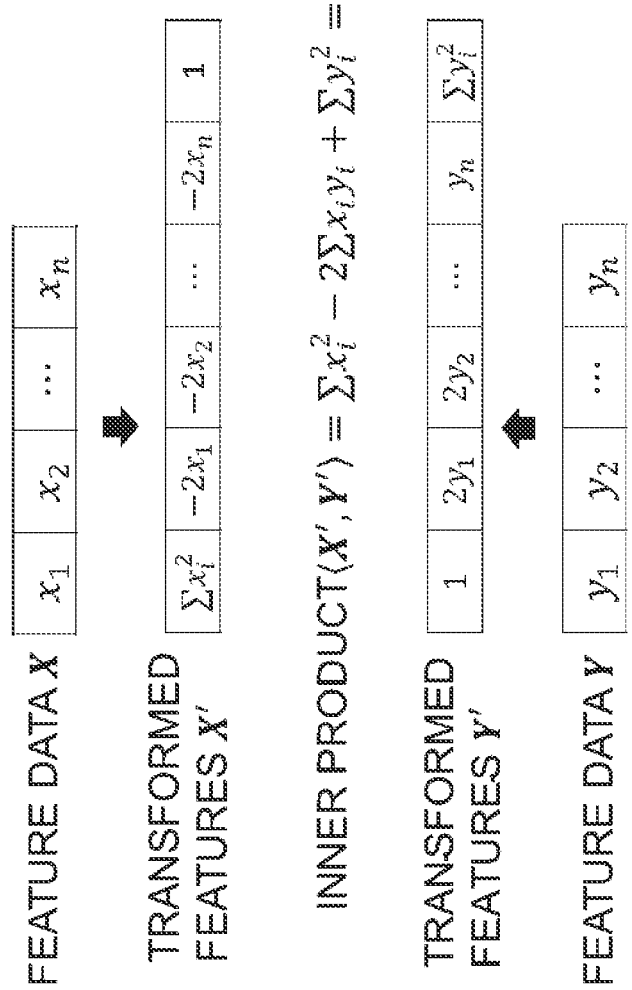
FIG. 37 is a diagram illustrating an alternation example embodiment of information according to the present invention.

In light of the problem described above, when obtaining the similarity for the features extracted from the biometric information by using the Euclidean distance, according to (Expression 11-1), the n-dimensional feature data X in (Expression 2-1) is transformed as follows (see FIG. 37).

[Math. 131]

$$X' = \left(\sum x_i^2 - 2x_{i1}, -2x_{i2}, \ldots, -2x_{in}, 1\right)$$

In addition, the n-dimensional feature data Y in (Expression 3-1) is transformed as follows (see FIG. 37).

$$Y' = (1, y_{i1}, y_{i2}, \ldots, y_{in}, \tau y_i^2) \quad \text{[Math. 132]}$$

When obtaining the similarity for the features extracted from the biometric information by using the Euclidean distance, an inner product of the transformed feature data X' which is a vector, and the transformed feature data Y' which is a vector is as follows.

[Math. 133]

$$\langle X', Y' \rangle = \sum x_i^2 - 2\sum x_i y_i + \sum y_i^2 = \sum (x_i - y_i)^2 = d_E(X, Y)$$

Therefore, by applying the first through fourth example embodiments to the transformed feature data X', which is a vector, and the transformed feature data Y', which is a vector, it is possible to achieve the cancelable transformation capable of suppressing the degradation of collation accuracy and reducing the risk of information leakage.

7. Fifth Example Embodiment

A fifth example embodiment of the present invention will be described with reference to FIGS. 38 to 40. The above-described first and second example embodiments are concrete example embodiments, whereas the fifth example embodiment is a more generalized example embodiment.

Figure 38:
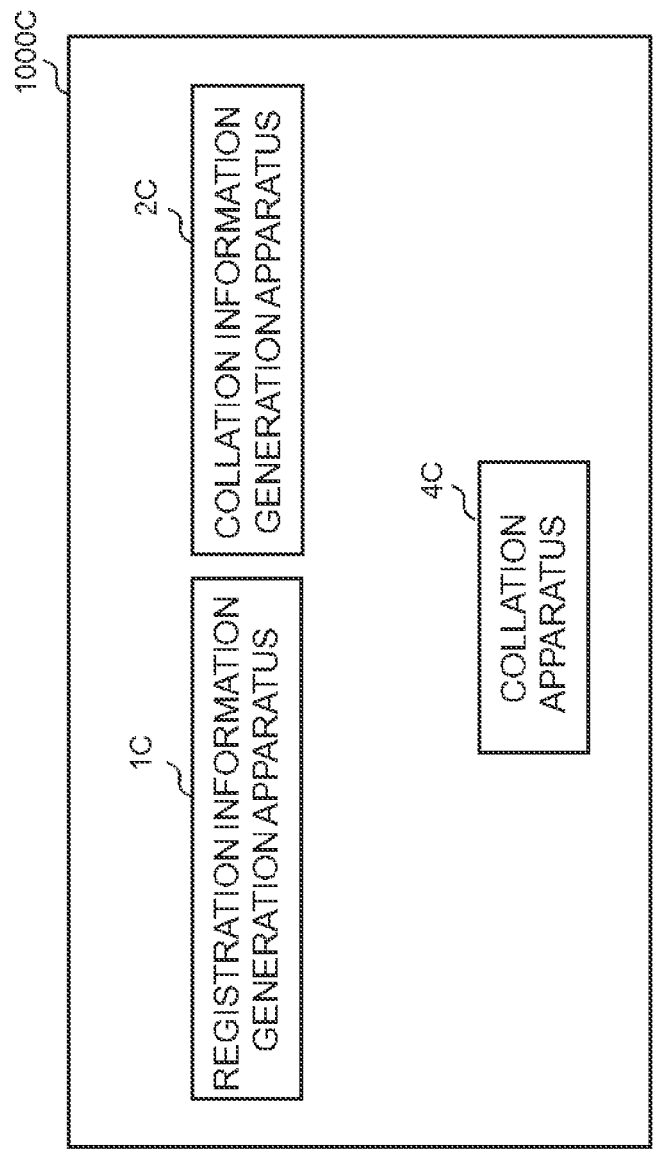
FIG. 38 is a block diagram illustrating an example of a schematic configuration of a collation system according to a fifth example embodiment.

FIG. 38 is a block diagram illustrating an example of a schematic configuration of a collation system 1000C according to the fifth example embodiment of the present invention. As illustrated in FIG. 38, the collation system 1000C includes a registration information generation apparatus 1C, a collation information generation apparatus 2C, and a collation apparatus 4C including a similarity calculation unit that calculates, based on registration information and collation information, a similarity between registration-side input information and collation-side input information.

Figure 39:
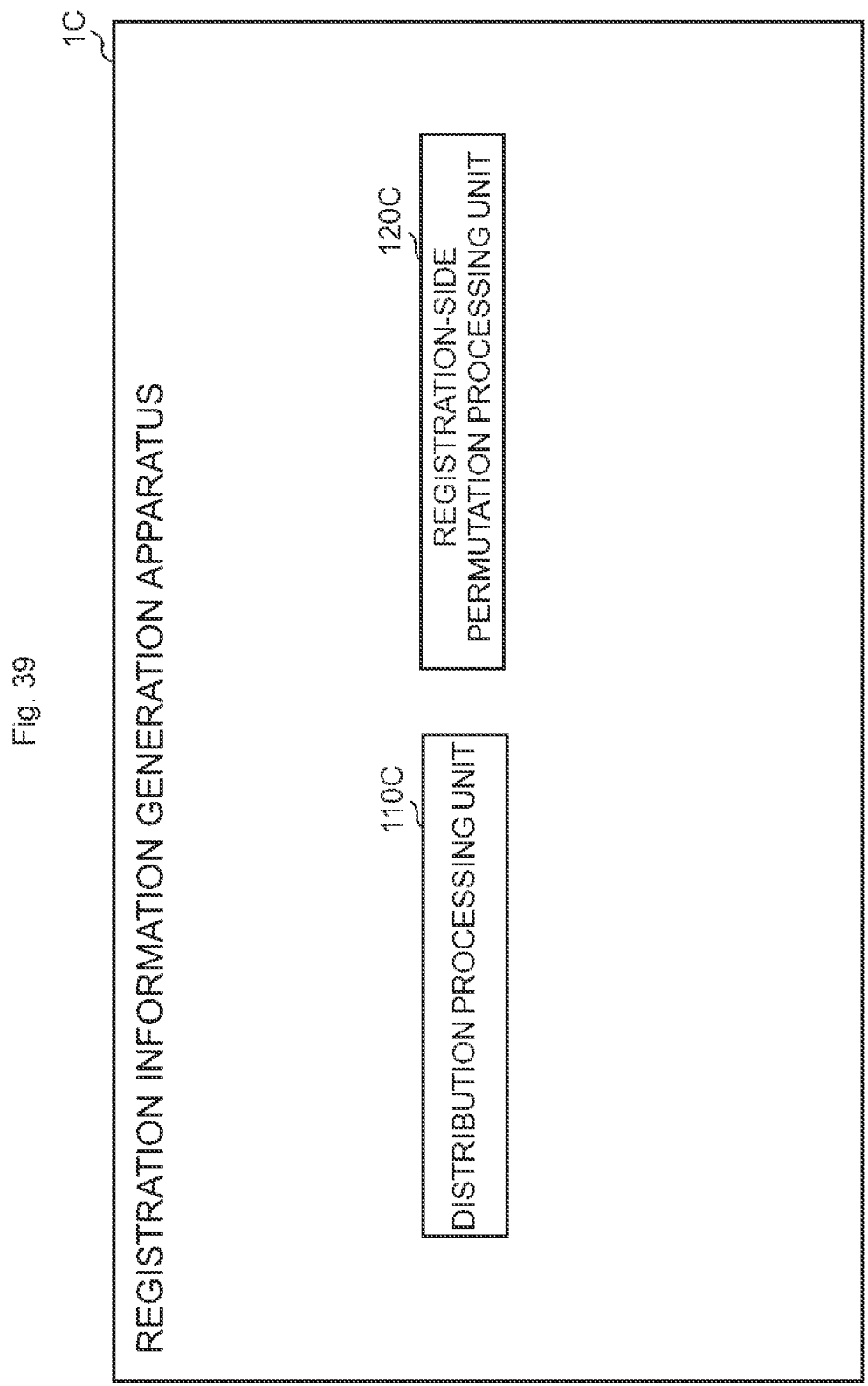
FIG. 39 is a block diagram illustrating an example of a schematic configuration of a registration information generation apparatus according to the fifth example embodiment.

FIG. 39 is a block diagram illustrating an example of a schematic configuration of the registration information generation apparatus 1C according to the fifth example embodiment. The registration information generation apparatus 1C includes a distribution processing unit 110C, and a registration-side permutation processing unit 120C.

The distribution processing unit 110C performs distribution processing for performing secret-sharing for elements included in input information to generate secret-sharing information from registration-side input information input to the registration information generation apparatus 1C for registration. The registration-side permutation processing unit 120C performs registration-side permutation processing for permutating a sort order of elements in input information by using a permutation key. The registration information generation apparatus 1C generates registration information by permutating a sort order of elements included in the secret-sharing information using the permutation key.

Figure 40:
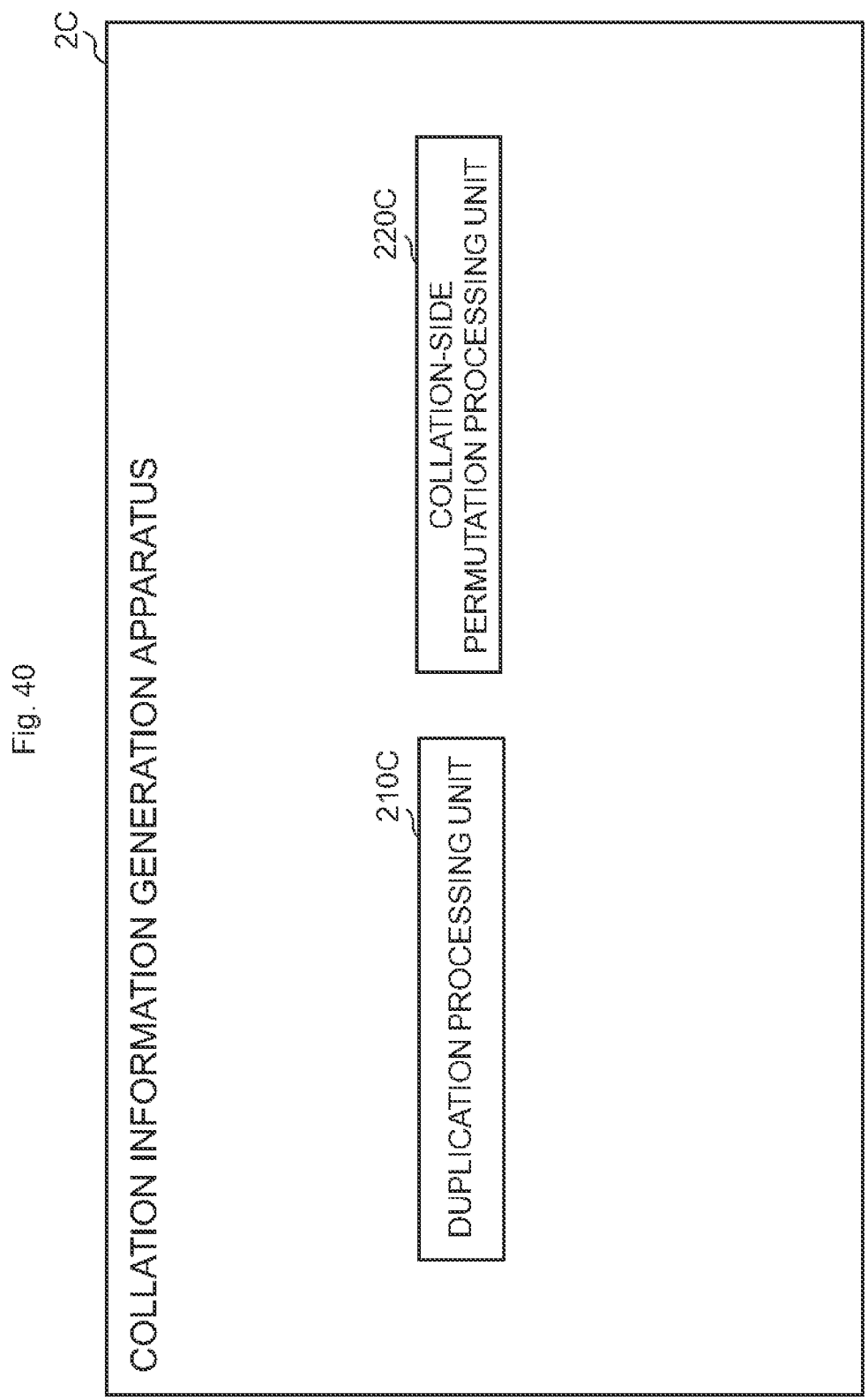
FIG. 40 is a block diagram illustrating an example of a schematic configuration of a collation information generation apparatus according to the fifth example embodiment.

FIG. 40 is a block diagram illustrating an example of a schematic configuration of the collation information generation apparatus 2C according to the fifth example embodiment. The collation information generation apparatus 2C includes a duplication processing unit 210C and a collation-side permutation processing unit 220C.

The duplication processing unit 210C performs duplication processing for duplicating elements included in input information to generate duplicated information from collation-side input information input to the collation information generation apparatus 2C for collation. The collation-side permutation processing unit 220C performs collation-side permutation processing for permutating a sort order of elements included in input information using a permutation key. The collation information generation apparatus 2C generates collation information by permutating a sort order of elements in the duplicated information using the permutation key.

Relationship with First and Second Example Embodiments

In one example, the registration information generation apparatus 1C according to the fifth example embodiment may perform the operations of the registration information generation apparatus 1A according to the first or second example embodiment. Similarly, in one example, the collation information generation apparatus 2C according to the fifth example embodiment may perform the operations of the collation information generation apparatus 2A according to the first or second example embodiment. Similarly, in one example, the collation system 1000C according to the fifth example embodiment may perform the operations of the collation system 1000A according to the first or second example embodiment. In the above configuration, the description of the first or second example embodiment can be applied to the fifth example embodiment. The fifth example embodiment is not limited to the above examples.

8. Sixth Example Embodiment

Next, a sixth example embodiment of the present invention will be described with reference to FIGS. 41 to 43. The above-described third and fourth example embodiments are concrete example embodiments, whereas the sixth example embodiment is a more generalized example embodiment.

FIG. 41 is a block diagram illustrating an example of a schematic configuration of a collation system 1000D according to the sixth example embodiment of the present invention. As illustrated in FIG. 41, the collation system 1000D includes a registration information generation apparatus 1D, a collation information generation apparatus 2D, and a collation apparatus 4D including a similarity calculation unit that calculates, based on registration information and collation information, a similarity between registration-side input information and collation-side input information.

FIG. 42 is a block diagram illustrating an example of a schematic configuration of the registration information generation apparatus 1D according to the sixth example embodiment. The registration information generation apparatus 1D includes a registration-side intermediate information generation unit 110D, and a registration-side permutation processing unit 120D.

The registration-side intermediate information generation unit 110D performs, based on registration-side input information input to the registration information generation apparatus 1D for registration, registration-side distribution processing for performing secret-sharing for elements corresponding to a first set in input information, and a registration-side duplication processing for duplicating elements corresponding to a second set in the input information, to generate registration-side intermediate information from the registration-side input information. The registration-side permutation processing unit 120D performs registration-side permutation processing for permutating a sort order of elements in input information by using a permutation key. The registration information generation apparatus 1D generates registration information by permutating a sort order of elements included in the registration-side intermediate information using the permutation key.

FIG. 43 is a block diagram illustrating an example of a schematic configuration of the collation information generation apparatus 2D according to the sixth example embodiment. The collation information generation apparatus 2D includes a collation-side intermediate information generation unit 210D and a collation-side permutation processing unit 220D.

The collation-side intermediate information generation unit 210D performs, based on collation-side input information input to the collation information generation apparatus 2D for collation, collation-side duplication processing for duplicating elements corresponding to a first set in input information, and collation-side distribution processing for performing secret-sharing for elements corresponding to a second set in the input information, to generate collation-side intermediate information from the collation-side input information. The collation-side permutation processing unit 220D performs collation-side permutation processing for permutating a sort order of elements included in input information using a permutation key. The collation information generation apparatus 2D generates collation information by permutating a sort order of elements in the collation-side intermediate information using the permutation key.

Relationship with Third and Fourth Example Embodiments

In one example, the registration information generation apparatus 1D according to the sixth example embodiment may perform the operations of the registration information generation apparatus 1B according to the third or fourth example embodiment. Similarly, in one example, the collation information generation apparatus 2D according to the sixth example embodiment may perform the operations of the collation information generation apparatus 2B according to the third or fourth example embodiment. Similarly, in one example, the collation system 1000D according to the sixth example embodiment may perform the operations of the collation system 1000B according to the third or fourth example embodiment. In the above configuration, the description of the third or fourth example embodiment can be applied to the sixth example embodiment. The sixth example embodiment is not limited to the above examples.

9. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

The processing steps illustrated in the flowchart are not necessarily performed in the illustrated order. The processing steps may be performed in an order different from that illustrated, or two or more processing steps may be performed in parallel. Some of the processing steps may be deleted, or further processing steps may be added.

An apparatus (e.g., one or more apparatuses (or units) out of plurality of apparatuses (or units) constituting the registration information generation apparatus, or a module for one of the plurality of apparatuses (or units)) including constituent elements (e.g., the distribution processing unit, the registration-side intermediate information generation unit, and/or the registration-side permutation processing unit) of the registration information generation apparatus described in the Specification may be provided. An apparatus (e.g., one or more apparatuses (or units) out of plurality of apparatuses (or units) constituting the collation information generation apparatus, or a module for one of the plurality of apparatuses (or units)) including constituent elements (e.g., the duplication processing unit, the collation-side intermediate information generation unit, and/or the collation-side permutation processing unit) of the collation information generation apparatus described in the Specification may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as in the following supplementary notes, but are not limited to the following.

(Supplementary Note 1)

A registration information generation apparatus for generating registration information based on registration-side input information input for registration, the registration-side input information including one or both of elements corresponding to a first set and elements corresponding to a second set that is different from the first set, the registration information generation apparatus comprising:
- a registration-side intermediate information generation unit configured to generate registration-side intermediate information from the registration-side input information by performing registration-side distribution processing for performing secret-sharing for the elements corresponding to the first set in input information, and a registration-side duplication processing for duplicating the elements corresponding to the second set in input information; and
- a registration-side permutation processing unit configured to perform registration-side permutation processing for permutating a sort order of elements in input information using a permutation key,
  wherein the registration information is generated by permutating a sort order of elements in the registration-side intermediate information using the permutation key.

(Supplementary Note 2)

The registration information generation apparatus according to Supplementary Note 1, further comprising a registration-side mask processing unit configured to perform registration-side mask processing for transforming elements in input information using a mask array,
  wherein the registration information is generated by transforming the elements in the registration-side intermediate information using the mask array, and permutating the sort order of the elements in the registration-side intermediate information using the permutation key.

(Supplementary Note 3)

The registration information generation apparatus according to Supplementary Note 2, further comprising a registration-side mask array generation unit configured to generate the mask array.

(Supplementary Note 4)

The registration information generation apparatus according to any one of Supplementary Notes 1 to 3, wherein the registration-side intermediate information generation unit is configured to generate the registration-side intermediate information by
  in the registration-side distribution processing, dividing each of the elements corresponding to the first set in the input information into n1 pieces of distributed information (n1 is an integer satisfying n1≥2), and
  in the registration-side duplication processing, duplicating the elements corresponding to the second set in the input information n2 times (n2 is an integer satisfying n2≥2),
  the n1 pieces of distributed information have different values, respectively, and
  a sum of the n1 pieces of distributed information has a value equal to the element corresponding to the first set in the input information before being divided into the n1 pieces of distributed information.

(Supplementary Note 5)

The registration information generation apparatus according to any one of Supplementary Notes 1 to 4, further comprising a registration-side permutation key generation unit configured to generate the permutation key.

(Supplementary Note 6)

The registration information generation apparatus according to any one of Supplementary Notes 1 to 5, further comprising a registration-side index information generation unit configured to generate registration-side index information indicating the elements in the first set and the elements in the second set.

(Supplementary Note 7)

A registration information generation apparatus for generating registration information based on registration-side input information input for registration, the registration information generation apparatus comprising:
- a distribution processing unit configured to generate secret-sharing information from the registration-side input information by performing distribution processing for performing secret-sharing for elements in input information; and
- a registration-side permutation processing unit configured to perform registration-side permutation processing for permutating a sort order of elements in input information using a permutation key,
wherein the registration information is generated by permutating a sort order of elements in the secret-sharing information using the permutation key.

(Supplementary Note 8)

The registration information generation apparatus according to Supplementary Note 7, further comprising a registration-side mask processing unit configured to perform registration-side mask processing for transforming elements in input information using a mask array,
wherein the registration information is generated by transforming the elements in the secret-sharing information using the mask array, and permutating the sort order of the elements in the secret-sharing information using the permutation key.

(Supplementary Note 9)

The registration information generation apparatus according to Supplementary Note 8, further comprising a registration-side mask array generation unit configured to generate the mask array.

(Supplementary Note 10)

The registration information generation apparatus according to any one of Supplementary Notes 7 to 9, wherein the distribution processing unit is configured to, in the distribution processing, generate the secret-sharing information by dividing each of the elements in the input information into n1 pieces of distributed information (n1 is an integer satisfying n1≥2),
the n1 pieces of distributed information have different values, respectively, and
a sum of the n1 pieces of distributed information is equal to the element in the input information before being divided into the n1 pieces of distributed information.

(Supplementary Note 11)

The registration information generation apparatus according to any one of Supplementary Notes 7 to 10, further comprising a registration-side permutation key generation unit configured to generate the permutation key.

(Supplementary Note 12)

A collation information generation apparatus for generating collation information based on collation-side input information input for collation, the collation-side input information including one or both of elements corresponding to a first set, and elements corresponding to a second set that is different from the first set, the collation information generation apparatus comprising:
a collation-side intermediate information generation unit configured to generate collation-side intermediate information from the collation-side input information by performing collation-side duplication processing for duplicating the elements corresponding to the first set in input information, and collation-side distribution processing for performing secret-sharing for the elements corresponding to the second set in input information; and
a collation-side permutation processing unit configured to perform collation-side permutation processing for permutating a sort order of elements in input information using a permutation key,
wherein the collation information is generated by permutating a sort order of elements in the collation-side intermediate information using the permutation key.

(Supplementary Note 13)

The collation information generation apparatus according to Supplementary Note 12, further comprising a collation-side mask processing unit configured to perform collation-side mask processing for transforming elements in input information using a mask array,
wherein the collation information is generated by transforming the elements in the collation-side intermediate information using the mask array, and permutating the sort order of the elements in the collation-side intermediate information using the permutation key.

(Supplementary Note 14)

The collation information generation apparatus according to Supplementary Note 13, further comprising a collation-side mask array generation unit configured to generate the mask array.

(Supplementary Note 15)

The collation information generation apparatus according to any one of Supplementary Notes 12 to 14, wherein the collation-side intermediate information generation unit is configured to generate the collation-side intermediate information by
In the collation-side duplication processing, duplicating the elements corresponding to the first set in the input information n1 times (n1 is an integer satisfying n1≥2), and
in the collation-side distribution processing, dividing each of the elements corresponding to the second set in the input information into n2 pieces of distributed information (n2 is an integer satisfying n2≥2),
n1 is the same as a number of divisions when each of the elements corresponding to the first set in input information is divided into pieces of distributed information in a registration information generation apparatus configured to generate registration information to be collated with the collation information,
the n2 pieces of distributed information have different values, respectively,
a sum of the n2 pieces of distributed information has a value equal to the element corresponding to the second set in the input information before being divided into the n2 pieces of distributed information, and
n2 is the same as a number of duplications when duplicating each of the elements corresponding to the second set in input information in the registration information generation apparatus.

(Supplementary Note 16)

The collation information generation apparatus according to any one of Supplementary Notes 12 to 15, further comprising a collation-side permutation key generation unit configured to generate the permutation key.

(Supplementary Note 17)

The collation information generation apparatus according to any one of Supplementary Notes 12 to 16, further comprising a collation-side index information generation unit configured to generate collation-side index information indicating the elements in the first set and the elements in the second set.

(Supplementary Note 18)

A collation information generation apparatus for generating collation information based on collation-side input information input for collation, the collation information generation apparatus comprising:
a duplication processing unit configured to generate duplicated information from the collation-side input information by performing duplication processing for duplicating elements in input information; and
a collation-side permutation processing unit configured to perform collation-side permutation processing for permutating a sort order of elements in input information using a permutation key, wherein the collation information is generated by permutating a sort order of elements in the duplicated information using the permutation key.

(Supplementary Note 19)

The collation information generation apparatus according to Supplementary Note 18, further comprising a collation-side mask processing unit configured to perform collation-side mask processing for transforming elements in input information using a mask array,
wherein the collation information is generated by transforming the elements in the duplicated information using the mask array, and permutating the sort order of the elements in the duplicated information using the permutation key.

(Supplementary Note 20)

The collation information generation apparatus according to Supplementary Note 19, further comprising a collation-side mask array generation unit configured to generate the mask array.

(Supplementary Note 21)

The collation information generation apparatus according to any one of Supplementary Notes 18 to 20, wherein the duplication processing unit is configured to, in the duplication processing, generate the duplicated information by duplicating elements in input information n2 times (n2 is an integer satisfying n2≥2),
n2 is the same as a number of divisions n1 (n1 is an integer satisfying n1≥2) when each of elements in input information is divided into pieces of distributed information in a registration information generation apparatus configured to generate registration information to be collated with the collation information.

(Supplementary Note 22)

The collation information generation apparatus according to any one of Supplementary Notes 18 to 21, further comprising a collation-side permutation key generation unit configured to generate the permutation key.

(Supplementary Note 23)

A collation system comprising:
the registration information generation apparatus according to any one of Supplementary Notes 1 to 6;
the collation information generation apparatus according to any one of Supplementary Notes 12 to 17; and
a collation apparatus including a similarity calculation unit configured to calculate a similarity between the registration-side input information and the collation-side input information based on the registration information and the collation information.

(Supplementary Note 24)

The collation system according to Supplementary Note 23, further comprising a key generation apparatus including:
a permutation key generation unit configured to generate the permutation key;
a mask array generation unit configured to generate a mask array for transmission to be transmitted to the registration information generation apparatus and the collation information generation apparatus; and
an index information generation unit configured to generate index information indicating the elements in the first set and the elements in the second set.

(Supplementary Note 25)

A collation system comprising:
the registration information generation apparatus according to any one of Supplementary Notes 7 to 11;
the collation information generation apparatus according to any one of Supplementary Notes 18 to 22; and
a collation apparatus including a similarity calculation unit configured to calculate a similarity between the registration-side input information and the collation-side input information based on the registration information and the collation information.

(Supplementary Note 26)

The collation system according to Supplementary Note 25, further comprising a key generation apparatus including:
a permutation key generation unit configured to generate the permutation key; and
a mask array generation unit configured to generate a mask array for transmission to be transmitted to the registration information generation apparatus and the collation information generation apparatus.

(Supplementary Note 27)

A registration information generation method for generating registration information based on registration-side input information input for registration, the registration-side input information including one or both of elements corresponding to a first set and elements corresponding to a second set that is different from the first set, the registration information generation method comprising:
generating registration-side intermediate information from the registration-side input information by performing registration-side distribution processing for performing secret-sharing for the elements corresponding to the first set in input information, and a registration-side duplication processing for duplicating the elements corresponding to the second set in input information; and
performing registration-side permutation processing for permutating a sort order of elements in input information using a permutation key,
wherein the registration information is generated by permutating a sort order of elements in the registration-side intermediate information using the permutation key.

(Supplementary Note 28)

A registration information generation method for generating registration information based on registration-side input information input for registration, the registration information generation method comprising:
generating secret-sharing information from the registration-side input information by performing distribution processing for performing secret-sharing for elements in input information; and
performing registration-side permutation processing for permutating a sort order of elements in input information using a permutation key,
wherein the registration information is generated by permutating a sort order of elements in the secret-sharing information using the permutation key.

(Supplementary Note 29)

A collation information generation method for generating collation information based on collation-side input information input for collation, the collation-side input information including one or both of elements corresponding to a first set, and elements corresponding to a second set that is different from the first set, the collation information generation method comprising:
generating collation-side intermediate information from the collation-side input information by performing collation-side duplication processing for duplicating the elements corresponding to the first set in input information, and collation-side distribution processing for performing secret-sharing for the elements corresponding to the second set in input information; and performing collation-side permutation processing for permutating a sort order of elements in input information using a permutation key, wherein the collation information is generated by permutating a sort order of elements in the collation-side intermediate information using the permutation key.

(Supplementary Note 30)

A collation information generation method for generating collation information based on collation-side input information input for collation, the collation information generation method comprising:

generating duplicated information from the collation-side input information by performing duplication processing for duplicating elements in input information; and performing collation-side permutation processing for permutating a sort order of elements in input information using a permutation key, wherein the collation information is generated by permutating a sort order of elements in the duplicated information using the permutation key.

(Supplementary Note 31)

A similarity calculation method in a collation system including a registration information generation apparatus configured to generate registration information based on registration-side input information input for registration, a collation information generation apparatus configured to generate collation information based on collation-side input information input for collation, and a collation apparatus configured to perform collation between the registration-side input information and the collation-side input information, the registration-side input information and the collation-side input information each including one or both of elements corresponding to a first set and elements corresponding to a second set, the similarity calculation method comprising, in the registration information generation apparatus, generating registration-side intermediate information from the registration-side input information by performing registration-side distribution processing for performing secret-sharing for the elements corresponding to the first set in input information, and a registration-side duplication processing for duplicating the elements corresponding to the second set in input information, performing registration-side permutation processing for permutating a sort order of elements in input information using a permutation key, and generating the registration information by permutating a sort order of elements in the registration-side intermediate information using the permutation key, wherein the similarity calculation method further comprises, in the collation information generation apparatus, generating collation-side intermediate information from the collation-side input information by performing collation-side duplication processing for duplicating the elements corresponding to the first set in input information, and collation-side distribution processing for performing secret-sharing for the elements corresponding to the second set in input information, performing collation-side permutation processing for permutating a sort order of elements input information using the permutation key, and generating the collation information by permutating a sort order of elements in the collation-side intermediate information using the permutation key, wherein the similarity calculation method further comprises, in the collation apparatus, calculating a similarity between the registration-side input information and the collation-side input information based on the registration information and the collation information.

(Supplementary Note 32)

A similarity calculation method in a collation system including a registration information generation apparatus configured to generate registration information based on registration-side input information input for registration, a collation information generation apparatus configured to generate collation information based on collation-side input information input for collation, and a collation apparatus configured to perform collation between the registration-side input information and the collation-side input information, the similarity calculation method comprising, in the registration information generation apparatus, generating distributed information from the registration-side input information by performing distribution processing for performing secret-sharing for elements in input information, performing registration-side permutation processing for permutating a sort order of elements in input information using a permutation key, and generating the registration information by permutating a sort order of elements in the distributed information using the permutation key, wherein the similarity calculation method comprises, in the collation information generation apparatus, generating duplicated information from the collation-side input information by performing duplication processing for duplicating elements in input information, performing collation-side permutation processing for permutating a sort order of elements in input information using the permutation key, and generating the collation information by permutating a sort order of elements in the duplicated information using the permutation key, and wherein the similarity calculation method comprises, in the collation apparatus, calculating a similarity between the registration-side input information and the collation-side input information based on the registration information and the collation information.

(Supplementary Note 33)

A registration information generation program for generating registration information based on registration-side input information input for registration, the registration-side input information including one or both of elements corresponding to a first set and elements corresponding to a second set that is different from the first set, the registration information generation program causing a computer to execute:

generating registration-side intermediate information from the registration-side input information by performing registration-side distribution processing for performing secret-sharing for the elements corresponding to the first set in input information, and a registration-side duplication processing for duplicating the elements corresponding to the second set in input information; and performing registration-side permutation processing for permutating a sort order of elements in input information using a permutation key, wherein the registration information is generated by permutating a sort order of elements in the registration-side intermediate information using the permutation key.

(Supplementary Note 34)

A registration information generation program for generating registration information based on registration-side input information input for registration, the registration information generation program causing a computer to execute:

generating secret-sharing information from the registration-side input information by performing distribution processing for performing secret-sharing for elements in input information; and performing registration-side permutation processing for permutating a sort order of elements in input information using a permutation key, wherein the registration information is generated by permutating a sort order of elements in the secret-sharing information using the permutation key.

(Supplementary Note 35)

A collation information generation program for generating collation information based on collation-side input information input for collation, the collation-side input information including one or both of elements corresponding to a first set, and elements corresponding to a second set that is different from the first set, the registration information generation program causing a computer to execute:

generating collation-side intermediate information from the collation-side input information by performing collation-side duplication processing for duplicating the elements corresponding to the first set in input information, and collation-side distribution processing for performing secret-sharing for the elements corresponding to the second set in input information; and performing collation-side permutation processing for permutating a sort order of elements in input information using a permutation key, wherein the collation information is generated by permutating a sort order of elements in the collation-side intermediate information using the permutation key.

(Supplementary Note 36)

A collation information generation program for generating collation information based on collation-side input information input for collation, the registration information generation program causing a computer to execute:

generating duplicated information from the collation-side input information by performing duplication processing for duplicating elements in input information; and performing collation-side permutation processing for permutating a sort order of elements in input information using a permutation key, wherein the collation information is generated by permutating a sort order of elements in the duplicated information using the permutation key.

INDUSTRIAL APPLICABILITY

There are provided a registration information generation apparatus, a collation information generation apparatus, a collation system, a registration information generation method, a collation information generation method, a similarity calculation method, a registration information generation program, and a collation information generation program that can perform cancelable transformation capable of suppressing the degradation of collation accuracy and reducing the risk of information leakage.

REFERENCE SIGNS LIST 1A, 1B, 1C, 1D Registration Information Generation Apparatus
2A, 2B, 2C, 2D Collation Information Generation Apparatus
3A, 3B Key Generation Apparatus
4A, 4B, 4C, 4D Collation Apparatus
5A, 5B DB
110A, 110B Feature Extraction Unit
110C Distribution Processing Unit
110D Registration-Side Intermediate Information Generation Unit
120A Distribution Processing Unit
120B Intermediate Information Generation Unit
120C, 120D Registration-Side Permutation Processing Unit
130A, 130B Permutation Processing Unit
140A, 140B Mask Processing Unit
210A, 210B Feature Extraction Unit
210C Duplication Processing Unit
210D Collation-Side Intermediate Information Generation Unit
220A Duplication Processing Unit
220B Intermediate Information Generation Unit
220C, 220D Collation-Side Permutation Processing Unit
230A, 230B Permutation Processing Unit
240A, 240B Mask Processing Unit
310A, 310B Index Information Generation Unit
320A, 320B Permutation Key Generation Unit
330A, 330B Mask Array Generation Unit
410A, 410B Similarity Calculation Unit
420A, 420B Collation Processing Unit
1000A, 1000B, 1000C, 1000D Collation System

What is claimed is:

1. A registration information generation apparatus for generating registration information based on registration-side input information input for registration, the registration-side input information including one or both of elements corresponding to a first set and elements corresponding to a second set that is different from the first set, the registration information generation apparatus comprising:

one or more memories storing an instruction; and one or more processors configured to execute the instructions to generate registration-side intermediate information from the registration-side input information by performing registration-side distribution processing for performing secret-sharing for the elements corresponding to the first set in input information, and a registration-side duplication processing for duplicating the elements corresponding to the second set in input information; and perform registration-side permutation processing for permutating a sort order of elements in input information using a permutation key, wherein the registration information is generated by permutating a sort order of elements in the registration-side intermediate information using the permutation key.

2. The registration information generation apparatus according to claim 1, wherein the one or more processors are configured to execute the instructions to perform registration-side mask processing for transforming elements in input information using a mask array, wherein the registration information is generated by transforming the elements in the registration-side intermediate information using the mask array, and permutating the sort order of the elements in the registration-side intermediate information using the permutation key.

3. The registration information generation apparatus according to claim 2, wherein the one or more processors are configured to execute the instructions to generate the mask array.

4. The registration information generation apparatus according to claim 1, wherein the one or more processors are configured to execute the instructions to generate the registration-side intermediate information by
in the registration-side distribution processing, dividing each of the elements corresponding to the first set in the input information into n1 pieces of distributed information (n1 is an integer satisfying n1≥2), and
in the registration-side duplication processing, duplicating the elements corresponding to the second set in the input information n2 times (n2 is an integer satisfying n2≥2),
the n1 pieces of distributed information have different values, respectively, and
a sum of the n1 pieces of distributed information has a value equal to the element corresponding to the first set in the input information before being divided into the n1 pieces of distributed information.

5. The registration information generation apparatus according to claim 1, wherein the one or more processors are configured to execute the instructions to generate the permutation key.

6. The registration information generation apparatus according to claim 1, wherein the one or more processors are configured to execute the instructions to generate registration-side index information indicating the elements in the first set and the elements in the second set.

7. A registration information generation apparatus for generating registration information based on registration-side input information input for registration, the registration information generation apparatus comprising:
one or more memories storing an instruction; and
one or more processors configured to execute the instructions to
generate secret-sharing information from the registration-side input information by performing distribution processing for performing secret-sharing for elements in input information; and
perform registration-side permutation processing for permutating a sort order of elements in input information using a permutation key,
wherein the registration information is generated by permutating a sort order of elements in the secret-sharing information using the permutation key.

8. The registration information generation apparatus according to claim 7, wherein the one or more processors are configured to execute the instructions to perform registration-side mask processing for transforming elements in input information using a mask array,
wherein the registration information is generated by transforming the elements in the secret-sharing information using the mask array, and permutating the sort order of the elements in the secret-sharing information using the permutation key.

9. The registration information generation apparatus according to claim 8, wherein the one or more processors are configured to execute the instructions to generate the mask array.

10. The registration information generation apparatus according to claim 7, wherein the one or more processors are configured to execute the instructions to, in the distribution processing, generate the secret-sharing information by dividing each of the elements in the input information into n1 pieces of distributed information (n1 is an integer satisfying n1≥2),
the n1 pieces of distributed information have different values, respectively, and
a sum of the n1 pieces of distributed information is equal to the element in the input information before being divided into the n1 pieces of distributed information.

11. The registration information generation apparatus according to claim 7, wherein the one or more processors are configured to execute the instructions to generate the permutation key.

12. A collation information generation apparatus for generating collation information based on collation-side input information input for collation, the collation-side input information including one or both of elements corresponding to a first set, and elements corresponding to a second set that is different from the first set, the collation information generation apparatus comprising:
one or more memories storing an instruction; and
one or more processors configured to execute the instructions to
generate collation-side intermediate information from the collation-side input information by performing collation-side duplication processing for duplicating the elements corresponding to the first set in input information, and collation-side distribution processing for performing secret-sharing for the elements corresponding to the second set in input information; and
perform collation-side permutation processing for permutating a sort order of elements in input information using a permutation key,
wherein the collation information is generated by permutating a sort order of elements in the collation-side intermediate information using the permutation key.

13. The collation information generation apparatus according to claim 12, wherein the one or more processors are configured to execute the instructions to perform collation-side mask processing for transforming elements in input information using a mask array,
wherein the collation information is generated by transforming the elements in the collation-side intermediate information using the mask array, and permutating the sort order of the elements in the collation-side intermediate information using the permutation key.

14. The collation information generation apparatus according to claim 13, wherein the one or more processors are configured to execute the instructions to generate the mask array.

15. The collation information generation apparatus according to claim 12, wherein the one or more processors are configured to execute the instructions to generate the collation-side intermediate information by
in the collation-side duplication processing, duplicating the elements corresponding to the first set in the input information n1 times (n1 is an integer satisfying n1≥2), and
in the collation-side distribution processing, dividing each of the elements corresponding to the second set in the input information into n2 pieces of distributed information (n2 is an integer satisfying n2≥2),
n1 is the same as a number of divisions when each of the elements corresponding to the first set in input information is divided into pieces of distributed information in a registration information generation apparatus configured to generate registration information to be collated with the collation information, the n2 pieces of distributed information have different values, respectively, a sum of the n2 pieces of distributed information has a value equal to the element corresponding to the second set in the input information before being divided into the n2 pieces of distributed information, and n2 is the same as a number of duplications when duplicating each of the elements corresponding to the second set in input information in the registration information generation apparatus.

16. The collation information generation apparatus according to claim 12, wherein the one or more processors are configured to execute the instructions to generate the permutation key.

17. The collation information generation apparatus according to claim 12, wherein the one or more processors are configured to execute the instructions to generate collation-side index information indicating the elements in the first set and the elements in the second set.

18. A collation information generation apparatus for generating collation information based on collation-side input information input for collation, the collation information generation apparatus comprising:

one or more memories storing an instruction; and one or more processors configured to execute the instructions to duplicated information from the collation-side input information by performing duplication processing for duplicating elements in input information; and perform collation-side permutation processing for permutating a sort order of elements in input information using a permutation key, wherein the collation information is generated by permutating a sort order of elements in the duplicated information using the permutation key.

19. The collation information generation apparatus according to claim 18, wherein the one or more processors are configured to execute the instructions to perform collation-side mask processing for transforming elements in input information using a mask array, wherein the collation information is generated by transforming the elements in the duplicated information using the mask array, and permutating the sort order of the elements in the duplicated information using the permutation key.

20. The collation information generation apparatus according to claim 19, wherein the one or more processors are configured to execute the instructions to generate the mask array.

21. The collation information generation apparatus according to claim 18, wherein the one or more processors are configured to execute the instructions to, in the duplication processing, generate the duplicated information by duplicating elements in input information n2 times (n2 is an integer satisfying n2≥2), n2 is the same as a number of divisions n1 (n1 is an integer satisfying n1≥2) when each of elements in input information is divided into pieces of distributed information in a registration information generation apparatus configured to generate registration information to be collated with the collation information.

22. The collation information generation apparatus according to claim 18, wherein the one or more processors are configured to execute the instructions to generate the permutation key.

* * * * *